United States Patent
Aliabadi et al.

(10) Patent No.: US 11,182,645 B2
(45) Date of Patent: *Nov. 23, 2021

(54) EFFICIENT DATA LAYOUTS FOR CONVOLUTIONAL NEURAL NETWORKS

(71) Applicant: Magic Leap, Inc., Plantation, FL (US)

(72) Inventors: Ashkan Aliabadi, Santa Clara, CA (US); Gregory David Roberts, Pasadena, CA (US)

(73) Assignee: Magic Leap, Inc., Plantation, FL (US)

( * ) Notice: Subject to any disclaimer, the term of this patent is extended or adjusted under 35 U.S.C. 154(b) by 77 days.

This patent is subject to a terminal disclaimer.

(21) Appl. No.: 16/680,335

(22) Filed: Nov. 11, 2019

(65) Prior Publication Data

US 2020/0082215 A1 Mar. 12, 2020

Related U.S. Application Data

(63) Continuation of application No. 15/724,142, filed on Oct. 3, 2017, now Pat. No. 10,489,680.
(Continued)

(51) Int. Cl.
*G06N 3/04* (2006.01)
*G06K 9/62* (2006.01)
(Continued)

(52) U.S. Cl.
CPC ......... *G06K 9/6219* (2013.01); *G06K 9/0061* (2013.01); *G06K 9/623* (2013.01);
(Continued)

(58) Field of Classification Search
CPC .... G06K 9/6219; G06K 9/0061; G06K 9/623; G06K 9/6251; G06N 3/0454; G06N 3/084; G06N 3/04
See application file for complete search history.

(56) References Cited

U.S. PATENT DOCUMENTS 5,291,560 A 3/1994 Daugman
5,583,795 A 12/1996 Smyth
(Continued)

FOREIGN PATENT DOCUMENTS

JP 2010-134697 6/2010
KR 2019-0013162 2/2019
(Continued)

OTHER PUBLICATIONS

Shuai Zhang, Jianxin Li, Pengtao Xie, Yingchun Zhang, Minglai Shao, Haoyi Zhou, and Mengyi Yan: "Stacked Kernel Network", Nov. 25, 2017. (Year: 2017).*
(Continued)

*Primary Examiner* — Siamak Harandi
(74) *Attorney, Agent, or Firm* — Knobbe, Martens, Olson & Bear, LLP

(57) ABSTRACT

Systems and methods for efficient implementation of a convolutional layer of a convolutional neural network are disclosed. In one aspect, weight values of kernels in a kernel stack of a convolutional layer can be reordered into a tile layout with tiles of runnels. Pixel values of input activation maps of the convolutional layer can be reordered into an interleaved layout comprising a plurality of clusters of input activation map pixels. The output activation maps can be determined using the clusters of the input activation map pixels and kernels tile by tile.

20 Claims, 19 Drawing Sheets

Related U.S. Application Data

(60) Provisional application No. 62/403,930, filed on Oct. 4, 2016.

(51) Int. Cl.
*G06K 9/00* (2006.01)
*G06N 3/063* (2006.01)
*G06N 3/08* (2006.01)

(52) U.S. Cl.
CPC ............ *G06K 9/6251* (2013.01); *G06N 3/04* (2013.01); *G06N 3/0454* (2013.01); *G06N 3/063* (2013.01); *G06N 3/084* (2013.01)

(56) References Cited

U.S. PATENT DOCUMENTS

| | | |
|---|---|---|
| 6,850,221 B1 | 2/2005 | Tickle |
| 7,771,049 B2 | 8/2010 | Knaan et al. |
| 7,970,179 B2 | 6/2011 | Tosa |
| 8,098,891 B2 | 1/2012 | Lv et al. |
| 8,341,100 B2 | 12/2012 | Miller et al. |
| 8,345,984 B2 | 1/2013 | Ji et al. |
| 8,363,783 B2 | 1/2013 | Gertner et al. |
| 8,845,625 B2 | 9/2014 | Angeley et al. |
| 8,950,867 B2 | 2/2015 | Macnamara |
| 9,081,426 B2 | 7/2015 | Armstrong |
| 9,141,916 B1 | 9/2015 | Corrado et al. |
| 9,215,293 B2 | 12/2015 | Miller |
| 9,262,680 B2 | 2/2016 | Nakazawa et al. |
| 9,310,559 B2 | 4/2016 | Macnamara |
| 9,348,143 B2 | 5/2016 | Gao et al. |
| D758,367 S | 6/2016 | Natsume |
| 9,417,452 B2 | 8/2016 | Schowengerdt et al. |
| 9,430,829 B2 | 8/2016 | Madabhushi et al. |
| 9,470,906 B2 | 10/2016 | Kaji et al. |
| 9,547,174 B2 | 1/2017 | Gao et al. |
| 9,558,778 B2 | 1/2017 | Suzuki et al. |
| 9,671,566 B2 | 6/2017 | Abovitz et al. |
| 9,740,006 B2 | 8/2017 | Gao |
| 9,791,700 B2 | 10/2017 | Schowengerdt et al. |
| 9,851,563 B2 | 12/2017 | Gao et al. |
| 9,857,591 B2 | 1/2018 | Welch et al. |
| 9,874,749 B2 | 1/2018 | Bradski et al. |
| 10,489,680 B2 | 11/2019 | Aliabadi et al. |
| 2004/0130680 A1 | 7/2004 | Zhou et al. |
| 2006/0028436 A1 | 2/2006 | Armstrong |
| 2006/0088193 A1 | 4/2006 | Muller et al. |
| 2006/0147094 A1 | 7/2006 | Yoo |
| 2007/0081123 A1 | 4/2007 | Lewis |
| 2007/0140531 A1 | 6/2007 | Hamza |
| 2011/0182469 A1 | 7/2011 | Ji et al. |
| 2012/0127062 A1 | 5/2012 | Bar-Zeev et al. |
| 2012/0162549 A1 | 6/2012 | Gao et al. |
| 2012/0163678 A1 | 6/2012 | Du et al. |
| 2012/0303932 A1 | 11/2012 | Farabet et al. |
| 2013/0082922 A1 | 4/2013 | Miller |
| 2013/0117377 A1 | 5/2013 | Miller |
| 2013/0125027 A1 | 5/2013 | Abovitz |
| 2013/0208234 A1 | 8/2013 | Lewis |
| 2013/0242262 A1 | 9/2013 | Lewis |
| 2014/0071539 A1 | 3/2014 | Gao |
| 2014/0177023 A1 | 6/2014 | Gao et al. |
| 2014/0218468 A1 | 8/2014 | Gao et al. |
| 2014/0267420 A1 | 9/2014 | Schowengerdt |
| 2014/0270405 A1 | 9/2014 | Derakhshani et al. |
| 2014/0279774 A1 | 9/2014 | Wang et al. |
| 2014/0306866 A1 | 10/2014 | Miller et al. |
| 2014/0380249 A1 | 12/2014 | Fleizach |
| 2015/0016777 A1 | 1/2015 | Abovitz et al. |
| 2015/0103306 A1 | 4/2015 | Kaji et al. |
| 2015/0117760 A1 | 4/2015 | Wang et al. |
| 2015/0134583 A1 | 5/2015 | Tamatsu et al. |
| 2015/0170002 A1 | 6/2015 | Szegedy et al. |
| 2015/0178939 A1 | 6/2015 | Bradski et al. |
| 2015/0205126 A1 | 7/2015 | Schowengerdt |
| 2015/0222883 A1 | 8/2015 | Welch |
| 2015/0222884 A1 | 8/2015 | Cheng |
| 2015/0268415 A1 | 9/2015 | Schowengerdt et al. |
| 2015/0278642 A1 | 10/2015 | Chertok et al. |
| 2015/0302652 A1 | 10/2015 | Miller et al. |
| 2015/0309263 A2 | 10/2015 | Abovitz et al. |
| 2015/0326570 A1 | 11/2015 | Publicover et al. |
| 2015/0338915 A1 | 11/2015 | Publicover et al. |
| 2015/0346490 A1 | 12/2015 | TeKolste et al. |
| 2015/0346495 A1 | 12/2015 | Welch et al. |
| 2016/0011419 A1 | 1/2016 | Gao |
| 2016/0026253 A1 | 1/2016 | Bradski et al. |
| 2016/0034811 A1 | 2/2016 | Paulik et al. |
| 2016/0035078 A1 | 2/2016 | Lin et al. |
| 2016/0062947 A1 | 3/2016 | Chetlur et al. |
| 2016/0098844 A1 | 4/2016 | Shaji et al. |
| 2016/0104053 A1 | 4/2016 | Yin et al. |
| 2016/0104056 A1 | 4/2016 | He et al. |
| 2016/0135675 A1 | 5/2016 | Du et al. |
| 2016/0162782 A1 | 6/2016 | Park |
| 2017/0053165 A1 | 2/2017 | Kaehler |
| 2018/0018451 A1 | 1/2018 | Spizhevoy et al. |
| 2018/0018515 A1 | 1/2018 | Spizhevoy et al. |
| 2018/0096226 A1 | 4/2018 | Aliabadi et al. |
| 2018/0315154 A1 | 11/2018 | Park et al. |

FOREIGN PATENT DOCUMENTS

| | | |
|---|---|---|
| WO | WO 2014/182769 | 11/2014 |
| WO | WO 2015/164807 | 10/2015 |
| WO | WO 2018/067603 | 4/2018 |

OTHER PUBLICATIONS

International Preliminary Report on Patentability for PCT Application No. PCT/US2017/054987, dated Apr. 9, 2019.

ARToolKit: https://web.archive.org/web/20051013062315/http://www.hitl.washington.edu:80/artoolkit/documentation/hardware.htm, archived Oct. 13, 2005.

Azuma, "A Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf.

Azuma, "Predictive Tracking for Augmented Realty," TR95-007, Department of Computer Science, UNC-Chapel Hill, NC, Feb. 1995.

Bimber, et al., "Spatial Augmented Reality—Merging Real and Virtual Worlds," 2005 https://web.media.mit.edu/~raskar/book/BimberRaskarAugmentedRealityBook.pdf.

Broere, A memory-centric SIMD Neural network accelerator balancing efficiency & flexibility (online), Aug. 20, 2013, 1-22, https://pure.tue.nl.ws/portalfiies/portai/46950453.pdf.

Chao, et al., "Optimizing Memory Efficiency for Deep Convolutional Neural Networks on GPUs," SC16: International Conference for High Performance Computing, Networking, Storage and Analysis, IEEE, Nov. 13, 2016.

Hyunsun, et al., "Zero and Sata Reuse-aware Fast Convolution for Deep Neural Networks on GPU," 2016 International Conference on Hardware/Software Codesign and System Synthesis (Codes+ISSS), ACE, Oct. 2, 2016.

Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).

Ino, et al., "A Parallel Method for Accelerating Parameter Sweep on the GPU", study report of Information Processing Society of Japan, 2012, Japan, Information Processing Society of Japan.

Peemen, et al., "Memory-Centric Accelerator Design for Convolutional Neural Networks," 2013 IEEE 31st International Conference on Computer Design (ICCD), Oct. 1, 2014.

Tanriverdi and Jacob, "Interacting With Eye Movements in Virtual Environments," Department of Electrical Engineering and Computer Science, Tufts University, Medford, MA—paper/Proc. ACM

(56) References Cited

OTHER PUBLICATIONS

CHI 2000 Human Factors in Computing Systems Conference, pp. 265-272, Addison-Wesley/ACM Press (2000).
"Camera Calibration and 3D Reconstruction", OpenCV, retrieved May 5, 2016, from <http://docs.opencv.org/2.4/modules/calib3d/doc/camera_calibration_and_3d_reconstruction.html> in 53 pages.
"Camera calibration with OpenCV", OpenCV, retrieved May 5, 2016, in 12 pages. URL: http://docs.opencv.org/2.4/doc/tutorials/calib3d/camera_calibration/camera_calibration.html.
"Camera calibration with OpenCV", OpenCV, retrieved May 5, 2016, in 7 pages. URL: http://docs.opencv.org/3.1.0/d4/d94/tutorial_camera_calibration.html#gsc.tab=0.
"Convolution", Wikipedia, accessed Oct. 1, 2017, in 17 pages. URL: https://en.wikipedia.org/wiki/Convolution.
"Deep Learning", Wikipedia, printed Oct. 3, 2017, in 23 pages. URL: https://en.wikipedia.org/wiki/Deep_learning.
"Feature Extraction Using Convolution", Ufldl, printed Sep. 1, 2016, in 3 pages. URL:http://deeplearning.stanford.edu/wiki/index.php/Feature_extraction_using_convolution.
"Machine Learning", Wikipedia, printed Oct. 3, 2017, in 14 pages. URL: https://en.wikipedia.org/wiki/Machine_learning.
"Transfer Function Layers", GitHub, December 1, 2015, in 13 pages; accessed URL: http://github.com/torch/nn/blob/master/doc/transfer.md.
Adegoke et al., "Iris Segmentation: A Survey", Int J Mod Engineer Res. (IJMER) (Aug. 2013) 3(4): 1885-1889.
Anthony, S., "MIT releases open-source software that reveals invisible motion and detail in video", Extreme Tech, Feb. 28, 2013, as archived Aug. 4, 2017, in 5 pages.
Arevalo J. et al., "Convolutional neural networks for mammography mass lesion classification", in *Engineering in Medicine and Biology Society* (EMBC); 37th Annual International Conference IEEE, Aug. 25-29, 2015, pp. 797-800.
Aubry M. et al., "Seeing 3D chairs: e emplar part-based 2D-3D alignment using a large dataset of CAD models", Proceedings of the IEEE Conference on Computer Vision and Pattern Recognition (Jun. 23-28, 2014); Computer Vision Foundation—Open Access Version in 8 pages.
Badrinarayanan et al., "SegNet: A Deep Convolutional Encoder-Decoder Architecture for Image Segmentation", IEEE (Dec. 8, 2015); arXiv: eprint arXiv:1511.00561v2 in 14 pages.
Bansal A. et al., "Marr Revisited: 2D-3D Alignment via Surface Normal Prediction", Proceedings of the IEEE Conference on Computer Vision and Pattern Recognition (Jun. 27-30, 2016) pp. 5965-5974.
Belagiannis V. et al., "Recurrent Human Pose Estimation", In Automatic Face & Gesture Recognition; 12th IEEE International Conference—May 2017, arXiv eprint arXiv:1605.02914v3; (Aug. 5, 2017) Open Access Version in 8 pages.
Bell S. et al., "Inside-Outside Net: Detectina Obects in Conte t with Skip Pooling and Recurrent Neural Networks", In Proceedings of the IEEE Conference on Computer Vision and Pattern Recognition, Jun. 27-30, 2016; pp. 2874-2883.
Biederman I., "Recognition-by-Components: A Theory of Human Image Understanding", Psychol Rev. (Apr. 1987) 94(2): 115-147.
Bouget, J., "Camera Calibration Toolbox for Matlab" Cal-Tech, Dec. 2, 2013, in 5 pages. URL: https://www.vision.caltech.edu/bouguetj/calib_doc/index.html#parameters.
Bulat A. et al., "Human pose estimation via Convolutional Part Heatmap Regression", arXiv e-print arXiv:1609.01743v1, Sep. 6, 2016 in 16 pages.
Carreira J. et al., "Human Pose Estimation with Iterative Error Feedback", In Proceedings of the IEEE Conference on Computer Vision and Pattern Recognition, Jun. 27-30, 2016, pp. 4733-4742.
Chatfield et al., "Return of the Devil in the Details: Delving Deep into Convolutional Nets", arXiv eprint arXiv:1405.3531v4, Nov. 5, 2014 in 11 pages.
Chen X. et al., "3D Object Proposals for Accurate Object Class Detection", in *Advances in Neural Information Processing Systems*, (2015) Retrieved from http://papers.nips.cc/paper/5644-3d-object-proposals-for-accurate-object-class-detection.pdf>; 11 pages.
Choy et al., "3D-R2N2: A Unified Approach for Single and Multi-view 3D Object Reconstruction", arXiv; eprint arXiv:1604.00449v1, Apr. 2, 2016 in 17 pages.
Collet et al., "The MOPED framework: Object Recognition and Pose Estimation for Manipulation", The International Journal of Robotics Research. (Sep. 2011) 30(10):1284-306; preprint Apr. 11, 2011 in 22 pages.
Crivellaro A. et al., "A Novel Representation of Parts for Accurate 3D Object Detection and Tracking in Monocular Images", In *Proceedings of the IEEE International Conference on Computer Vision*; Dec. 7-13, 2015 (pp. 4391-4399).
Dai J. et al., "Instance-aware Semantic Segmentation via Multi-task Network Cascades", In *Proceedings of the IEEE Conference on Computer Vision and Pattern Recognition*; Jun. 27-30, 2016 (pp. 3150-3158).
Dai J. et al., "R-FCN: Object Detection via Region-based Fully Convolutional Networks", in *Advances in neural information processing systems*; (Jun. 21, 2016) Retrieved from <https://arxiv.org/pdf/1605.06409.pdf in 11 pages.
Daugman, J. et al., "Epigenetic randomness, complexity and singularity of human iris patterns", Proceedings of Royal Society: Biological Sciences, vol. 268, Aug. 22, 2001, in 4 pages.
Daugman, J., "How Iris Recognition Works", IEEE Transactions on Circuits and Systems for Video Technology, vol. 14, No. 1, Jan. 2004, in 10 pages.
Daugman, J., "New Methods in Iris Recognition," IEEE Transactions on Systems, Man, and Cybernetics—Part B: Cybernetics, vol. 37, No. 5, Oct. 2007, in 9 pages.
Daugman, J., "Probing the Uniqueness and Randomness of IrisCodes: Results From 200 Billion Iris Pair Comparisons," Proceedings of the IEEE, vol. 94, No. 11, Nov. 2006, in 9 pages.
Detone D. et al., "Deep Image Homography Estimation", arXiv eprint arXiv:1606.03798v1, Jun. 13, 2016 in 6 pages.
Dwibedi et al., "Deep Cuboid Detection: Beyond 2D Bounding Boxes", arXiv eprint arXiv:1611.10010v1; Nov. 30, 2016 in 11 pages.
Everingham M. et al., "The PASCAL Visual Object Classes (VOC) Challenge", Int J Comput Vis (Jun. 2010) 88(2):303-38.
Farabet, C. et al., "Hardware Accelerated Convolutional Neural Networks for Synthetic Vision Systems", Proceedings of the 2010 IEEE International Symposium (May 30-Jun. 2, 2010) Circuits and Systems (ISCAS), pp. 257-260.
Fidler S. et al., "3D Object Detection and Viewpoint Estimation with a Deformable 3D Cuboid Model", Proceedings of the 25th International Conference on Neural Information Processing Systems, (Dec. 3-6, 2012), pp. 611-619.
Fouhey D. et al., "Data-Driven 3D Primitives for Single Image Understanding", Proceedings of the IEEE International Conference on Computer Vision, Dec. 1-8, 2013; pp. 3392-3399.
Geiger A. et al., "Joint 3D Estimation of Objects and Scene Layout", In Advances in Neural Information Processing Systems 24; Dec. 17, 2011 in 9 pages.
Gidaris S. et al., "Object detection via a multi-region & semantic segmentation-aware CNN model", in Proceedings of the IEEE International Conference on Computer Vision; Dec. 7-13, 2015 (pp. 1134-1142).
Girshick R. et al., "Fast R-CNN", Proceedings of the IEEE International Conference on Computer Vision; Dec. 7-13, 2015 (pp. 1440-1448).
Girshick R. et al., "Rich feature hierarchies for accurate object detection and semantic segmentation", Proceedings of the IEEE Conference on Computer Vision and Pattern Recognition, Jun. 23-28, 2014 (pp. 580-587).
Gupta A. et al., "Blocks World Revisited: Image Understanding Using Qualitative Geometry and Mechanics", in European Conference on Computer Vision; Sep. 5, 2010 in 14 pages.
Gupta A. et al., "From 3D Scene Geometry to Human Workspace", in Computer Vision and Pattern Recognition (CVPR); IEEE Conference on Jun. 20-25, 2011 (pp. 1961-1968).

(56) References Cited

OTHER PUBLICATIONS

Gupta S. et al., "Aligning 3D Models to RGB-D Images of Cluttered Scenes", in Proceedings of the IEEE Conference on Computer Vision and Pattern Recognition, Jun. 7-12, 2015 (pp. 4731-4740).
Gupta S. et al., "Inferring 3D Object Pose in RGB-D Images". arXiv e-print arXiv:1502.04652v1, Feb. 2, 16 2015 in 13 pages.
Gupta S. et al., "Learning Rich Features from RGB-D Images for Object Detection and Segmentation", in European Conference on Computer Vision; (Jul. 22, 2014); Retrieved from <https://arxiv.org/pdf/1407.5736.pdf> in 16 pages.
Han et al., "Deep Compression: Compressing Deep Neural Networks with Pruning, Trained Quantization and Huffman Coding", arXiv eprint arXiv:1510.00149v5, Feb. 15, 2016 in 14 pages.
Hansen, D. et al., "In the Eye of the Beholder: A Survey of Models for Eyes and Gaze", IEEE Transactions on Pattern Analysis and Machine Intelligence, vol. 32, No. 3, , Mar. 2010, in 23 pages.
Hartley R et al., *Multiple View Geometry in Computer Vision*, 2nd Edition; Cambridge University Press, (Apr. 2004); in 673 pages.
He et al., "Delving Deep into Rectifiers: Surpassing Human-level Performance on ImageNet Classification", arXiv: eprint arXiv:1502.01852v1, Feb. 6, 2015 in 11 pages.
He et al., "Spatial Pyramid Pooling in Deep Convolutional Networks for Visual Recognition", arXiv eprint arXiv:1406.4729v2; Aug. 29, 2014 in 14 pages.
Hedau V. et al., "Recovering Free Space of Indoor Scenes from a Single Image", in *Computer Vision and Pattern Recognition* (CVPR), IEEE Conference Jun. 16-21, 2012 (pp. 2807-2814).
Hejrati et al., "Categorizing Cubes: Revisiting Pose Normalization", Applications of Computer Vision (WACV), 2016 IEEE Winter Conference, Mar. 7-10, 2016 in 9 pages.
Hijazi, S. et al., "Using Convolutional Neural Networks for Image Recognition", Tech Rep. (Sep. 2015) available online URL: http://ip.cadence.com/uploads/901/cnn-wp-pdf, in 12 pages.
Hoffer et al., "Deep Metric Learning Using Triplet Network", International Workshop on Similarity-Based Pattern Recognition [ICLR]; Nov. 25, 2015; [online] retrieved from the internet <https://arxiv.org/abs/1412.6622>; pp. 84-92.
Hoiem D. et al., "Representations and Techniques for 3D Object Recognition and Scene Interpretation", Synthesis Lectures on Artificial Intelligence and Machine Learning, Aug. 2011, vol. 5, No. 5, pp. 1-169; Abstract in 2 pages.
Hsiao E. et al., "Making specific features less discriminative to improve point-based 3D object recognition", in *Computer Vision and Pattern Recognition* (CVPR), IEEE Conference, Jun. 13-18, 2010 (pp. 2653-2660).
Huang et al., "Sign Language Recognition Using 3D Convolutional Neural Networks", University of Science and Technology of China, 2015 IEEE International Conference on Multimedia and Expo. June 29-Jul. 3, 2015, in 6 pages.
Iandola F. et al., "SqueezeNet: AlexNet-level accuracy with 50x fewer parameters and <1 MB model size", arXiv eprint arXiv:1 602.07360v1, Feb. 24, 2016 in 5 pages.
Ioffe S. et al., "Batch Normalization: Accelerating Deep Network Training by Reducing Internal Covariate Shift", International Conference on Machine Learning (Jun. 2015); arXiv: eprint arXiv:1502.03167v3, Mar. 2, 2015 in 11 pages.
Jarrett et al., "What is the Best Multi-Stage Architecture for Object Recognition?", In Computer Vision IEEE 12th International Conference Sep. 29-Oct. 2, 2009, pp. 2146-2153.
Ji, H. et al., "3D Convolutional Neural Networks for Human Action Recognition", IEEE Transactions on Pattern Analysis and Machine Intelligence, vol. 35:1, Jan. 2013, in 11 pages.
Jia et al., "3D-Based Reasoning with Blocks, Support, and Stability", Proceedings of the IEEE Conference on Computer Vision and Pattern Recognition; Jun. 23-28, 2013 in 8 pages.
Jia et al., "Caffe: Convolutional Architecture for Fast Feature Embedding", arXiv e-print arXiv:1408.5093V1, Jun. 20, 2014 in 4 pages.

Jiang H. et al., "A Linear Approach to Matching Cuboids in RGBD Images", in *Proceedings of the IEEE Conference on Computer Vision and Pattern Recognition*. Jun. 23-28, 2013 (pp. 2171-2178).
Jillela et al., "An Evaluation of Iris Segmentation Algorithms in Challenging Periocular Images", Handbook of Iris Recognition, Springer Verlag, Heidelberg (Jan. 12, 2013) in 28 pages.
Kar A. et al., "Category-specific object reconstruction from a single image", in *Proceedings of the IEEE Conference on Computer Vision and Pattern Recognition*. Jun. 7-12, 2015 (pp. 1966-1974).
Krizhevsky et al., "ImageNet Classification with Deep Convolutional Neural Networks", Advances in Neural Information Processing Systems. Apr. 25, 2013, pp. 1097-1105.
Lavin, A. et al.: "Fast Algorithms for Convolutional Neural Networks", Proceedings of the IEEE Conference on Computer Vision and Pattern Recognition. arXiv: eprint arXiv:1509.09308v2; Nov. 10, 2016 in 9 pages.
Lee D. et al., "Geometric Reasoning for Single Image Structure Recovery", in IEEE Conference Proceedings in Computer Vision and Pattern Recognition (CVPR) Jun. 20-25, 2009, pp. 2136-2143.
Lim J. et al., "FPM: Fine pose Parts-based Model with 3D CAD models", European Conference on Computer Vision; Springer Publishing, Sep. 6, 2014, pp. 478-493.
Liu et al., "ParseNet: Looking Wider to See Better", arXiv eprint arXiv:1506.04579v1; Jun. 15, 2015 in 9 pages.
Liu W et al., "SSD: Single Shot MultiBox Detector", arXiv e-print arXiv:1512.02325v5, Dec. 29, 2016 in 17 pages.
Long et al., "Fully Convolutional Networks for Semantic Segmentation", Proceedings of the IEEE Conference on Computer Vision and Pattern Recognition (Jun. 7-12, 2015) in 10 pages.
Pavlakos G. et al., "6-dof object pose from semantic keypoints", in arXiv preprint Mar. 14, 2017; Retrieved from <http://www.cis.upenn.edu/~kostas/mypub.dir/pavlakos17icra.pdf> in 9 pages.
Rastegari M. et al., "XNOR-Net: ImageNet Classification Using Binary Convolutional Neural Networks", arXiv eprint arXiv:1603.05279v4; Aug. 2, 2016 in 17 pages.
Redmon J. et al., "You Only Look Once: Unified, Real-Time Object Detection", Proceedings of the IEEE Conference on Computer Vision and Pattern Recognition (Jun. 27-30, 2016) pp. 779-788.
Ren S. et al., "Faster R-CNN: Towards real-time object detection with region proposal networks", arXiv eprint arXiv:1506.01497v3; Jan. 6, 2016 in 14 pages.
Ren, J. et al.: "On Vectorization of Deep Convolutional Neural Networks for Vision Tasks," Association for the Advancement of Artificial Intelligence: arXiv: eprint arXiv:1501.07338v1, Jan. 29, 2015 in 8 pages.
Roberts L. et al., "Machine Perception of Three-Dimensional Solids", Doctoral Thesis MIT; Jun. 1963 in 82 pages.
Rubinstein, M., "Eulerian Video Magnification", YouTube, published May 23, 2012, as archived Sep. 6, 2017, in 13 pages (with video transcription). URL: https://web.archive.org/web/20170906180503/https://www.youtube.com/watch?v=ONZcjs1Pjmk&feature=youtu.be.
Savarese S. et al., "3D generic object categorization, localization and pose estimation", in *Computer Vision*, IEEE 11th International Conference; Oct. 14-21, 2007, in 8 pages.
Saxena A., "Convolutional Neural Networks (CNNS): An Illustrated Explanation", Jun. 29, 2016 in 16 pages; Retrieved from <http://xrds.acm.org/blog/2016/06/convolutional-neural-networks-cnns-illustrated-explanation/>.
Schroff et al., "FaceNet: A unified embedding for Face Recognition and Clustering", arXiv eprint arXiv:1503.03832v3, Jun. 17, 2015 in 10 pages.
Shafiee et al., "ISAAC: A Convolutional Neural Network Accelerator with In-Situ Analog Aritimetic in Crossbars", ACM Sigarch Comp. Architect News (Jun. 2016) 44(3):14-26.
Shao T. et al., "Imagining the Unseen: Stability-based Cuboid Arrangements for Scene Understanding", ACM Transactions on Graphics. (Nov. 2014) 33(6) in 11 pages.
Simonyan K. et al., "Very deep convolutional networks for large-scale image recognition", arXiv eprint arXiv:1409.1556v6, Apr. 10, 2015 in 14 pages.

(56) References Cited

OTHER PUBLICATIONS

Song S. et al., "Deep Sliding Shapes for Amodal 3D Object Detection in RGB-D Images", Proceedings of the IEEE Conference on Computer Vision and Pattern Recognition. Jun. 27-30, 2016 (pp. 808-816).
Song S. et al., "Sliding Shapes for 3D Object Detection in Depth Images", in European Conference on Computer Vision, (Sep. 6, 2014) Springer Publishing (pp. 634-651).
Su H. et al., "Render for CNN: Viewpoint Estimation in Images Using CNNs Trained with Rendered 3D Model Views", in Proceedings of the IEEE International Conference on Computer Vision, Dec. 7-13, 2015 (pp. 2686-2694).
Szegedy et al., "Going deeper with convolutions", The IEEE Conference on Computer Vision and Pattern Recognition; arXiv, eprint arXiv:1409.4842v1, Sep. 17, 2014 in 12 pages.
Szegedy et al., "Rethinking the Inception Architecture for Computer Vision", arXiv eprint arXIV:1512.00567v3, Dec. 12, 2015 in 10 pages.
Tulsiani S. et al., "Viewpoints and Keypoints", Proceedings of the IEEE Conference on Computer Vision and Pattern Recognition; Jun. 7-12, 2015 (pp. 1510-1519).
Villanueva, A. et al., "A Novel Gaze Estimation System with One Calibration Point", IEEE Transactions on Systems, Man, and Cybernetics-Part B:Cybernetics, vol. 38:4, Aug. 2008, in 16 pages.
Wilczkowiak M. et al., "Using Geometric Constraints Through Parallelepipeds for Calibration and 3D Modelling", IEEE Transactions on Pattern Analysis and Machine Intelligence—No. 5055 (Nov. 2003) 27(2) in 53 pages.
Wu J. et al., "Single Image 3D Interpreter Network", European Conference in Computer Vision; arXiv eprint arXiv:1604.08685v2, Oct. 4, 2016 in 18 pages.
Xiang Y. et al., "Data-Driven 3D Voxel Patterns for Object Category Recognition", in Proceedings of the IEEE Conference on Computer Vision and Pattern Recognition, Jun. 7-12, 2015 (pp. 1903-1911).
Xiao J. et al., "Localizing 3D cuboids in single-view images", in Advances in Neural Information Processing Systems; Apr. 25, 2013 in 9 pages.
Yang Y. et al., "Articulated human detection with flexible mixtures of parts", IEEE Transactions on Pattern Analysis and Machine Intelligence. Dec. 2013; 35(121:2878-90.
Zheng Y. et al., "Interactive Images: Cuboid Proxies for Smart Image Manipulation", ACM Trans Graph. (Jul. 2012) 31(4):99-109.
International Search Report and Written Opinion for PCT Application No. PCT/US2015/29679, dated Jul. 6, 2017.
International Search Report and Written Opinion for PCT Application No. PCT/US17/29699, dated Sep. 8, 2017.
International Search Report and Written Opinion for PCT Application No. PCT/US2017/034482, dated Aug. 2, 2017.
International Search Report and Written Opinion for PCT Application No. PCT/US2017/048068, dated Nov. 20, 2017.
International Search Report and Written Opinion for PCT Application No. PCT/US2017/054987, dated Dec. 12, 2017.
International Search Report and Written Opinion for PCT Application No. PCT/US2017/061618, dated Jan. 17, 2018.

\* cited by examiner

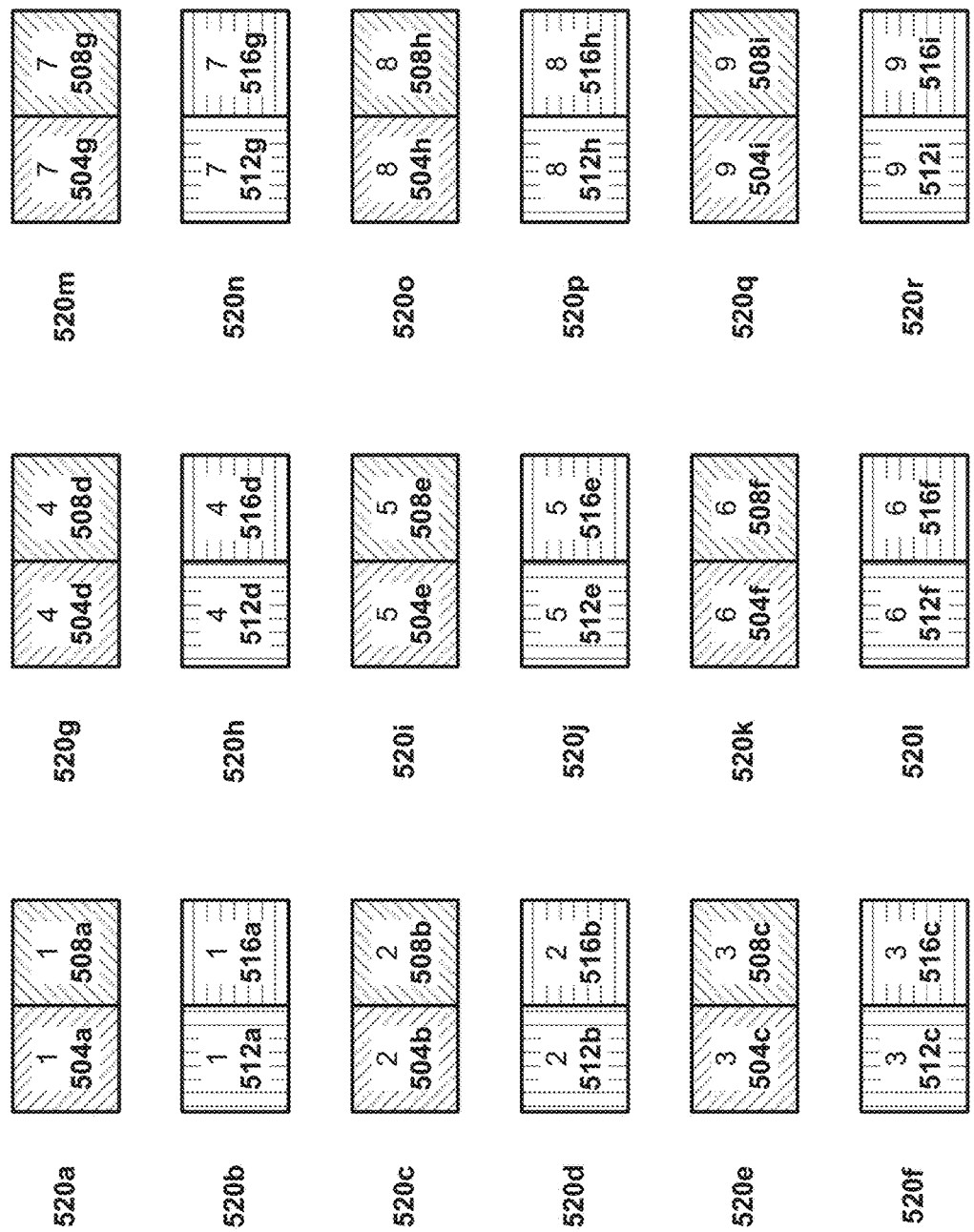

*Figure showing a large grid table labeled M = 8, with columns grouped under 606, 607, 608 (top) and 662, 663, 664 (bottom, "Process on Core 2"), and row groups labeled 605, 613, 621, 629, 637, 645, 653, 661 with corresponding right-side labels 616, 624, 632, 640, 648, 656.*

| | 602 | | | 603 | | | 604 | | |
|---|---|---|---|---|---|---|---|---|---|
| 0 / 601a | 24 / 601b | 48 / 601c | 72 / 602a | 96 / 602b | 120 / 602c | 144 / 603a | 168 / 603b | 192 / 603c | 216 / 604a | 240 / 604b | 264 / 604c |

(Figure 7 shows a grid representing KERNEL STACK 208, with M = 8 rows of blocks and N = 8 columns, organized into processes on Core 1 (658), Core 2 (659), Core 3 (parts), and Core 4 (660). Row labels on the left side: 601, 609, 617, 625, 633, 641, 649, 657. Column groupings at top: 602, 603, 604.)

The grid contains cells numbered sequentially 0-287 with sub-labels (e.g., 601a-601i, 602a-602i, etc.):

Row group 601:
- 0/601a, 24/601b, 48/601c, 72/602a, 96/602b, 120/602c, 144/603a, 168/603b, 192/603c, 216/604a, 240/604b, 264/604c
- 1/601d, 25/601e, 49/601f, 73/602d, 97/602e, 121/602f, 145/603d, 169/603e, 193/603f, 217/604d, 241/604e, 265/604f
- 2/601g, 26/601h, 50/601i, 74/602g, 98/602h, 122/602i, 146/603g, 170/603h, 194/603i, 218/604g, 242/604h, 266/604i Row group 609 (with 612 on right):
- 3/609a, 27/609b, 51/609c, 75/610a, 99/610b, 123/610c, 147/611a, 171/611b, 195/611c, 219/612a, 243/612b, 267/612c
- 4/609d, 28/609e, 52/609f, 76/610d, 100/610e, 124/610f, 148/611d, 172/611e, 196/611f, 220/612d, 244/612e, 268/612f
- 5/609g, 29/609h, 53/609i, 77/610g, 101/610h, 125/610i, 149/611g, 173/611h, 197/611i, 221/612g, 245/612h, 269/612i Row group 617 (with 620 on right):
- 6/617a, 30/617b, 54/617c, 78/618a, 102/618b, 126/618c, 150/619a, 174/619b, 198/619c, 222/620a, 246/620b, 270/620c
- 7/617d, 31/617e, 55/617f, 79/618d, 103/618e, 127/618f, 151/619d, 175/619e, 199/619f, 223/620d, 247/620e, 271/620f
- 8/617g, 32/617h, 56/617i, 80/618g, 104/618h, 128/618i, 152/619g, 176/619h, 200/619i, 224/620g, 248/620h, 272/620i Row group 625 (with 628 on right):
- 9/625a, 33/625b, 57/625c, 81/626a, 105/626b, 129/626c, 153/627a, 177/627b, 201/627c, 225/628a, 249/628b, 273/628c
- 10/625d, 34/625e, 58/625f, 82/626d, 106/626e, 130/626f, 154/627d, 178/627e, 202/627f, 226/628d, 250/628e, 274/628f
- 11/625g, 35/625h, 59/625i, 83/626g, 107/626h, 131/626i, 155/627g, 179/627h, 203/627i, 227/628g, 251/628h, 275/628i Row group 633 (with 636 on right):
- 12/633a, 36/633b, 60/633c, 84/634a, 108/634b, 132/634c, 156/635a, 180/635b, 204/629c, 228/636a, 252/636b, 276/636c
- 13/633d, 37/633e, 61/633f, 85/634d, 109/634e, 133/634f, 157/635d, 181/635e, 205/635f, 229/636d, 253/636e, 277/636f
- 14/633g, 38/633h, 62/633i, 86/634g, 110/634h, 134/634i, 158/635g, 182/635h, 206/635i, 230/636g, 254/636h, 278/636i Row group 641 (with 644 on right):
- 15/641a, 39/641b, 63/641c, 87/642a, 111/642b, 135/642c, 159/643a, 183/643b, 207/643c, 231/644a, 255/644b, 279/644c
- 16/641d, 40/641e, 64/641f, 88/642d, 112/642e, 136/642f, 160/643d, 184/643e, 208/643f, 232/644d, 256/644e, 280/644f
- 17/641g, 41/641h, 65/641i, 89/642g, 113/642h, 137/642i, 161/643g, 185/643h, 209/643i, 233/644g, 257/644h, 281/644i Row group 649 (with 652 on right):
- 18/649a, 42/649b, 66/649c, 90/650a, 114/650b, 138/650c, 162/651a, 186/651b, 210/651c, 234/652a, 258/652b, 282/652c
- 19/649d, 43/649e, 67/649f, 91/650d, 115/650e, 139/650f, 163/651d, 187/651e, 211/651f, 235/652d, 259/652e, 283/652f
- 20/649g, 44/649h, 68/649i, 92/650g, 116/650h, 140/650i, 164/651g, 188/651h, 212/651i, 236/652g, 260/652h, 284/652i Row group 657:
- 21/657a, 45/657b, 69/657c, 93/658a, 117/658b, 141/658c, 165/659a, 189/659b, 213/659c, 237/660a, 261/660b, 285/660c
- 22/657d, 46/657e, 70/657f, 94/658d, 118/658e, 142/658f, 166/659d, 190/659e, 214/659f, 238/660d, 262/660e, 286/660f
- 23/657g, 47/657h, 71/657i, 95/658g, 119/658h, 143/658i, 167/659g, 191/659h, 215/659i, 239/660g, 263/660h, 287/660i Bottom labels: 658, 659, 660

Process on Core 1 | Process on Core 2 | Process on Core 3 | Process on Core 4

200, M = 8, N = 8

KERNEL STACK 208

| | | | | | | | | | | | |
|---|---|---|---|---|---|---|---|---|---|---|---|
| 288 605a | 312 605b | 336 605c | 360 606a | 384 606b | 408 606c | 432 607a | 456 607b | 480 607c | 504 608a | 528 608b | 552 608c |
| 289 605d | 313 605e | 337 605f | 361 606d | 385 606e | 409 606f | 433 607d | 457 607e | 481 607f | 505 608d | 529 608e | 553 608f |
| 290 605g | 314 605h | 338 605i | 362 606g | 386 606h | 410 606i | 434 607g | 458 607h | 482 607i | 506 608g | 530 608h | 554 608i |
| 291 613a | 315 613b | 339 613c | 363 614a | 387 614b | 411 614c | 435 615a | 459 615b | 483 615c | 507 616a | 531 616b | 555 616c |
| 292 613d | 316 613e | 340 613f | 364 614d | 388 614e | 412 614f | 436 615d | 460 615e | 484 615f | 508 616d | 532 616e | 556 616f |
| 293 613g | 317 613h | 341 613i | 365 614g | 389 614h | 413 614i | 437 615g | 461 615h | 485 615i | 509 616g | 533 616h | 557 616i |
| 294 621a | 318 621b | 342 621c | 366 622a | 390 622b | 414 622c | 438 623a | 462 623b | 486 623c | 510 624a | 534 624b | 558 624c |
| 295 621d | 319 621e | 343 621f | 367 622d | 391 622e | 415 622f | 439 623d | 463 623e | 487 623f | 511 624d | 535 624e | 559 624f |
| 296 621g | 320 621h | 344 621i | 368 622g | 392 622h | 416 622i | 440 623g | 464 623h | 488 623i | 512 624g | 536 624h | 560 624i |
| 297 629a | 321 629b | 345 629c | 369 630a | 393 630b | 417 630c | 441 631a | 465 631b | 489 631c | 513 632a | 537 632b | 561 632c |
| 298 629d | 322 629e | 346 629f | 370 630d | 394 630e | 418 630f | 442 631d | 466 631e | 490 631f | 514 632d | 538 632e | 562 632f |
| 299 629g | 323 629h | 347 629i | 371 630g | 395 630h | 419 630i | 443 631g | 467 631h | 491 631i | 515 632g | 539 632h | 563 632i |
| 300 637a | 324 637b | 348 637c | 372 638a | 396 638b | 420 638c | 444 639a | 468 639b | 492 629c | 516 640a | 540 640b | 564 640c |
| 301 637d | 325 637e | 349 637f | 373 638d | 397 638e | 421 638f | 445 639d | 469 639e | 493 639f | 517 640d | 541 640e | 565 640f |
| 302 637g | 326 637h | 350 637i | 374 638g | 398 638h | 422 638i | 446 639g | 470 639h | 494 639i | 518 640g | 542 640h | 566 640i |
| 303 645a | 327 645b | 351 645c | 375 646a | 399 646b | 423 646c | 447 647a | 471 647b | 495 647c | 519 648a | 543 648b | 567 648c |
| 304 645d | 328 645e | 352 645f | 376 646d | 400 646e | 424 646f | 448 647d | 472 647e | 496 647f | 520 648d | 544 648e | 568 648f |
| 305 645g | 329 645h | 353 645i | 377 646g | 401 646h | 425 646i | 449 647g | 473 647h | 497 647i | 521 648g | 545 648h | 569 648i |
| 306 653a | 330 653b | 354 653c | 378 654a | 402 654b | 426 654c | 450 655a | 474 655b | 498 655c | 522 656a | 546 656b | 570 656c |
| 307 653d | 331 653e | 355 653f | 379 654d | 403 654e | 427 654f | 451 655d | 475 655e | 499 655f | 523 656d | 547 656e | 571 656f |
| 308 653g | 332 653h | 356 653i | 380 654g | 404 654h | 428 654i | 452 655g | 476 655h | 500 655i | 524 656g | 548 656h | 572 656i |
| 309 661a | 333 661b | 357 661c | 381 662a | 405 662b | 429 662c | 453 663a | 477 663b | 501 663c | 525 664a | 549 664b | 573 664c |
| 310 661d | 334 661e | 358 661f | 382 662d | 406 662e | 430 662f | 454 663d | 478 663e | 502 663f | 526 664d | 550 664e | 574 664f |
| 311 661g | 335 661h | 359 661i | 383 662g | 407 662h | 431 662i | 455 663g | 479 663h | 53 663i | 527 664g | 551 664h | 575 664i |

605, 613, 621, 629, 637, 645, 653, 661

606, 607, 608, 616, 624, 632, 640, 648, 656

662 — Process on Core 5
663 — Process on Core 6
Process on Core 7
664 — Process on Core 8

| (0,0,0) | (1,0,0) | (2,0,0) | (3,0,0) | (0,0,1) | (1,0,1) | (2,0,1) | (3,0,1) | (0,0,2) | (1,0,2) | (2,0,2) | (3,0,2) |
| (0,1,0) | (1,1,0) | (2,1,0) | (3,1,0) | (0,1,1) | (1,1,1) | (2,1,1) | (3,1,1) | (0,1,2) | (1,1,2) | (2,1,2) | (3,1,2) |
| (0,2,0) | (1,2,0) | (2,2,0) | (3,2,0) | (0,2,1) | (1,2,1) | (2,2,1) | (3,2,1) | (0,2,2) | (1,2,2) | (2,2,2) | (3,2,2) |
| (0,3,0) | (1,3,0) | (2,3,0) | (3,3,0) | (0,3,1) | (1,3,1) | (2,3,1) | (3,3,1) | (0,3,2) | (1,3,2) | (2,3,2) | (3,3,2) |
| (0,4,0) | (1,4,0) | (2,4,0) | (3,4,0) | (0,4,1) | (1,4,1) | (2,4,1) | (3,4,1) | (0,4,2) | (1,4,2) | (2,4,2) | (3,4,2) |

REORDERED INPUT MAP 420

*FIG. 9B*

$$A \text{ (INPUT MAP)} \begin{bmatrix} \underset{(0,0)}{1} & \cdots & \underset{(0,0)}{M} & \underset{(0,1)}{1} & \cdots & \underset{(0,1)}{M} & \underset{(0,2)}{1} & \cdots & \underset{(0,2)}{M} \\ \underset{(0,1)}{1} & \cdots & \underset{(0,1)}{M} & \underset{(0,2)}{1} & \cdots & \underset{(0,2)}{M} & \underset{(0,3)}{1} & \cdots & \underset{(0,3)}{M} \\ \underset{(0,2)}{1} & \cdots & \underset{(0,2)}{M} & \underset{(0,3)}{1} & \cdots & \underset{(0,3)}{M} & \underset{(0,4)}{1} & \cdots & \underset{(0,4)}{M} \\ & & & & \vdots & & & & \end{bmatrix}$$

$(W_{OUTPUT} + 2) \times (3M)$

INPUT CHANNEL NUMBER = [0, M)
(ROW IN CHANNEL, COLUMN IN CHANNEL)

$\times$ $$B \text{ (KERNELS)} \begin{bmatrix} [1,1](0) & [1,2](0) & \cdots & [1,N](0) \\ [1,1](1) & [1,2](1) & \cdots & [1,N](1) \\ [1,1](2) & [1,2](2) & \cdots & [1,N](2) \\ [2,1](0) & [2,2](0) & \cdots & [2,N](0) \\ [2,1](1) & [2,2](1) & \cdots & [2,N](1) \\ [2,1](2) & [2,2](2) & \cdots & [2,N](2) \\ \vdots & \vdots & & \vdots \\ [M,1](0) & [M,2](0) & \cdots & [M,N](0) \\ [M,1](1) & [M,2](1) & \cdots & [M,N](1) \\ [M,1](2) & [M,2](2) & \cdots & [M,N](2) \end{bmatrix}$$

$(3M) \times (N)$

[ROW IN KERNEL STACK, COLUMN IN KERNEL STACK] (ELEMENT IN KERNEL = [0, 3))

= ONE ROW OF C (OUTPUT MAP)

$(1) \times (W_{OUTPUT} * N)$

FIG. 11

EFFICIENT DATA LAYOUTS FOR CONVOLUTIONAL NEURAL NETWORKS

CROSS-REFERENCE TO RELATED APPLICATIONS

This application claims priority to, and is a continuation of, U.S. patent application Ser. No. 15/724,142, which was filed on Oct. 3, 2017 and is entitled "EFFICIENT DATA LAYOUTS FOR CONVOLUTIONAL NEURAL NETWORKS." U.S. patent application Ser. No. 15/724,142 claims the benefit of priority to U.S. Patent Application No. 62/403,930, filed Oct. 4, 2016, entitled "EFFICIENT DATA LAYOUTS FOR CONVOLUTIONAL NEURAL NETWORKS." Each of the above-recited applications is hereby incorporated herein by reference in their entirety. Any and all applications for which a foreign or domestic priority claim is identified in the Application Data Sheet as filed with the present application are hereby incorporated by reference in their entirety under 37 CFR 1.57.

COPYRIGHT AND TRADEMARK NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Field

The present disclosure relates generally to systems and methods for implementing convolutional neural network and more particularly to efficient data layouts for implementing a convolutional layer of a convolutional neural network.

Description of the Related Art

A convolutional neural network (CNN) describes a topology for an artificial neural network. A CNN can be used for eye image segmentation and eye tracking. A CNN can be used for other classification problems such as gesture recognition. To determine output activation maps of a convolutional layer of a CNN, the convolutional layer can convolve input activation maps and kernels of the convolutional layer. Computing convolutions can be computationally expensive or intensive.

SUMMARY

Performing convolution operations efficiently in a hardware computing system can present many challenges. Accordingly, the present disclosure provides examples of systems and methods for efficient implementation of convolutional neural networks. The systems and methods can be used in any application in which CNNs are utilized such as, for example, augmented reality, mixed reality, virtual reality, machine learning, computer vision, facial recognition, eye tracking, object recognition, character, language, or speech analysis, computer games, and so forth.

In one aspect, a method for efficient implementation of a convolutional layer of a convolutional neural network is disclosed. The method is under control of a hardware processor and comprises: receiving a convolutional layer of a convolutional neural network, wherein the convolutional layer comprises kernels in a kernel stack, and wherein the kernels of the kernel stack are in a basic kernel layout; reordering weight values of the kernels of the kernel stack from the basic kernel layout into a tile kernel layout comprising a plurality of kernel tiles, wherein a kernel tile comprises a plurality of kernel runnels, and wherein a kernel runnel comprises a number of the weight values of the kernels of the kernel stack; receiving input activation maps of the convolutional layer, wherein the input activation maps are in a basic input activation map layout; reordering pixel values of the input activation maps from the basic input activation map layout into an interleaved input activation map layout comprising a plurality of clusters of input activation map pixels; and determining output activation maps of the convolutional layer from the plurality of kernel tiles and the plurality of clusters of input activation map pixels, wherein the output activation maps are in an interleaved output activation map layout comprising a plurality of clusters output activation map pixels.

In another aspect, a method for efficient implementation of a convolutional layer of a convolutional neural network is disclosed. The method is under control of a hardware processor and comprises: receiving a convolutional layer of a convolutional neural network comprising kernels in a kernel stack, wherein the kernels of the kernel stack are in a tile kernel layout comprising a plurality of kernel tiles of kernel runnels; receiving input activation maps of the convolutional layer, wherein the input activation maps are in a basic input activation map layout; reordering pixel values of the input activation maps from the basic input activation map layout into an interleaved input activation map layout comprising a plurality of clusters of input activation map pixels; and determining output activation maps of the convolutional layer from the plurality of kernel tiles and the plurality of clusters of input activation map pixels, wherein the output activation maps are in an interleaved output activation map layout comprising a plurality of clusters of output activation map pixels.

In yet another aspect, a method for efficient implementation of a convolutional layer of a convolutional neural network is disclosed. The method is under control of a hardware processor and comprises: receiving a convolutional layer of a convolutional neural network comprising kernels in a kernel stack, wherein the kernels of the kernel stack are in a tile kernel layout comprising a plurality of kernel tiles of kernel runnels; receiving input activation maps of the convolutional layer, wherein the input activation maps are in an interleaved input activation map layout; and determining output activation maps of the convolutional layer from the plurality of kernel tiles and the plurality of clusters of input activation map pixels, wherein the output activation maps are in an interleaved output activation map layout comprising a plurality of clusters of output activation map pixels.

In a further aspect, a method for efficient implementation of a convolutional layer of a convolutional neural network is disclosed. The method is under control of a hardware processor and comprises: receiving a convolutional layer of a convolutional neural network comprising kernels in a kernel stack, wherein the kernels of the kernel stack are in a tile kernel layout comprising a plurality of kernel tiles of kernel runnels, and wherein a dimension of a kernel is one; receiving input activation maps of the convolutional layer, wherein the input activation maps are in a basic input activation map layout; reordering pixel values of the input activation maps from the basic input activation map layout into an interleaved input activation map layout comprising a plurality of clusters of input activation map pixels by striding; and determining output activation maps of the convolutional layer from the plurality of kernel tiles and the plurality of input activation map tiles, wherein the output activation maps are in a transposed, interleaved output activation map layout comprising a plurality of clusters of output activation map.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

BRIEF DESCRIPTION OF THE DRAWINGS

FIGS. 5A-5C schematically illustrate examples of reordering weight values of kernels of a kernel stack into a tile format comprising tiles of runnels.

FIGS. 6A and 6B schematically illustrate examples reordering of kernel weights of a kernel stack into a tile format comprising tiles of runnels.

FIG. 7 schematically illustrates another example reordering of kernel weights of a kernel stack into a tile format comprising tiles of runnels.

FIGS. 9A-9B schematically illustrate an example 3D convolutional layer of a convolutional neural network for illustrating determining output activation maps tile by tile with kernel stack runnels straddling multiple rows of kernel stack weight values.

FIG. 11 schematically illustrates an example of reordering weight values of kernels of a kernel stack into a tile format comprising tiles of runnels.

Figure 1:
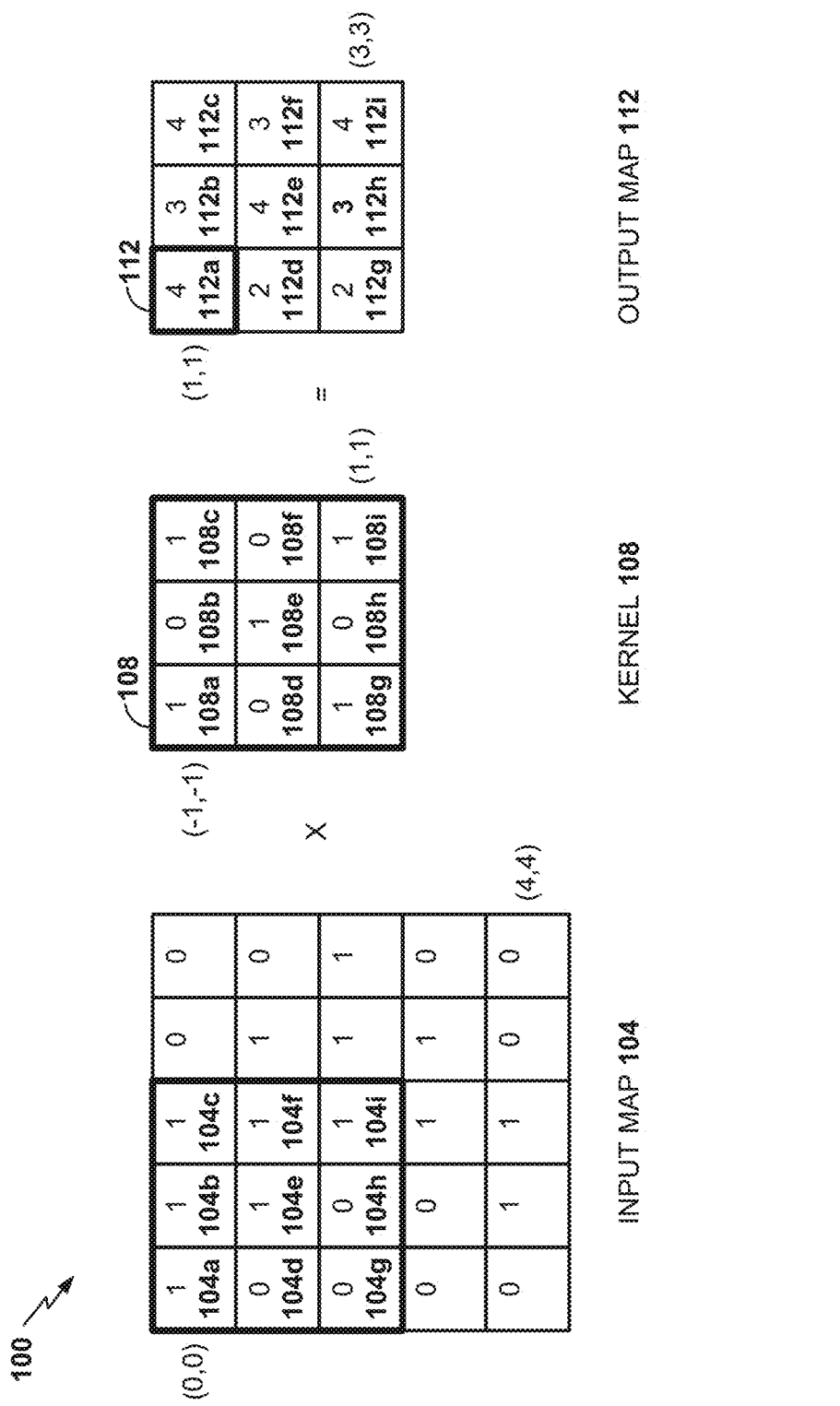
FIG. 1 shows a schematic illustration of an example two-dimensional (2D) convolution.

Throughout the drawings, reference numbers may be re-used to indicate correspondence between referenced elements. The drawings are provided to illustrate example embodiments described herein and are not intended to limit the scope of the disclosure.

DETAILED DESCRIPTION

Overview

Models representing data relationships and patterns, such as functions, algorithms, systems, and the like, may accept input, and produce output that corresponds to the input in some way. For example, a model may be implemented as a machine learning method such as a convolutional neural network (CNN) or a deep neural network (DNN). Deep learning is part of a broader family of machine learning methods based on the idea of learning data representations as opposed to task specific algorithms—shows a great deal of promise in solving audio-visual computational problems critical to augmented reality, mixed reality, virtual reality, and machines intelligence. In machine learning, a convolutional neural network (CNN, or ConvNet) can include a class of deep, feed-forward artificial neural networks, and CNNs have successfully been applied to analyzing visual imagery. Machine learning methods include a family of methods that can enable robust and accurate solutions to a wide variety of problems, including eye image segmentation and eye tracking. However, machine learning methods can be computationally intensive or expensive. Accordingly, performing machine learning methods efficiently can enable applications of machine learning methods on embedded platforms with limited resources.

The parameters of a machine learning model can be learned in a process referred to as training. For example, a machine learning model can be trained using training data that includes input data and the correct or preferred output of the model for the corresponding input data. The machine learning model can repeatedly process the input data, and the parameters (e.g., the weight values) of the machine learning model can be modified in what amounts to a trial-and-error process until the model produces (or "converges" on) the correct or preferred output. For example, the modification of weight values may be performed through a process referred to as "back propagation." Back propagation includes determining the difference between the expected model output and the obtained model output, and then determining how to modify the values of some or all parameters of the model to reduce the difference between the expected model output and the obtained model output.

A convolutional neural network (CNN), a subcategory of the machine learning methods, can be used in a variety of applications, such as segmenting eye images. An eye image can include the periocular region of the eye, which includes the eye and portions around the eye such as eyelids, eyebrows, eyelashes, and skin surrounding the eye. An eye image can be segmented to generate the pupil region, iris region, or sclera region of an eye in the eye image. An eye image can also be segmented to generate the background of the eye image, including skin such as an eyelid around an eye in the eye image. The segmented eye image can be used for iris identification and eye tracking.

Eye tracking can be useful in a variety of virtual reality (VR), augmented reality (AR), or mixed reality (MR) applications. For example, a virtual menu displayed to a user of a VR, AR, or MR device may be positioned spatially based on the orientations of the user's eyes (e.g., with respect to yaw, pitch, or roll of the one or more eyes). As the user's eyes move, the virtual menu may be repositioned accordingly. As another example, a user of a VR, AR, or MR device may scroll through a virtual menu by eye movements. As a further example, a user may give a command to a VR, AR, or MR device using eye movements. Furthermore, eye tracking can be used for alignment methods such as display alignment and proper rendering. Accordingly, because CNNs can be useful for numerous applications, efficient implementation of CNNs that achieve a high degree of hardware utilization can enable applications of CNNs, such as robust implementation of eye tracking and other computer vision methods, on embedded devices (e.g., VR, AR, or MR devices) with limited resources.

Systems and methods disclosed herein can enable efficient implementations of CNNs, on computing devices such as a computer server, a personal computer, a tablet computer, a mobile device, or an embedded device. A computing device can include a vector processor, a very long instruction word (VLIW) vector processor, or single instruction, multiple data (SIMD) processors. Efficient implementations of CNNs can be based on efficient data layouts of input activation maps, kernels, or output activation maps.

A convolutional layer of a CNN can include a kernel stack of kernels. A kernel of a convolutional layer, when applied to its input, can produce a resulting output activation map showing the response to that particular learned kernel. However, computing convolutions can be computationally expensive or intensive. And a convolutional layer can be computationally expensive. For example, convolutional layers can be the most computationally expensive layers of a CNN because they require more computations than other types of CNN layers (e.g., subsampling layers). The resulting output activation map can then be processed by another layer of the CNN. Other layers of the CNN can include, for example, a normalization layer (e.g., a brightness normalization layer, a batch normalization (BN) layer, a local contrast normalization (LCN) layer, or a local response normalization (LRN) layer), a rectified linear layer, an upsampling layer, a concatenation layer, a pooling layer, a fully connected layer, a linear fully connected layer, a softsign layer, a recurrent layer, or any combination thereof.

A kernel stack of a CNN can include M rows of kernels and N columns of kernels, with each column also referred to as a filter bank of the kernel stack. The kernels of the kernel stack can have the same width and the same height. The convolutional layer can have M input channels for receiving M input activation maps. The convolutional layer can have N output channels for producing N output activation maps. Each output activation map can be a result of a three-dimensional convolution of a filter bank of the kernel stack and the corresponding input activation maps.

In some implementations, to efficiently implement a convolutional layer, weight values of the kernels of the kernel stack can be reordered into a tile layout for kernels. The tile layout for kernels comprises tiles of runnels of weight values. A runnel can be an ordered list of weight values with the following two properties. First, the number of weight values in a runnel can be the same as the number of weight values a processor register such as a SIMD register can contain at once given the data type of the weight values. For example, for a 128-bit SIMD register, a runnel can contain eight half-precision floating point weight values or four single-precision floating point weight values. Second, runnels can be filled iteratively by traversing along the width dimension of the kernel stack (M), followed by the height dimension of the kernel stack (N), followed by the width dimension of the individual kernel, and followed by the height dimension of the individual kernel. The traversal continues until the runnel is completely filled with weight values of kernels of the kernel stack.

In some implementations, pixel values of the input activation maps can be reordered into an interleaved layout. For example, after a convolutional layer receives M input activation maps, the pixel values of the input activation maps can be reordered from a basic layout for input activation maps to an interleaved layout for input activation maps. In some implementations, the pixel values can be ordered such that the first pixel value of the first input activation map can be followed by the first pixel of the second input activation map, and so on until the first pixel value of the last (i.e., Mth) input activation map. The first pixel value of the last input activation map can be followed by the second pixel value of the first input activation map, the second pixel value of the second input activation map, and so on until the second pixel value of the last input activation map. This reordering can continue until all the pixel values of all of the input activation maps of the convolutional layer have been similarly ordered. The reordering process can result in a large reordered input activation map, which includes all individual input activation maps. Each indexed location in the reordered input activation map can include a cluster of the pixel values from the individual input activation maps at that index. Advantageously, this reordering needs to be performed at most once by, for example, an initial convolutional layer or a first convolutional layer of the CNN. In some embodiments, no reordering may be necessary. For example, the first convolution layer can convolve one input activation map and produces multiple output activation maps. In this case, no reordering of the pixel values of the input activation map may be necessary. Convolving one input activation map to generate multiple output activation maps may be considered as performing a number of two-dimensional (2D) convolutions on one input activation map in parallel. Advantageously, the methods disclosed herein may allow efficient computations of 2D convolutions on a single input activation map.

Output activation maps of the convolutional layer in an interleaved layout can be determined tile by tile. For example, for a cluster of weight values of the output activation maps: perform a fused-multiply-add operation on output activation map pixel values, reordered input activation map pixel values, and kernel tile. In some implementations, the output activation maps of the convolutional layer in an interleaved layout can be ordered into a basic layout for output activation maps.

An efficiently implemented CNN based on the systems and methods disclosed herein can advantageously enable efficient computation of a convolution of an input activation map with a kernel in terms of the processing or mathematically aspect of convolutional layer. Thus, an application based on the CNN may operate at interactive rates on a computing device such as such as a computer server, a personal computer, a tablet computer, a mobile device, or an embedded device. In addition, in some embodiments, an efficiently implemented CNN can allow high utilization of the limited amount of fast memory available on computing devices (e.g., embedded processors of embedded devices) because data replication is unnecessary, a huge improvement for implementing a CNN using embedded processors. Furthermore, the data layouts disclosed herein can enable efficient processing of other layers of a CNN that are not convolutional layers (e.g., up sampling and down sampling layers). Without having to rearrange input activation maps, the input activation maps can be down sampled or up sampled in parallel by a vector processor. Data reordering may be done once or not at all, depending on the structure of the CNN. Thus, the benefits of the systems and methods disclosed herein extend beyond efficient convolution computations.

Furthermore, an efficiently implemented CNN can have high performance or low power consumption. In some implementations, the systems and methods disclosed herein can advantageously reduce power consumption of a computing device implementing a CNN because the processor of the computing device may be in an on state or a high frequency state for a shorter period of time. Optimizing the CNN, for example a convolutional layer of the CNN, may achieve improved, optimal, or maximum performance at a given power envelope, which can be useful for computing devices (e.g., embedded devices) with constrained performance or power envelop.

Convolutions are both computationally expensive, and non-trivial to map to the capabilities of underlying vector processors. Since maximizing utilization of the hardware resources available (e.g., compute, memory, and generally speaking processor die space allocated to the two) at the lowest cost (e.g., monetary, power consumption, and heat generation) is very much desirable, optimization of this computationally heavy operation both at the hardware and software level using the methods of the present disclosure can be advantageous.

The disclosed methods reorder the data such that convolutions can be performed in an improved or optimal fashion on vector processors both with regards to compute (e.g., in the sense that the number of multiply-accumulates required to perform convolutions using this method is reduced to approximately the minimum number of operations mathematically required to carry out the operation correctly), or with regards to memory usage (e.g., in the sense that unlike competing methods such as im2col, little or no extra amount of memory is required—im2col achieves high computational efficiency at the cost of duplication of data which makes it inefficient memory-wise). The embodiments disclosed herein balance the tradeoff between flexibility, performance, and ease of implementation.

Example Two-Dimensional Convolution

One approach to solve complex problems can be the divide and conquer approach by breaking the problem down to simpler, more manageable components, and continuing doing so recursively until the complex problem can be entirely divided into constituents that can be easier to solve as a unit. These subproblems can be thought of as nodes or vertices in a graph.

Having solved theses subproblems, their results need to be somehow aggregated to arrive at the solution to the original, complex problem. Methods for combining the results of the subproblems can range from simple (e.g., an element wise addition) to a complex mathematical formula. The operations that combine the results of the subproblems can be represented as connections or edges in a graph.

This graph of nodes and edges (corresponding to subproblems and combining the results of the subproblems) can form a network which receives the network's input, and performs a series of computations on the input and intermediate results to arrive at the desired output of the network. The network can be referred to as a neural network or an artificial neural network in that it represents how a mammalian brain functions, with neurons as vertices and axons as the edges that form this graph. The network is artificial in the sense that it is a computational entity, analogous to biological neural networks in animals, but implemented by computing devices.

A convolution operation can be a mathematical operation on two functions (for example continuous functions f and g) to produces a third function. The third function can be considered as a modified version of one of the two original functions, based on the integral of the pointwise multiplication of the two functions as a function of the amount that one of the original functions is translated. A convolution operation on the two functions f and g can be expressed as Equation (1) below:

$$(f*g)(t) = \int_{-\infty}^{+\infty} f(\tau)g(t-\tau)d\tau. \qquad \text{Equation (1)}$$

Thus, to determine the convolution of two functions f and g, around the variable t can be summarized by the pseudo-codes below:

(1) Set a sum variable to zero.
(2) From minus infinity to plus infinity for the $\tau$ variable:
  (2a) Take $\tau$ to be the next value in the list of above range.
  (2b) Calculate values of the functions f and g at points $f(\tau)$ and $g(t-\tau)$.
  (2c) Multiply the two values calculated at (2b) together.
  (2d) Add up the value calculated at (2c) to the sum variable.
  (2e) Go to (2a) and repeat the process.
End of (2)

In image processing, convolutions of images can be determined similarly. For example, a convolutional layer can receive as its input an input activation map which can be analogous to the function g above. The convolutional layer can convolve the input activation with a kernel, which can be analogous to the function f above, to determine an output activation map of the convolutional layer. The kernel can be a matrix, that is, a two-dimensional array of weight values. The multiplication of values of the input activation map and the kernel is analogous to the action (2c) above. Unlike the functions f and g which are continuous, the input activation map comprises discrete pixel values and the kernel comprises discrete weight values. Thus, the integral in Equation (1) can be replaced with a summation.

FIG. 1 shows a schematic illustration of an example 100 two-dimensional (2D) convolution. The example 2D convolution 100 convolves an input activation map 104 (also referred to as an input feature map, an input image, or an input channel) with a kernel 108 to determine an output activation map 112 (also referred to as an output feature map, an output image, or an output channel). The input activation map 104, with a width of five pixels and a height of five pixels, includes 25 pixel values. The numbers in the input activation map 104 denote pixel values of the input activation map 104. As shown, the five rows of the input activation map 104 can have pixel values (1, 1, 1, 0, 0), (0, 1, 1, 1, 0), (0, 0, 1, 1, 1), (0, 0, 1, 1, 0), and (0, 1, 1, 0, 1) respectively. The kernel 108 as shown is a 3×3 kernel, that is, the kernel 108 has a height of three weight values and a width of three weight values. The numbers in the kernel 108 denote weight values of the kernel 108. The three rows of weight values of the kernel 108 can be (1, 0, 1), (0, 1, 0), and (1, 0, 1).

A convolution of the input activation map 104 with the kernel 108 can be expressed by Equation (2) below:

$$(f*g)(t) = \Sigma_{\tau=(-1,-1)}^{(+1,+1)} f(\tau)g(t-\tau), \qquad \text{Equation (2)}$$

where $\tau$ represents positions of the weight values of the kernel 108, and t represents positions of pixel values of the output activation maps 112. A weight value 108e at the center of the kernel 108 can have a $\tau$ value of (0, 0). A weight value 108a can have a $\tau$ value of (−1, −1). A weight value 108g can have a $\tau$ value of (−1, +1). A weight value 108i can have a $\tau$ value of (+1, +1).

The numbers in the output activation map 112 denote the pixel values of the output activation map 112. A pixel value 112e at the center of the output activation map 112 is at position (2, 2) of the output activation map 112. A pixel value 112a can be at position (1, 1) of the output activation map 112. A pixel value 112g can be at position (1, 3) of the output activation map 112. A pixel value 112i can be at position (3, 3) of the output activation map 112.

To determine the pixel value 112a at position (1, 1) of the output activation map 112, the following multiplications can be performed: A pixel value 104a can be multiplied by a weight value 108j; A pixel value 104b can be multiplied by a weight value 108i; A pixel value 104c can be multiplied by a weight value 108h; A pixel value 104e can be multiplied by a weight value 108g; A pixel value 104f can be multiplied by a weight value 108f; A pixel value 104g can be multiplied by a weight value 108e; A pixel value 104h can be multiplied by a weight value 108c; A pixel value 104i can be multiplied by a weight value 108b; and A pixel value 104j can be multiplied by a weight value 108a. Furthermore, an accumulation or a summation of the results of the above multiplications can be performed.

Other pixel values of the output activation map 112 can be similarly determined. Equation (3) below shows determining pixel values 112a-112i of the output activation map 112:

$$(f*g) = ((f*g)(t) | t = (+1, +1) \text{ to } (+3, +3)). \quad \text{Equation (3)}$$
$$= (4, 3, 4, 2, 4, 3, 2, 3, 4)$$

Example Three-Dimensional Convolutional Layer

Figure 2:
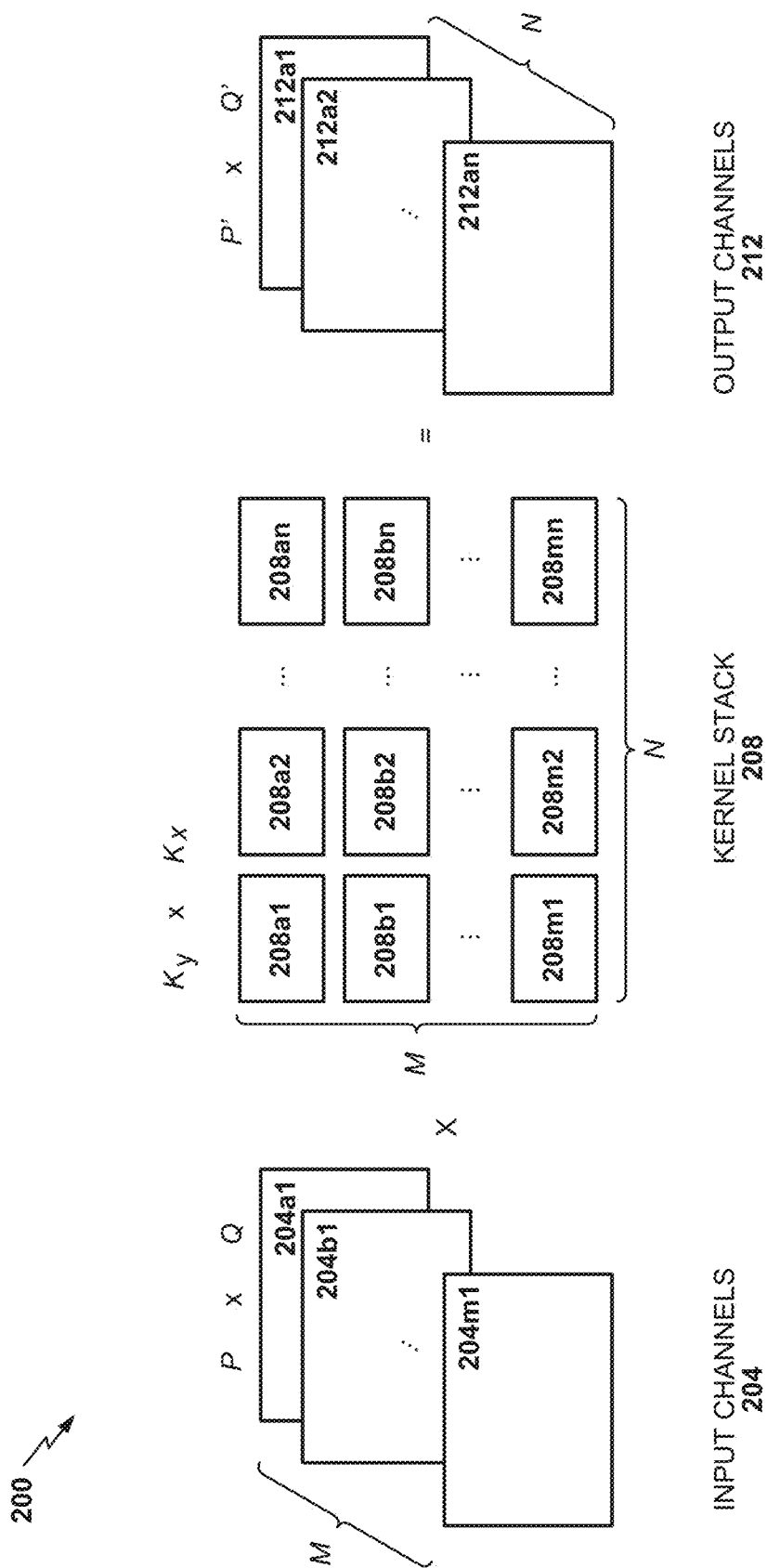
FIG. 2 schematically illustrates an example three-dimensional (3D) convolutional layer of a convolutional neural network.

FIG. 2 schematically illustrates an example three-dimensional convolutional layer 200 of a convolutional neural network. The convolutional layer 200 can have M input channels 204 for receiving M input activation maps 204a1, 204b1, . . . , and 204m1. An input activation map can have an input activation map width of Q and an input activation map height of P. The input activation maps 204a1, 204b1, . . . , and 204m1 can have the same input activation map width Q and input activation map height P.

The convolutional layer 200 can include a kernel stack 208 of all kernels of the convolutional layer 200. The kernel stack 208 can include kernels 208a1-208an, 208b1-208bn, and 208m1-208mn. The kernel stack 208 includes M rows of kernels The kernel stack 208 includes N columns of kernels with each column also referred to as a filter bank of the kernel stack 208. For example, the column of kernels 208a1, 208b1, . . . , and 208m1 forms a filter bank of the kernel stack 208. A kernel of the kernel stack 208 can have a kernel width of $K_x$ weight values and a kernel height of $K_y$ weight values with a total of $K_y*K_x$ weight values. The kernels 208a1-208an, 208b1-208bn, and 208m1-208mn of the kernel stack 208 can have the same kernel width $K_x$ and kernel height $K_y$.

The convolutional layer 200 can have N output channels 212 for producing N output activation maps 212a1, 212a2, and 212an. Each output activation map can be a result of a three-dimensional convolution of a filter bank of the kernel stack 208 and the corresponding input activation maps. An output activation map can have an output activation map width of Q' and an output activation map height of P'. The output activation maps 212a1, 212a2, . . . , and 212an can have the same output activation map width 'Q and output activation map height P'.

The operations of the convolutional layer 200 can be summarized by the pseudo-codes below:
(1) For a variable n from the value 1 to the value N:
(2a) Set pixel values of an nth output activation map to values of zero.
(2b) For a variable m from the value of 1 to the value of M:
(3a) Pixel values of the nth output activation map+=
Convolve (an mth input activation map, a kernel at position (m, n) of the kernel stack), where "Convolve" denotes a two-dimensional convolution and "+=" represents a pointwise summation of an output activation map with a result of a convolution of an input activation map with a kernel.
End of (2b).
End of (1).

Example Utilization of Single Instruction, Multiple Data Register

Systems and methods disclosed herein can enable efficient implementations of CNNs, on computing devices such as a computer server, a personal computer, a tablet computer, a mobile device, or an embedded device. A computing device can include a vector processor, a Very Long Instruction Word (VLIW) vector processor, or a Single Instruction, Multiple Data (SIMD) processor. A SIMD-capable processor or architecture can be an Instruction Set Architecture (ISA) or a specific hardware implementation of that ISA, capable of performing data parallel computations through the use of "single instruction, multiple data" operations, where a single instruction can be carried through in parallel to perform the same operation on multiple, disjoint set of input data. Non-limiting examples of such ISA include streaming SIMD extensions (SSE) family of extensions on x86, the NEON or advanced SIMD extension on Advanced RISC Machine (ARM), AltiVec on PowerPC, etc. Accordingly, efficient implementations of CNNs can improve utilization, such as maximum utilization of processors, including utilization of the memory and the Single Instruction, Multiple Data (SIMD) execution units on processors implementing SIMD-capable architectures.

In some implementations, desirable features for a kernel can include equi-distance around the center of the kernel. A kernel with a dimension that is an odd integer (e.g., a 3×1 kernel) can have such a desirable feature. However, the odd integer dimension of such a kernel may not be divisible by 2. And SIMD processor registers may have a register width that is a power of 2 (and hence even). Naïve implementations of a convolution may not achieve full utilization of the SIMD execution unit of a SIMD-capable processor without one or both of data duplication or by bundling convolutions together. For example, the "im2col" and "col2im" transformations can be used for data duplication, which comes at a cost to memory utilization. Furthermore, the "im2col" and "col2im" transformations can be computationally expensive. Bundling convolutions together may require (compared to the systems and methods disclosed herein) horizontal SIMD operations, which can be extra operations that can decrease utilization of the SIMD execution unit.

Figure 3:
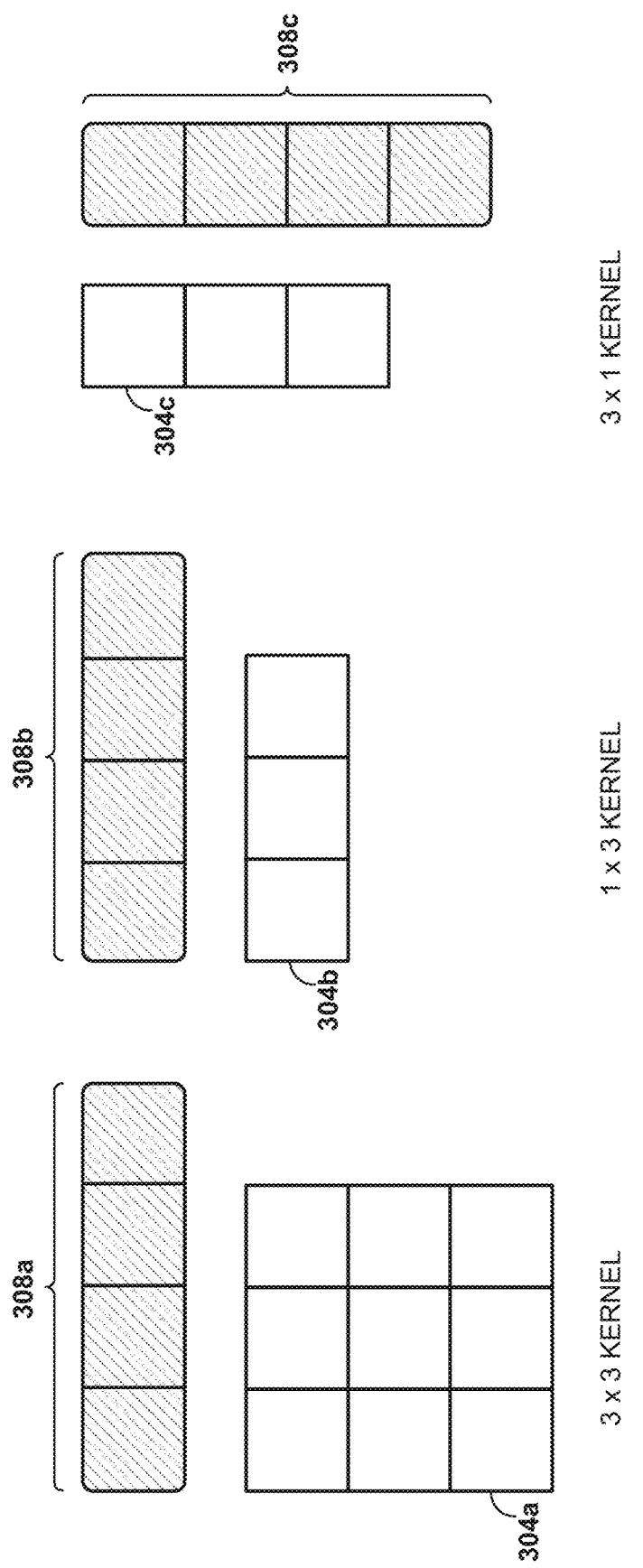
FIG. 3 shows a schematic illustration of a single instruction, multiple data (SIMD) register of width four not fully utilized by convolutions of 3×3, 1×3, or 3×1 kernels.

FIG. 3 shows a schematic illustration of a single instruction, multiple data (SIMD) register of width four not fully utilized by convolutions of 3×3, 1×3, or 3×1 kernels. FIG. 3, left panel shows a 3×3 kernel 304a with each white square representing a weight value of the kernel 304a. A SIMD register 308a can contain four weight values of the kernel 304a. The number of weight values that the SIMD register 308a can contain depends on both the data type of the weight values and the bit width of the SIMD register 308a (e.g., 128 bits). Thus, a naïve implementation of the kernel 304a fails to fully utilize the SIMD register 308a. FIG. 3, middle panel shows a 1×3 kernel 304b with each white square representing a weight value of the kernel 304b. A SIMD register 308b can contain four weight values of the kernel 304b. Thus, a naïve implementation of the kernel 304b may not fully utilize the SIMD register 308b (as well as SIMD registers with widths other than four). FIG. 3, right panel shows a 3×1 kernel 304c with each white square representing a weight value of the kernel 304c. A SIMD register 308c can contain four weight values of the kernel 304c. Thus, a naïve implementation of the kernel 304c fails to fully utilize the SIMD register 308c.

Figure 4:
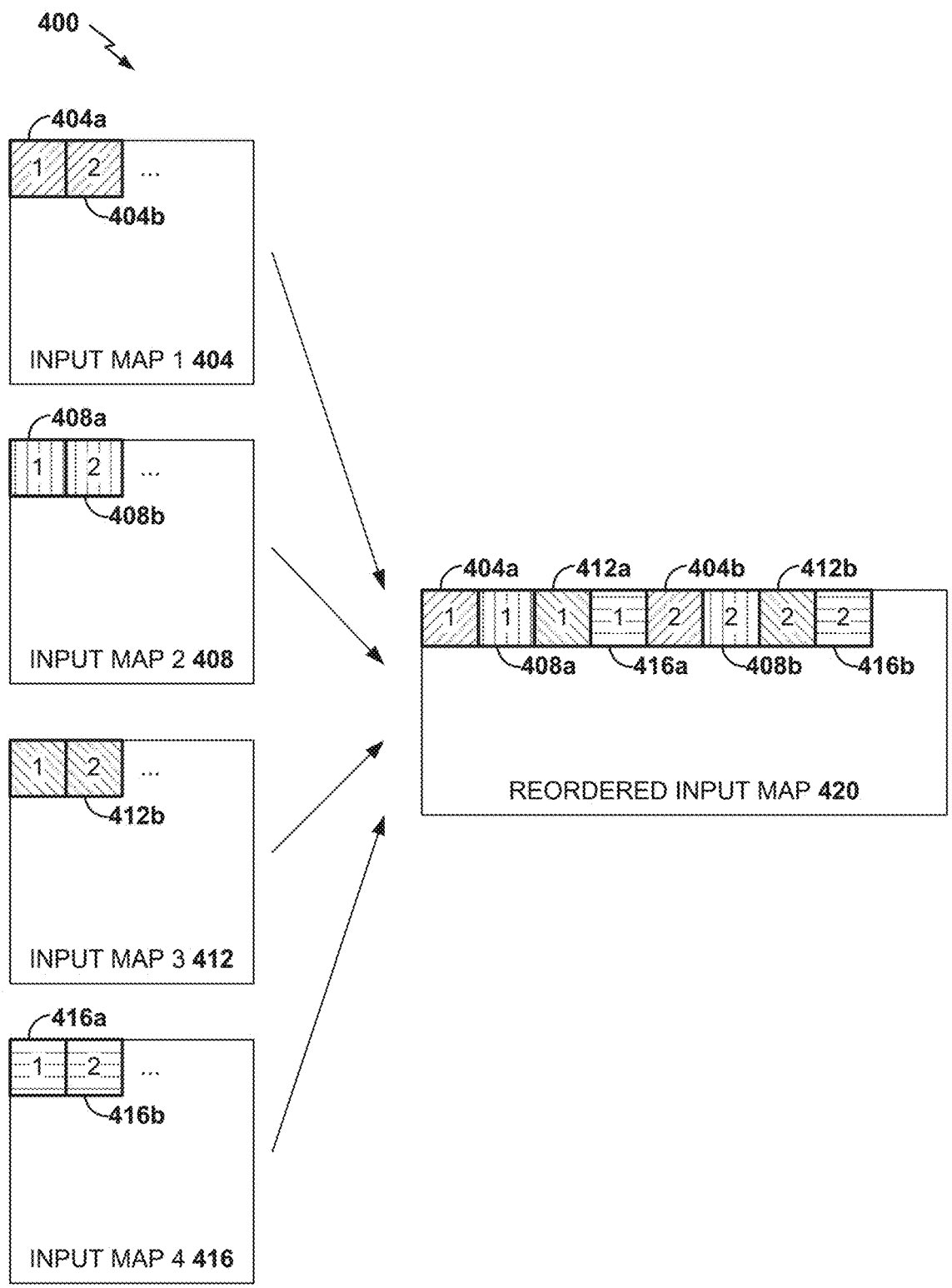
FIG. 4 schematically illustrates an example reordering of pixel values of input activation maps of a convolutional layer of a convolutional neural network.

Example Reordering of Pixel Values of Input Action Maps of a Convolutional Layer To improve utilization of a SIMD register without negatively or substantially negatively affecting memory utilization n, pixel values of input activation maps can be reordered. FIG. 4 schematically illustrates an example reordering 400 of pixel values of input activation maps of a convolutional layer of a convolutional neural network. Reordering pixel values of input activation maps transforms input activation maps from a basic layout for input activation maps (basic input activation map layout) to an interleaved layout for input activation maps (interleaved input activation map layout).

With the basic input activation map layout, an input activation map may be ordered channel by channel, such that all pixel values of the first input activation map, can be stored before all pixels of the second input activation map (in terms of memory location) and so on. As illustrated in FIG. 4, a convolution layer can receive four input activation maps 404, 408, 412, and 416 as its input. With the basic layout, pixels of the input activation maps 404, 408, 412, and 416 can be stored channel by channel. For example, pixel values 404a and 404b of the first input activation map 404 can be stored before pixel values 408a and 408b of the second input activation map 408. As another example, pixel values 408a and 408b of the second input activation map 408 can be stored before pixel values 412a and 412b of the third input activation map 412. As yet another example, pixel values 412a and 412b of the third input activation map 412 can be stored before pixel values 416a and 416b of the fourth input activation map 416.

FIG. 4 shows a reordered input activation map 420 in an interleaved layout from the four input activation maps 404, 408, 412, and 416. The reordered input activation map 420 can include the pixel values of the input activation maps 404, 408, 412, and 416. The numbers in the input activation maps 404, 408, 412, and 416 denote index locations of the pixel values. With the interleaved layout, the first pixel value 404a of the first input activation map 404 (the pixel value 404a at index location one of the input activation map 404) can be followed by the first pixel value 408a of the second input activation map 408 (the pixel value 408a at index location one of the input activation map 408), by the first pixel value 412a of the third input activation map 412 (the pixel value 412a at index location one of the input activation map 412), and by the first pixel value 416a of the fourth input activation map 416 (the pixel value 416a at index location one of the input activation map 404).

The first pixel value 416a of the fourth input activation map 416 can be followed by the second pixel value 404b of the first input activation map 404 (the pixel value 404b at index location two of the input activation map 404), the second pixel value 408b of the second input activation map 408 (the pixel value 408b at index location two of the input activation map 408), the second pixel value 412b of the third input activation map 412 (the pixel value 412b at index location two of the input activation map 412), and the second pixel value 416b of the fourth input activation map 416 (the pixel value 416b at index location two of the input activation map 416). In the reordered input activation map 420, all of the pixel values of all of the input activation maps 404, 408, 412, and 412 can be similarly ordered. Thus, each indexed location in the reordered input activation 420 can include a cluster of the pixel values from the individual input activation maps 404, 408, 412, and 416 at that index.

Similarly, after a convolutional layer receives M input activation maps, the pixel values of the input activation maps can be reordered from the basic input activation map layout to the interleaved input activation map layout. For example, the pixel values can be ordered with the first pixel value of the first input activation map, followed by the first pixel of the second input activation map, and so on until the first pixel value of the Mth input activation map. The first pixel value of the Mth input activation map can be followed by the second pixel value of the first input activation map, the second pixel value of the second input activation map, and so on until the second pixel value of the Mth input activation map. This reordering can continue until all the pixel values of all of the M input activation maps have been similarly ordered. The reordering process results in a large reordered input activation map, which includes M individual input activation maps. Each indexed location in the reordered input activation map can include a cluster of the pixel values from the individual input activation maps at that index.

Accordingly, the output activation maps 404, 408, 412, and 416 are interleaved in the same way as the input activation maps. The row and column of input activation maps 404, 408, 412, and 416 corresponds directly to the row and column in the reordered input activation map 420. For example, position (i, j) of the input activation map 404 indexes to the cluster of pixels at position (i, j) of the reordered input activation map 420.

Advantageously, this reordering needs to be performed at most once by, for example, an initial convolutional layer or a first convolutional layer of the CNN. In some embodiments, no reordering may be necessary. For example, the first convolution layer can convolve one input activation map and produces multiple output activation maps. In this case, no reordering of the pixel values of the input activation map may be necessary. Convolving one input activation map to generate multiple output activation maps may be considered as performing a number of two-dimensional (2D) convolutions on one input activation map in parallel. Advantageously, the methods disclosed herein may allow efficient computations of 2D convolutions on a single input activation map.

With the input activation map interleaved layout, the output activation maps of a convolutional layer can also be in a similar layout. Advantageously, reordering of pixel values can be performed at most once by, for example, an initial convolutional layer or a first convolutional layer of the CNN. Accordingly, a CNN can be efficiently implemented because reordering of pixel values into an interleaved layout can be performed for only one convolutional layer of the CNN.

For example, a reordered output activation map in an interleaved layout for output activation maps (interleaved output activation map layout) can include the output activation maps in a basic layout for output activation maps (basic output activation map layout). With the interleaved output activation map layout, the pixel values can be ordered with the first pixel value of the first output activation map, followed by the first pixel of the second output activation map, and so on until the first pixel value of the Nth output activation map. The number of output activation maps in the basic output activation map layout can be denoted by N. The first pixel value of the Nth output activation map can be followed by the second pixel value of the first output activation map, the second pixel value of the second output activation map, and so on until the second pixel value of the Nth output activation map. Other pixel values of the N output activation maps can be similarly ordered. The output activation map in the interleaved layout includes N individual output activation maps. Each indexed location in the output activation map can include a cluster of the pixel values from the individual output activation maps at that index.

In some implementations, with the basic output activation map layout, an output activation map may be ordered channel by channel, such that all pixel values that belong to the first output activation map, can be stored before all pixels that belong to the second output activation map (in terms of memory location) and so on. In some implementations, pixel values of the reordered output activation map in the interleaved output activation map layout can be ordered into the basic output activation map layout. For example, the first output activation map can include the first pixel, the (N+1)th pixel, the (2N+1)th pixel, and so on, of the reordered output activation map. As another example, the second output activation map can include the second pixel, the (N+2)th pixel, the (2N+2)th pixel, and so on, of the reordered output activation map. As yet another example, the Nth output activation map can include the Nth pixel, the (2*N)th pixel, the (3*N)th pixel, and so on, of the reordered output activation map.

Advantageously, data re-shuffling after each CNN layer may be unnecessary because the output of the CNN layer can be in the interleaved output activation map layout. Consequently, the input activation maps only have to be reordered into the interleaved layout once (e.g., the input activation maps of a CNN, which can be input activation maps of an input layer of the CNN). The interleaved layout can then propagate through subsequent layers of the CNN without reordering pixel values of input activation maps of the subsequent layers.

Example Reordering of Weight Values of Kernels of a Kernel Stack into Tiles of Runnels With the input activation maps 404, 408, 412, and 412 of the convolutional layer 400 reordered into a input activation map tile layout, kernels 208a1-208an, 208b1-208bn, and 208m1-208mn of the kernel stack 208 can be reordered from a basic layout of the kernels into a tile layout of the kernels to take advantage of vector operations for loading, arithmetic, or storing operations of a processor of a computing device such as an embedded device. As shown in FIG. 2, the number of rows of the kernel stack 208 and the number of input channels 204 can be the same. The number of columns of the kernel stack 208 and the number of output channels 212 can be the same. A kernel of the kernel stack 208 can have a kernel width of $K_x$ weight values and a kernel height of $K_y$ weight values.

FIGS. 5A-5C, 6A, 6B, and 7 illustrate examples of weight reordering. Depending on the method used, there are no restrictions on input and output number of channels (and consequently kernel stack dimensions). The methods described that have restrictions are usually more straightforward to understand, and marginally faster, balancing flexibility and computational efficiency tradeoff. With regards to memory usage, they are all equally efficient in some implementations. A first step is shared between all methods illustrated in FIGS. 5A-5C, 6A, 6B, and 7. In the first step, the input channels are rearranged in an interleaved format as described above. In other words, the first pixel of the first channel, comes before the first pixel of the second channel, . . . , which in turn comes before the first pixel of the nth channel, which comes before the second pixel of the first channel and so on. Subsequently, reorder the kernel weights. This step varies based on the method used.

Training a neural network can include learning weight values of kernels of a kernel stack in a basic kernel layout. Because training the neural network can be an offline process (e.g., before a computing device such as a computer server, a personal computer, a tablet computer, a mobile device, or an embedded device uses the resulting neural network to perform image segmentation and eye tracking), reordering the weight values of the kernels using systems and methods disclosed can be advantageously performed once in a offline manner (e.g., after learning the weight values of the kernels), without loss of the runtime performance of the neural network. The methods disclosed herein can be used for implementing CNNs efficiently on computing devices with embedded processors, regular central processing units (CPUs), graphical processing units (GPUs), or dedicated hardware application specific integrated circuit (ASIC) designs.

Figure 5A:
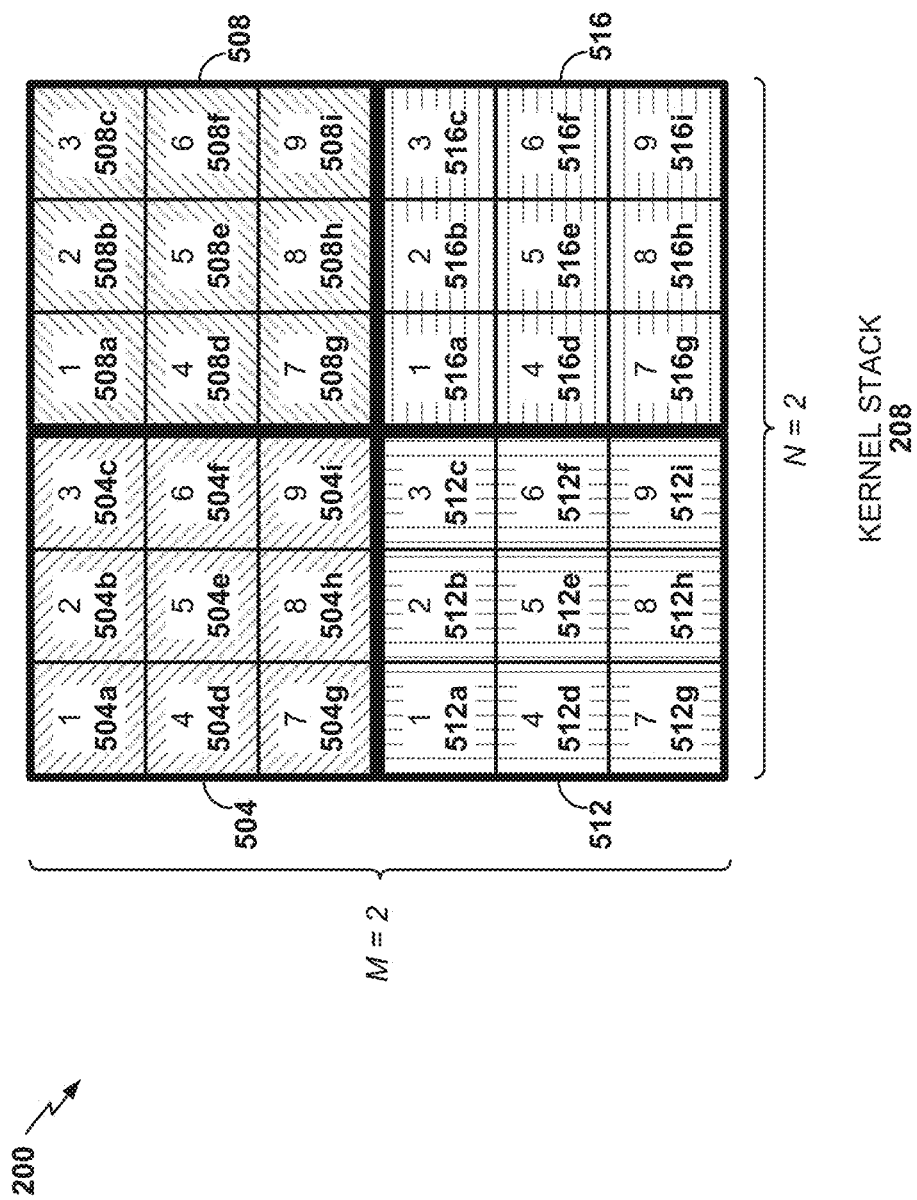
Figure 5C:
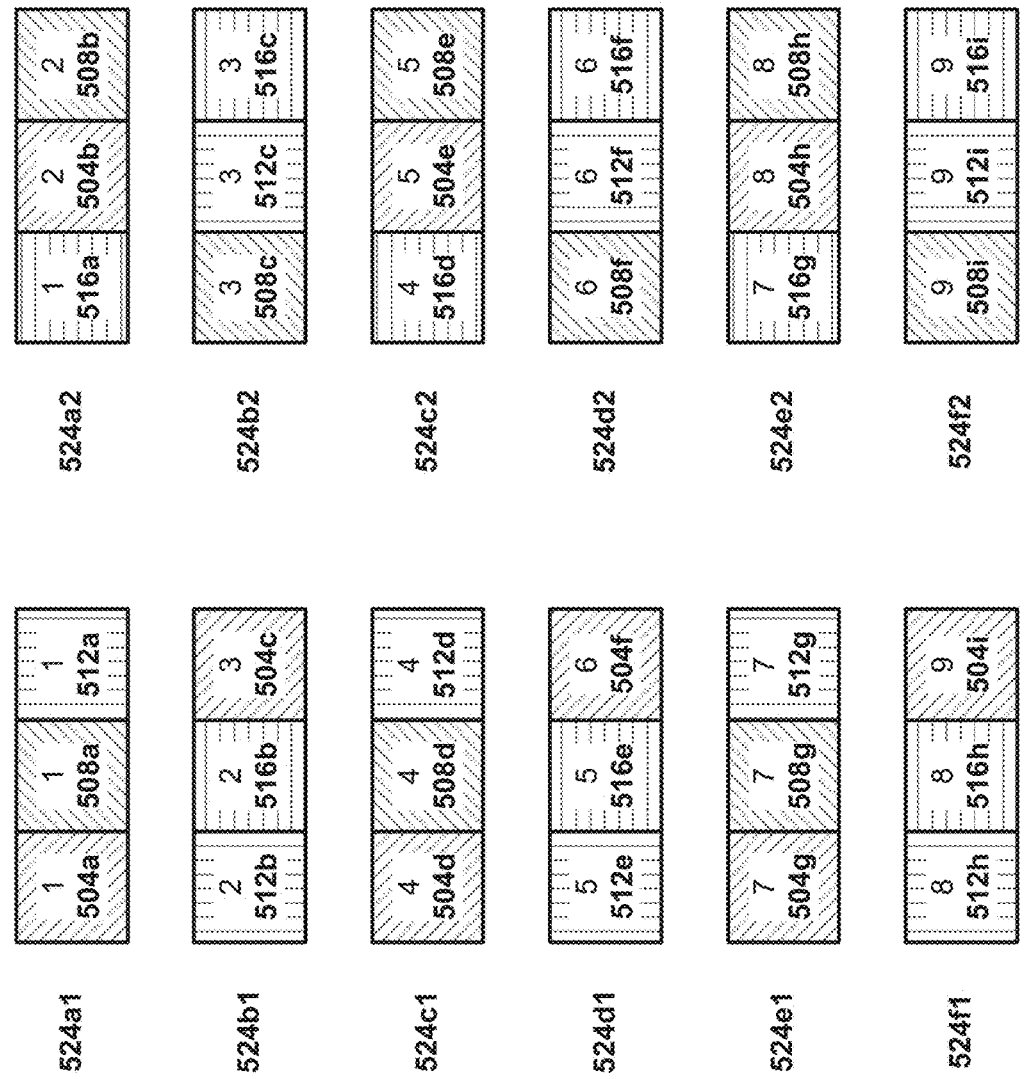

FIGS. 5A-5C schematically illustrate examples of reordering weight values of kernels of a kernel stack 208 into a tile format comprising tiles of runnels. There are no restrictions on kernel dimensions is these examples. FIG. 5A shows a 2×2 kernel stack 208 of a convolutional layer 200 with two rows of kernels and two columns of kernels. The first row of kernels includes a kernel 504 and a kernel 508. The second row of kernels includes a kernel 512 and a kernel 516. Because the number of rows of the kernel stack 208 and the number of input channels 204 can be the same and the number of columns of the kernel stack 208 and the number of output channels 212 can be the same, the kernel stack 208 convolves two input activation maps to produce two output activation maps. A kernel of the kernel stack 208 has a dimension of 3×3. The numbers in the kernels denote indexes of weight values in the kernels. If a weight value of a kernel of the kernel stack 208 has a size of 32 bits and a processor register such as a SIMD register has a width of 64 bits, the SIMD register can contain two weight values at once.

The weight values 504a-504i, 508a-508i, 512a-512i, and 516a-516i of kernels 504, 508, 512, and 516 of the kernel stack 208 can be reordered from a basic layout of the kernels (basic kernel layout) into a tile layout of the kernels (tile kernel layout). The tile layout of the kernels can include tiles of runnels. In some implementations, a runnel can be an ordered list of weight values with the following properties. First, the number of weight values in a runnel can be the same as the number of weight values a processor register such as a SIMD register can contain at once given the data type of the weight values. For example, for a 128-bit SIMD register, a runnel can contain eight half-precision floating point weight values (which are 16-bit floating point numbers) for a kernel of half floats or four single-precision floating point weight values (which are 32-bit floating point numbers) for a kernel of floats.

Second, runnels can be filled iteratively with respect to the following traversal priority given an arbitrary starting point in a kernel:

(1) Traverse along the width dimension of the kernel stack 208 (the N dimension or the kernel stack x direction ($S_x$), which equals to 2 for the kernel stack 208 illustrated in FIG. 5A).

(2) Traverse along the height dimension of the kernel stack 208 (the M dimension or the kernel stack y direction ($S_y$), which equals to 2 for the kernel stack 208 illustrated in FIG. 5A)

(3) Traverse along the width dimension of the individual kernel ($K_x$, which equals to 2 for a kernel of the kernel stack 208 illustrated in FIG. 5A).

(4) Traverse along the height dimension of the individual kernel ($K_y$, which equals to 2 for a kernel of the kernel stack 208 illustrated in FIG. 5A).

The traversal continues until the runnel is completely filled with weight values.

In some implementations, a tile can be an ordered list of runnels, where the number of runnels can be chosen such that a "tile" always begins on a kernel stack width boundary (also referred to as a kernel stack row boundary) and ends on a kernel stack width boundary. Thus, a tile can be filled up with more and more runnels until the last runnel ends up at the end of a kernel stack row.

For a SIMD register with a 64-bit width, the runnel width can also be 64 bits. If a weight value of the kernels has a size of 32 bits, a 64-bit SIMD register can contain two weight values. Thus, a runnel can include two 32-bit weight values. The number of runnels per tile can be one based on the above traversal priority: the runnel can be first filled with a weight value 504a at index location one of the kernel 504, then a weight value 508a at index location one of the kernel 508. After filling the weight values 504a and 508a, the runnel is completely filled. Because the weight value 504a is at a kernel stack width boundary and the weight value 508a is at another kernel stack width boundary, a tile with the runnel with the weight values 504a and 508a begins at a kernel stack width boundary and ends at a kernel stack width boundary. Thus, the number of runnels per tile can be one.

FIG. 5B shows a kernel stack 208m1 in a tile kernel layout transformed from the kernel stack 208 in the basic layout shown in FIG. 5A. The kernel stack 208m1 in the tile layout can include one or more tiles. A tile can include one runnel with two weight values. The kernel stack 208m1 can include all the weight values in the convolutional layer 200 such that the kernel stack 208m1 includes the tiles needed to encompass all the weight values of the convolutional layer 200.

The kernel stack 208m1 can include 18 tiles 520a-520r of one runnel each. The kernel stack 208m1 can include the tiles shown in Table 1.

TABLE 1

Tiles of the kernel stack 208m1

| Tile | Weight Values |
|---|---|
| Tile 1 520a | the weight value 504a at index location one of the kernel 504, the weight value 508a at index location one of the kernel 508 |
| Tile 2 520b | the weight value 512a at index location one of the kernel 512, the weight value 516a at index location one of the kernel 516 |
| Tile 3 520c | the weight value 504b at index location two of the kernel 504, the weight value 508b at index location two of the kernel 508 |
| Tile 4 520d | the weight value 512b at index location two of the kernel 512, the weight value 516b at index location two of the kernel 516 |
| Tile 5 520e | the weight value 504c at index location three of the kernel 504, the weight value 508c at index location three of the kernel 508 |
| Tile 6 520f | the weight value 512c at index location three of the kernel 512, the weight value 516c at index location three of the kernel 516 |
| Tile 7 520g | the weight value 504d at index location four of the kernel 504, the weight value 508d at index location four of the kernel 508 |
| Tile 8 520h | the weight value 512d at index location four of the kernel 512, the weight value 516d at index location four of the kernel 516 |
| Tile 9 520i | the weight value 504e at index location five of the kernel 504, the weight value 508e at index location five of the kernel 508 |
| Tile 10 520j | the weight value 512e at index location five of the kernel 512, the weight value 516e at index location five of the kernel 516 |
| Tile 11 520k | the weight value 504f at index location six of the kernel 504, the weight value 508f at index location six of the kernel 508 |
| Tile 12 520l | the weight value 512f at index location six of the kernel 512, the weight value 516f at index location six of the kernel 516 |
| Tile 13 520m | the weight value 504g at index location seven of the kernel 504, the weight value 508g at index location seven of the kernel 508 |
| Tile 14 520n | the weight value 512g at index location seven of the kernel 512, the weight value 516g at index location seven of the kernel 516 |
| Tile 15 520o | the weight value 504h at index location eight of the kernel 504, the weight value 508h at index location eight of the kernel 508 |
| Tile 16 520p | the weight value 512h at index location eight of the kernel 512, the weight value 516h at index location eight of the kernel 516 |
| Tile 17 520q | the weight value 504i at index location nine of the kernel 504, the weight value 508i at index location nine of the kernel 508 |
| Tile 18 520r | the weight value 512i at index location nine of the kernel 512, the weight value 516i at index location nine of the kernel 516 |

In summary, the convolutional layer 200 convolves two input activation maps with a 2×2 kernel stack that includes 3×3 kernels to produce two output activation maps. A weight value of a kernel of the kernel stack can have a size of 32 bits. Thus, a 64-bit SIMD register can include two weight values (the number of SIMD lanes is two). A 64-bit runnel can include two weight values. And a tile can include one runnel.

FIG. 5C shows a kernel stack 208m2 in another tile kernel layout transformed from the kernel stack 208 in the basic layout shown in FIG. 5A. If a SIMD register has a 92-bit width and a weight value of a kernel has a size of 32 bits, the 92-bit SIMD register can contain three weight values. The kernel stack 208m2 can include the tiles shown in Table 2.

TABLE 2

Tiles of the kernel stack 208m2

| Tile | Runnel | Weight Values |
|---|---|---|
| Tile 1 | runnel 524a1 | the weight value 504a at index location one of the kernel 504, the weight value 508a at index location one of the kernel 508, the weight value 512a at index location one of the kernel 512 |

TABLE 2-continued

Tiles of the kernel stack 208m2

| Tile | Runnel | Weight Values |
|---|---|---|
| | runnel 524a2 | the weight value 516a at index location one of the kernel 516, the weight value 504b at index location two of the kernel 504, the weight value 508b at index location two of the kernel 508 |
| Tile 2 | runnel 524b1 | the weight value 512b at index location two of the kernel 512, the weight value 516b at index location two of the kernel 516, the weight value 504c at index location three of the kernel 504 |
| | runnel 524b2 | the weight value 508c at index location three of the kernel 508, the weight value 512c at index location three of the kernel 512, the weight value 516c at index location three of the kernel 516 |
| Tile 3 | runnel 524c1 | the weight value 504d at index location four of the kernel 504, the weight value 508d at index location four of the kernel 508, the weight value 512d at index location four of the kernel 512 |
| | runnel 524c2 | the weight value 516d at index location four of the kernel 516, the weight value 504e at index location five of the kernel 504, the weight value 508e at index location five of the kernel 508 |
| Tile 4 | runnel 524d1 | the weight value 512e at index location five of the kernel 512, the weight value 516e at index location five of the kernel 516, the weight value 504f at index location six of the kernel 504 |
| | runnel 524d2 | the weight value 508f at index location six of the kernel 508, the weight value 512f at index location six of the kernel 512, the weight value 516f at index location six of the kernel 516 |
| Tile 5 | runnel 524e1 | the weight value 504g at index location seven of the kernel 504, the weight value 508g at index location seven of the kernel 508, the weight value 512g at index location seven of the kernel 512 |
| | runnel 524e2 | the weight value 516g at index location seven of the kernel 516, the weight value 504h at index location eight of the kernel 504, the weight value 508h at index location eight of the kernel 508 |
| Tile 6 | runnel 524f1 | the weight value 512h at index location eight of the kernel 512, the weight value 516h at index location eight of the kernel 516, the weight value 504i at index location nine of the kernel 504 |
| | runnel 524f2 | the weight value 508i at index location nine of the kernel 508, the weight value 512i at index location nine of the kernel 512, the weight value 516i at index location nine of the kernel 516 |

As another example, the convolutional layer 200 can convolve four input activation maps with a 4×6 kernel stack that includes 5×5 kernels to produce six output activation maps. A weight value of a kernel of the kernel stack can have a size of 16 bits. Thus, a 128-bit SIMD register can include eights weight values. A 128-bit runnel can include eight weight values. And a tile can include three runnels. In this example, the number of runnels per tile can be three because starting from a kernel stack width boundary (i.e. the beginning of a row), three runnels can be required to arrive at the next kernel stack width boundary. The first runnel can include pixel values at index location one of the kernels at kernel stack positions (1, 1), (1, 2), (1, 3), (1, 4), (1, 5), (1, 6), (2, 1), and (2, 2), which does not end at a kernel stack width boundary. The second runnel can include pixel values at index location one of the kernels at kernel stack positions (2, 3), (2, 4), (2, 5), (2, 6), (3, 1), (3, 2), (3, 3), and (3, 4), which does not end at a kernel stack width boundary. The third runnel can include pixel values at index location one of the kernels at kernel stack positions (3, 5), (3, 6), (4, 1), (4, 2), (4, 3), (4, 4), (4, 5), and (4, 6), which ends at a kernel stack width boundary.

Figure 6A:
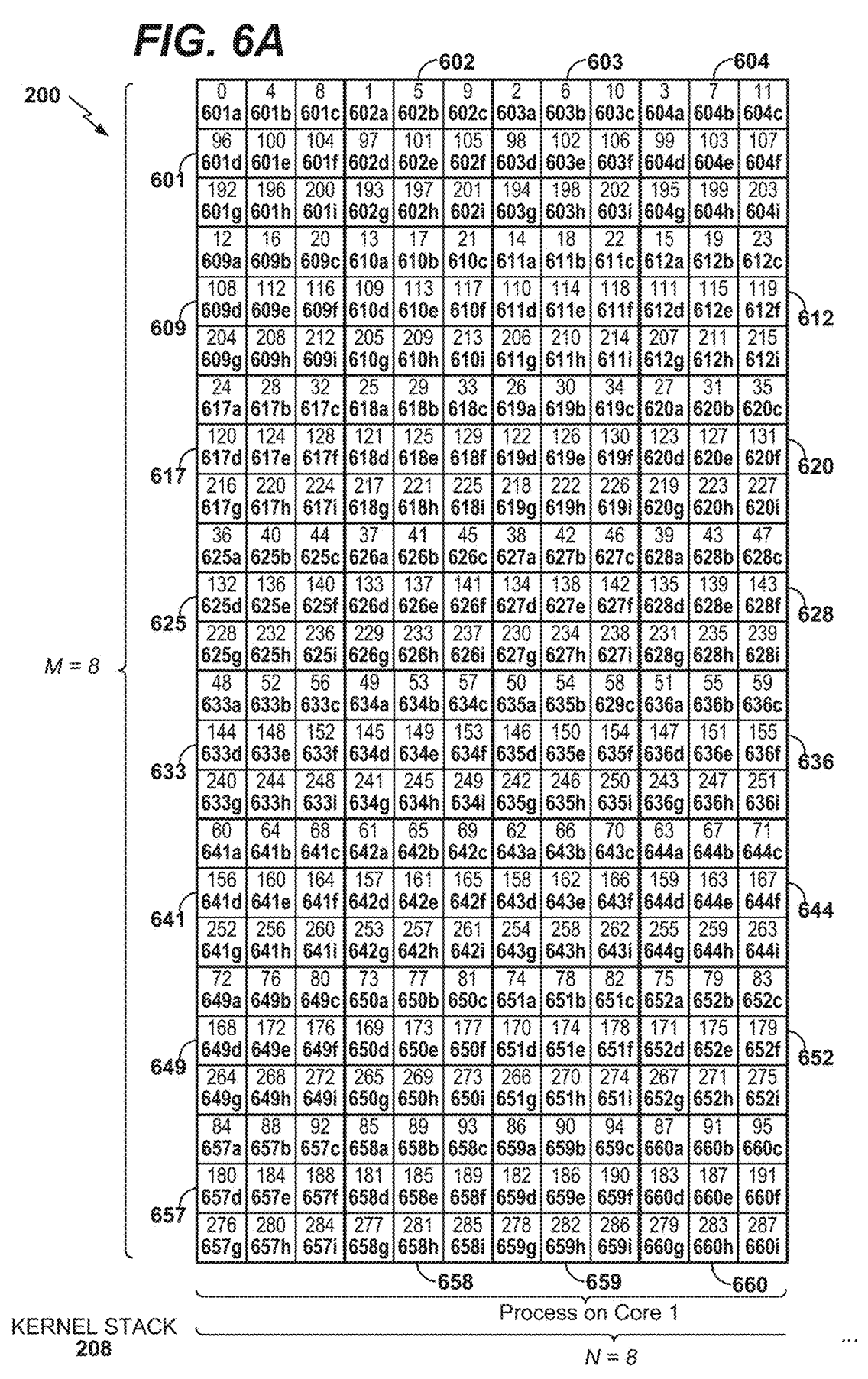
Figure 6B:
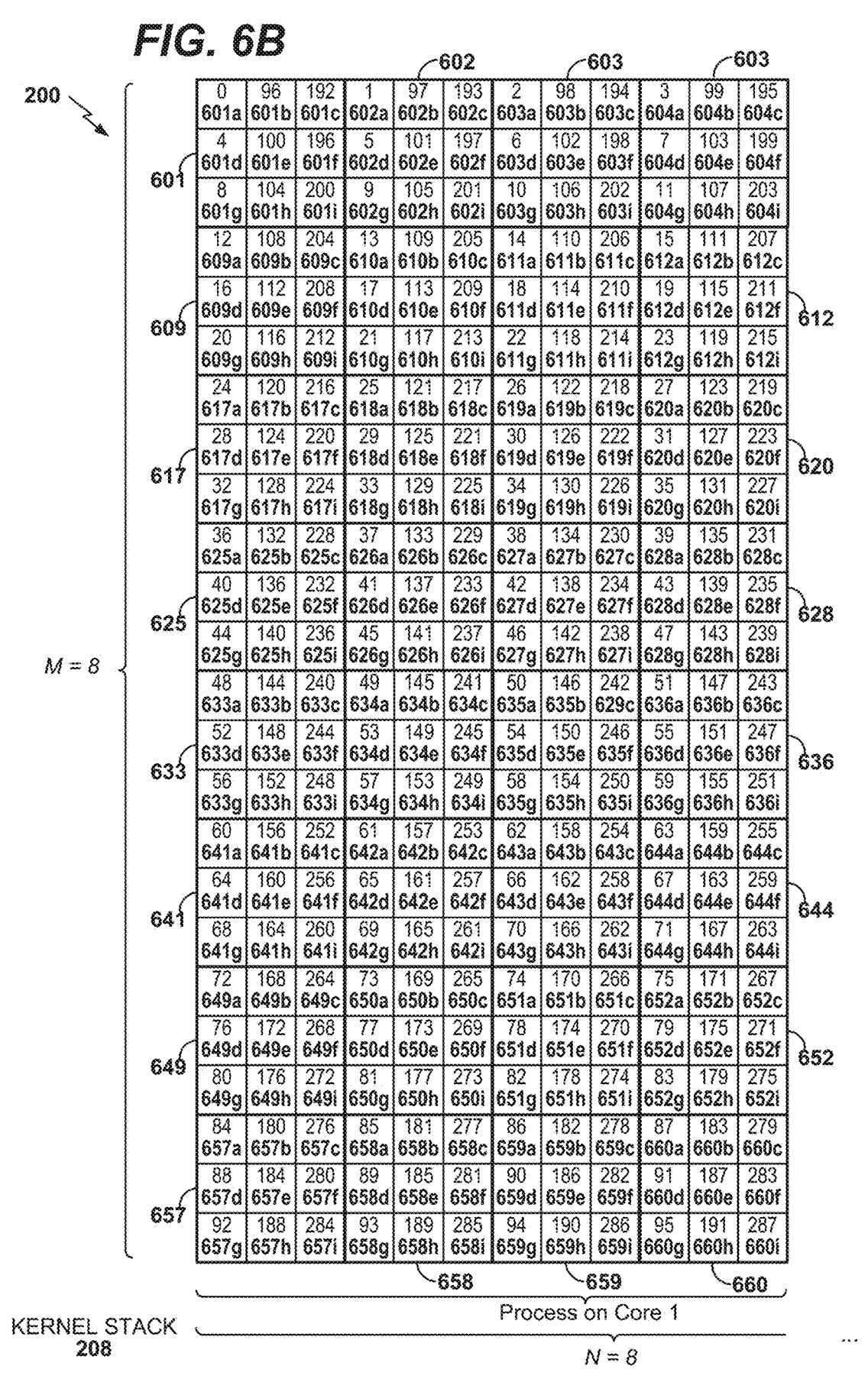
Figure 6B:
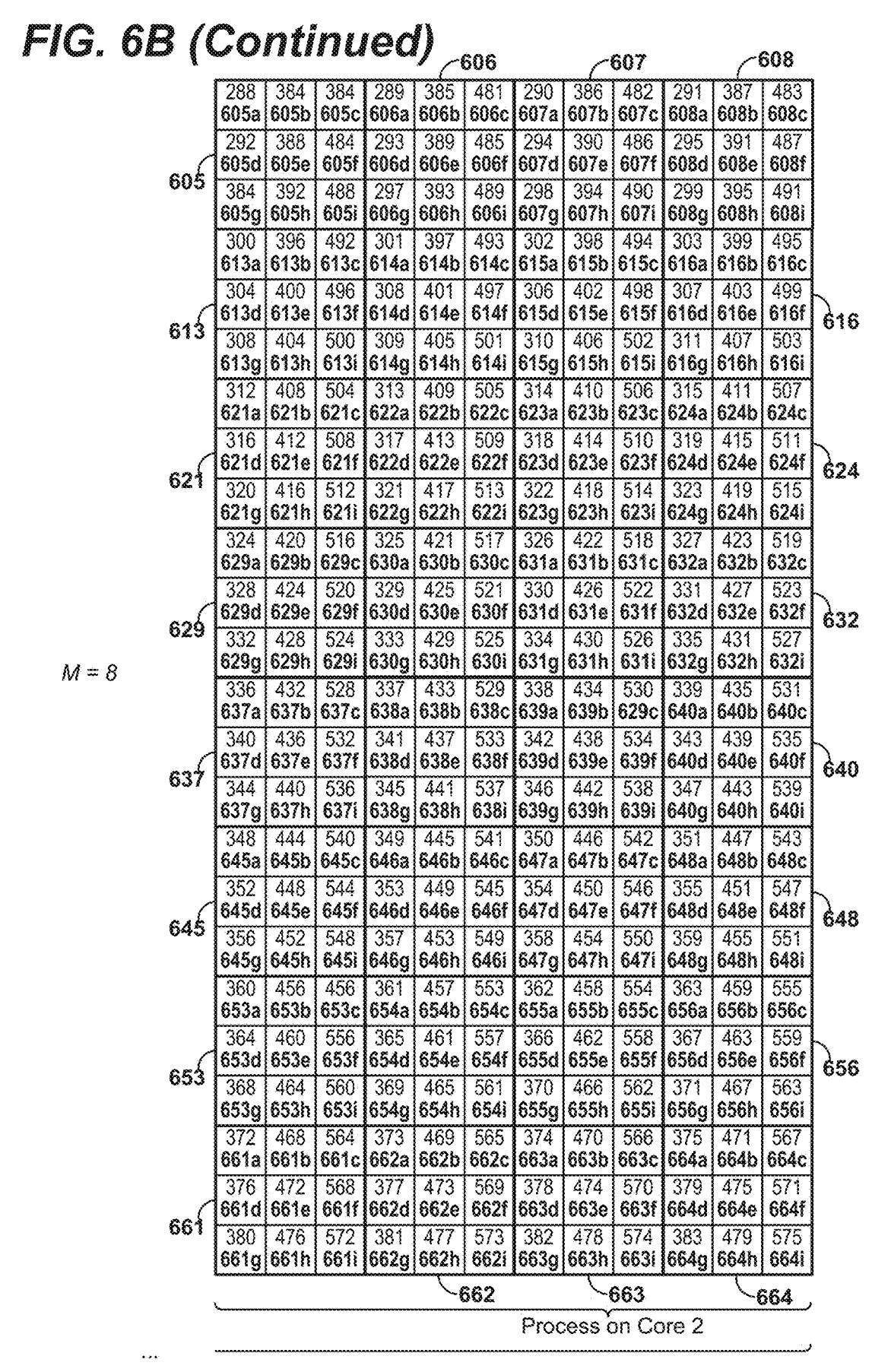

Example Reordering of Kernel Weights—the Number of Output Channels Equals to a Multiple of the SMID Register Width FIGS. 6A and 6B schematically illustrate examples of reordering weight values of kernels of a kernel stack 208 into a tile format comprising tiles of runnels. There are no restrictions on kernel dimensions is these examples. The method illustrated in these examples are the most straight forward and efficient, with the limitation that the number of output channels (out of each and every convolution layer in the network) must be a multiple of the vector processor's SIMD register width. Thus, this method is less flexible than the method described above with reference to FIGS. 5A-5C.

Referring to FIG. 6A, which shows an 8×8 kernel stack 208 of a convolutional layer 200 with eight rows of kernels (M=8) and eights columns of kernels (N=8). The first row of kernels includes eight kernels 601-608. The second row of kernels includes eight kernels 609-616. The third row of kernels includes eight kernels 617-624. The fourth row of kernels includes eight kernels 625-632. The fifth row of kernels includes eight kernels 633-640. The sixth row of kernels includes eight kernels 641-648. The seventh row of kernels includes eight kernels 649-656. The eighth row of kernels includes eight kernels 657-664.

Because the number of rows of the kernel stack 208 and the number of input channels 204 can be the same and the number of columns of the kernel stack 208 and the number of output channels 212 can be the same, the kernel stack 208 convolves eight input activation maps to produce eight output activation maps. A kernel of the kernel stack 208 has a dimension of 3×3 in this example. If a weight value of a kernel of the kernel stack 208 has a size of 32 bits and a processor register such as a SIMD register has a width of 64 bits, the SIMD register can contain two weight values at once.

FIG. 6A shows arranging the kernel weights in memory if register width is four elements. This is a onetime operation performed at design time of the network. The weight values 601a-601i, 602a-602i, ..., 663a-663i, and 664a-664i of the kernel stack 208 can be reordered from a basic layout of the kernels (basic kernel layout) into a tile layout of the kernels (tile kernel layout). The numbers in the schematic representations of kernel weights denote the order of weight values after reordering. The tile layout of the kernels can include tiles of runnels. In some implementations, a runnel can be an ordered list of weight values with one or more of the following properties. First, the number of weight values in a runnel can be the same as the number of weight values a processor register such as a SIMD register can contain at once given the data type of the weight values. For example, for a 128-bit SIMD register, a runnel can contain eight half-precision floating point weight values (which are 16-bit floating point numbers) for a kernel of half floats or four single-precision floating point weight values (which are 32-bit floating point numbers) for a kernel of floats.

Second, runnels can be filled iteratively with respect to the following traversal priority given an arbitrary starting point in a kernel:

(1) Traverse along the width dimension of the kernel stack 208 (the N dimension or the kernel stack x direction ($S_x$), which equals to 8 for the kernel stack 208 illustrated in FIG. 6A).

(2) Traverse along the width dimension of the individual kernel ($K_x$, which equals to 3 for a kernel of the kernel stack 208 illustrated in FIG. 6A).

(3) Traverse along the height dimension of the kernel stack 208 (the M dimension or the kernel stack y dimension ($S_y$), which equals to 8 for the kernel stack 208 illustrated in FIG. 6A).

(4) Traverse along the height dimension of the individual kernel ($K_y$, which equals to 3 for a kernel of the kernel stack 208 illustrated in FIG. 6A).

The traversal continues until the runnel is completely filled with weight values.

This traversal can be alternatively expressed as:
(1) for each $S_x$
(2) for each $K_y$
(3) for each $S_y$
(4) for each $K_x$.

In some implementations, a tile can be an ordered list of runnels, where the number of runnels can be chosen such that a "tile" does not always begin on a kernel stack width boundary (also referred to as a kernel stack row boundary) and ends on a kernel stack width boundary. As illustrated in FIG. 6A, the weight values of the kernels 601-604, 609-612, 617-620, 625-628, 633-636, 641-644, 649-652, and 657-660 can be reordered and processed on one core of a processor. The weight values of the kernels 605-608, 613-616, 621-624, 629-632, 637-640, 645-649, 653-656, and 661-664 can be reordered and processed on another core of a processor. In some implementations, a tile can be an ordered list of runnels, where the number of runnels can be chosen such that a "tile" always begins on a kernel stack width boundary (also referred to as a kernel stack row boundary) and ends on a kernel stack width boundary.

For a SIMD register with a 128-bit width, the runnel width can also be 128 bits. If a weight value of the kernels has a size of 8 bits, a 128-bit SIMD register can contain eight weight values. Thus, a runnel can include eight 8-bit weight values. The number of runnels per tile can be based on the above traversal priority: the runnels can be filled with weight values 601a, 602a, 603a, 604a, 601b, 602b, 603b, 604b, 601c, 602c, 603c, 604c, 609a, . . . , 612c, . . . , 657a, . . . , 660c, 601d, 602d, 603d, 604d, 601e, 602e, 603e, 604e, 601f, 602f, 603f, 604f, 609d, . . . , 612f, . . . , 657d, . . . , 660f, 601g, 602g, 603g, 604g, 601h, 602h, 603h, 604h, 601i, 602i, 603i, 604i, 609g, . . . , 612i, . . . , 657g, . . . , and 660i. These weight values can be processed with one processor core. The remaining weight values can be similarly ordered as illustrated in FIG. 6A and processed with another processor core.

FIG. 6B schematically illustrate another example of reordering weight values of kernels of the kernel stack 208 shown in FIG. 6A into a tile format comprising tiles of runnels. The weight values 601a-601i, 602a-602i, . . . , 663a-663i, and 664a-666i of the kernel stack 208 can be reordered from a basic layout of the kernels (basic kernel layout) into a tile layout of the kernels (tile kernel layout). The numbers in the schematic representations of kernel weights denote the order of weight values after reordering. The tile layout of the kernels can include tiles of runnels. In some implementations, a runnel can be an ordered list of weight values with one or more of the following properties. First, the number of weight values in a runnel can be the same as the number of weight values a processor register such as a SIMD register can contain at once given the data type of the weight values. For example, for a 128-bit SIMD register, a runnel can contain eight half-precision floating point weight values (which are 16-bit floating point numbers) for a kernel of half floats or four single-precision floating point weight values (which are 32-bit floating point numbers) for a kernel of floats.

Second, runnels can be filled iteratively with respect to the following traversal priority given an arbitrary starting point in a kernel:

(1) Traverse along the width dimension of the kernel stack 208 (the N dimension or the kernel stack x direction ($S_x$), which equals to 8 for the kernel stack 208 illustrated in FIG. 6B).

(2) Traverse along the height dimension of the individual kernel ($K_y$, which equals to 3 for a kernel of the kernel stack 208 illustrated in FIG. 6B).

(3) Traverse along the height dimension of the kernel stack 208 (the M dimension or the kernel stack y dimension ($S_y$), which equals to 8 for the kernel stack 208 illustrated in FIG. 6B).

(4) Traverse along the width dimension of the individual kernel ($K_x$, which equals to 3 for a kernel of the kernel stack 208 illustrated in FIG. 6B).

The traversal continues until the runnel is completely filled with weight values.

This traversal can be alternatively expressed as:
(1) for each $S_x$
(2) for each $K_x$
(3) for each $S_y$
(4) for each $K_y$.

In some implementations, a tile can be an ordered list of runnels, where the number of runnels can be chosen such that a "tile" does not always begin on a kernel stack width boundary (also referred to as a kernel stack row boundary) and ends on a kernel stack width boundary. As illustrated in FIG. 6A, the weight values of the kernels 601-604, 609-612, 617-620, 625-628, 633-636, 641-644, 649-652, and 657-660 can be reordered and processed on one core of a processor. The weight values of the kernels 605-608, 613-616, 621-624, 629-632, 637-640, 645-649, 653-656, and 661-664 can be reordered and processed on another core of a processor. In some implementations, a tile can be an ordered list of runnels, where the number of runnels can be chosen such that a "tile" always begins on a kernel stack width boundary (also referred to as a kernel stack row boundary) and ends on a kernel stack width boundary.

For a SIMD register with a 64-bit width, the runnel width can also be 64 bits. If a weight value of the kernels has a size of 32 bits, a 64-bit SIMD register can contain two weight values. Thus, a runnel can include two 32-bit weight values.

The number of runnels per tile can be based on the above traversal priority: the runnels can be filled with weight values 601a, 602a, 603a, 604a, 601b, 602b, 603b, 604b, 601c, 602c, 603c, 604c, 609a, ..., 612c, ..., 657a, ..., 660c, 601d, 602d, 603d, 604d, 601e, 602e, 603e, 604e, 601f, 602f, 603f, 604f, 609d, ..., 612f, ..., 657d, ..., 660f, 601g, 602g, 603g, 604g, 601h, 602h, 603h, 604h, 601i, 602i, 603i, 604i, 609g, ..., 612i, ..., 657g, ..., and 660i. These weight values can be processed with one processor core. The remaining weight values can be similarly ordered as illustrated in FIG. 6B and processed with another processor core.

Example Reordering of Kernel
Weights—Additional Parallel Processing

FIG. 7 schematically illustrates an example of reordering weight values of kernels of a kernel stack 208 into a tile format comprising tiles of runnels. The method described in FIG. 7 is straight forward, and efficient, but more restrictive than the method described in FIGS. 6A-6B. The method is less flexible that the method described in FIGS. 5A-5C. However, more parallel processing is possible with the method described in FIG. 7. This method is highly efficient when $(K_x * K_y * S_y)$ mod (register width)=0.

Referring to FIG. 7, which shows an 8×8 kernel stack 208 of a convolutional layer 200 with eight rows of kernels (M=8) and eights columns of kernels (N=8). The first row of kernels includes eight kernels 601-608. The second row of kernels includes eight kernels 609-616. The third row of kernels includes eight kernels 617-624. The fourth row of kernels includes eight kernels 625-632. The fifth row of kernels includes eight kernels 633-640. The sixth row of kernels includes eight kernels 641-648. The seventh row of kernels includes eight kernels 649-656. The eighth row of kernels includes eight kernels 657-664.

Because the number of rows of the kernel stack 208 and the number of input channels 204 can be the same and the number of columns of the kernel stack 208 and the number of output channels 212 can be the same, the kernel stack 208 convolves eight input activation maps to produce eight output activation maps. A kernel of the kernel stack 208 has a dimension of 3×3 in this example. If a weight value of a kernel of the kernel stack 208 has a size of 32 bits and a processor register such as a SIMD register has a width of 64 bits, the SIMD register can contain two weight values at once.

The weight values 601a-601i, 602a-602i, ..., 663a-663i, and 664a-664i of the kernel stack 208 can be reordered from a basic layout of the kernels (basic kernel layout) into a tile layout of the kernels (tile kernel layout). The numbers in the schematic representations of kernel weights denote the order of weight values after reordering. In some implementations, a runnel can be an ordered list of weight values with one or more of the following properties. First, the number of weight values in a runnel can be the same as the number of weight values a processor register such as a SIMD register can contain at once given the data type of the weight values. For example, for a 128-bit SIMD register, a runnel can contain eight half-precision floating point weight values (which are 16-bit floating point numbers) for a kernel of half floats or four single-precision floating point weight values (which are 32-bit floating point numbers) for a kernel of floats.

Second, runnels can be filled iteratively with respect to the following traversal priority given an arbitrary starting point in a kernel:

(1) Traverse along the width dimension of the individual kernel ($K_x$, which equals to 3 for a kernel of the kernel stack 208 illustrated in FIG. 7).

(2) Traverse along the height dimension of the individual kernel ($K_y$, which equals to 3 for a kernel of the kernel stack 208 illustrated in FIG. 7).

(3) Traverse along the height dimension of the kernel stack 208 (the M dimension or the kernel stack y dimension ($S_y$), which equals to 8 for the kernel stack 208 illustrated in FIG. 7).

(4) Traverse along the height dimension of the kernel stack 208 (the M dimension or the kernel stack y dimension ($S_x$), which equals to 8 for the kernel stack 208 illustrated in FIG. 7).

The traversal continues until the runnel is completely filled with weight values.

This traversal can be alternatively expressed as:
(1) for each $S_x$
(2) for each $S_y$
(3) for each $K_y$
(4) for each $K_x$.

In some implementations, a tile can be an ordered list of runnels, where the number of runnels can be chosen such that a "tile" always begins on a kernel stack height boundary (also referred to as a kernel stack column boundary) and ends on a kernel stack height boundary. As illustrated in FIG. 6A, the weight values of the kernels 601, 609, 617, 625, 633, 641, 649, and 657 can be reordered and processed on a first core of a processor, the weight values of the kernels 602, 610, 618, 626, 634, 642, 650, and 658 can be reordered and processed on a second core of a processor, etc.

For a SIMD register with a 128-bit width, the runnel width can also be 128 bits. If a weight value of the kernels has a size of 8 bits, a 128-bit SIMD register can contain eight weight values. Thus, a runnel can include eight 8-bit weight values. The number of runnels per tile can be based on the above traversal priority: the runnel can be filled with weight values 601a, 601d, 601g, 609a, 609d, 609g, 617a, 617d, 617g, 625a, 625d, 625g, 633a, 633d, 633g, 641a, 641d, 641g, 649a, 649d, 649g, 657a, 657d, 657g, 601b, 601e, 601h, ... 657b, 657e, 657h, 601c, 601f, 601i, ... 657c, 657f, and 657i. These weight values can be processed with one processor core. The remaining weight values can be reordered as illustrated and processed with other processor cores.

In some embodiments, runnels can be filled iteratively with respect to the following traversal priority given an arbitrary starting point in a kernel:

(1) Traverse along the width dimension of the individual kernel ($K_x$, which equals to 3 for a kernel of the kernel stack 208 illustrated in FIG. 7).

(2) Traverse along the height dimension of the individual kernel ($K_y$, which equals to 3 for a kernel of the kernel stack 208 illustrated in FIG. 7).

(3) Traverse along the height dimension of the kernel stack 208 (the M dimension or the kernel stack y dimension ($S_y$), which equals to 8 for the kernel stack 208 illustrated in FIG. 7).

(4) Traverse along the height dimension of the kernel stack 208 (the M dimension or the kernel stack x dimension ($S_x$), which equals to 8 for the kernel stack 208 illustrated in FIG. 7).

The traversal continues until the runnel is completely filled with weight values.

This traversal can be alternatively expressed as:

(1) for each $S_x$
(2) for each $S_y$
(3) for each $K_x$
(4) for each $K_y$.

Example Reordering of Kernel Weights

The methods described with reference to FIGS. 5A-5C, 6A, 6B, and 77 can be generalized as illustrated below. "REB" denotes the size of an element in a SIMD register, in bits. "RWB" stands for the width of the SIMD register in bits. "RWE" denotes the width of the SIMD register in elements. Runnel includes a collection of N weights, where N=RWE. In other words, the following relation stands: RWE*REB=RWB (the number of elements in each SIMD register, times the number of bits that the each element occupies equals the size of the SIMD register in bits). For example, a 128-bit SIMD register can be broken into 4 elements of 32-bits, or 8 elements of 16-bits, or 32 elements of 8-bits, 128 elements of 1-bit and all other possible combinations depending on hardware support.

$K_W$ denotes the width of the kernel in elements. Without loss of generality, each element in the kernel can be REB bits. Otherwise the SIMD register can be divided differently such that the size of each element in bits, would end up being equal to the size of the kernel elements in bits, if the hardware supports that bit-depth, or in case it does not, promote the element size to the next supported size upon load. $K_H$ as the height of the kernel in elements. For example, A 3×3 kernel has $K_W$=3, and $K_W$=3. A 5×1 kernel has $K_W$=1, and $K_H$=5.

$S_W$ denotes the width of the kernel stack in kernels (not kernel elements, but individual kernels). $S_H$ denotes the height of the kernel stack in kernels. For example, a 4×12 kernel stack composed of 3×1 kernels, has $S_W$=12 (also equal to the number of output channels), $S_H$=4 (also equal to the number of input channels), $K_W$=1, and $K_H$=3.

Below describes indexing the kernels column by column and row by row. The indexing can be one dimensional. Kernels can be indexed from left to right, and top to bottom and assign them a number from 1 to $S_W*S_H$. Table 3 below depicts the weights in one single kernel, where the diagram above was picturing different kernels in a kernel stack.

TABLE 3

Indexing kernels of a kernel stack.

| 1 | 2 | 3 | ... | $S_W$ |
|---|---|---|---|---|
| $S_W$ + 1 | $S_W$ + 2 | $S_W$ + 3 | ... | 2 * $S_W$ |
| ... | ... | ... | ... | ... |
| $(S_H - 1) * S_W + 1$ | $(S_H - 1) * S_W + 2$ | $(S_H - 1) * S_W + 3$ | ... | $S_H * S_W$ |

The weights in each individual kernel can be similarly indexed column by column and row by row. Table 4 below depicts the weights in one single kernel, where Table 3 above depicts different kernels in a kernel stack. The elements in the kernel are indexed from left to right, and top to bottom incrementally.

TABLE 4

Indexing kernel weights of a kernel.

| 1 | 2 | 3 | ... | $K_W$ |
|---|---|---|---|---|
| $K_W$ + 1 | $K_W$ + 2 | $K_W$ + 3 | ... | 2 * $K_W$ |
| ... | ... | ... | ... | ... |
| $(K_H - 1) * K_W + 1$ | $(K_H - 1) * K_W + 2$ | $(K_H - 1) * K_W + 3$ | ... | $K_H * K_W$ |

The method described with reference to FIGS. 6A and 6B can require a row to be divisible by the number of elements in register width. In other words: $(S_W*K_W)$ mod (RWE)=0. But if that holds, then all reasonable arrangements can be given by:

Start walking the kernel stack (Table 3) in increasing number of associated indices. Traverse the kernels, N (where N=RWE) kernel at a time, and compose a runnel by picking N (where N=RWE) weights from the corresponding (e.g., the same) indices of each individual kernel (Table 4) Then select another (or same) batch of N kernels following the indices in Table 3, and compose another runnel by picking N weights with corresponding indices. The same kernels can be chosen but the selected weights must be different, otherwise weights would end up getting duplicated. So for instance the most straightforward and reasonable arrangements would be those depicted in FIG. 6A: kernel 1 weight 1, followed by kernel 2 weight 1, followed by kernel 3 weight 1, . . . , followed by kernel N (where N equals RWE) weight 1, followed by kernel 1 weight 2, . . . , followed by kernel N weight 2, . . . , followed by kernel 1 weight M (where M=$K_W*K_H$), . . . , followed by kernel N weight M, followed by the exact same pattern for the second patch of N kernels until all kernels are exhausted.

All possible arrangements (most of which are not straight forward but certainly possible) would be given by the following traversal: Select N kernels from N different columns of the kernel stack (in other words, no two kernels from the same columns of the kernel stack). Then compose a runnel out of N (where N=RWE) weights, each from one of the aforementioned selected kernels. Repeat the process by making another runnel out of another N weights from another (or same) batch of N kernels with the limitation that each kernel must come from a separate column of the stack, until all weights are exhausted. Each individual arrangement given by any of the traversals mentioned above or below requires a slightly different algorithm (be it software code or hardware logic) to arrive at correct output. In some embodiments, the same algorithm cannot be applied to different arrangements.

With respect to the methods described with reference to FIG. 7, the definitions above apply, but the traversal is slightly different. In this embodiment, the selected kernels can be limited to one column (as opposed to forcing them to come from different columns like the methods described with reference to FIGS. 6A and 6B). Table 3 can be re-indexed from top to bottom and left to right (as opposed to left to right and top to bottom) as shown in Table 5.

TABLE 5

Indexing kernels of a kernel stack.

| 1 | $S_H$ + 1 | 2 * $S_H$ + 1 | ... | $(S_W - 1) * S_H + 1$ |
|---|---|---|---|---|
| 2 | $S_H$ + 2 | 2 * $S_H$ + 2 | ... | $(S_W - 1) * S_H + 2$ |
| ... | ... | ... | ... | ... |
| $S_H$ | 2 * $S_H$ | 3 * $S_H$ | ... | $S_W * S_H$ |

Traverse the kernel stack (Table 5) in increasing number of associated indices. Traverse the kernels, N (where N=RWE) kernel at a time, and compose a runnel out of N (where N=RWE) weights from the corresponding (e.g., the same) indices of each individual kernel (Table 4). Then select another (or same) batch of N kernels following the indices in Table 5, and form a runnel from another N weights with corresponding indices. All possible (but mostly not straight forward) arrangements can be arrived at by this traversal: Select N kernels from the same column of the kernel stack. Then make a runnel out of N (where N=RWE) weights, each from one of the aforementioned selected kernels. Repeat the process by picking another N weights from another (or same) batch of N kernels with the limitation that all kernels must come from the same column of the stack, until all weights are exhausted. Different arrangements can require slightly different algorithms.

Example Process of Determining Output Activation Maps Tile by Tile

After reordering pixel values of input activation maps (e.g., input activation maps 404, 408, 412, and 416) and reordering weight values of kernels of the kernel stack 208 in memory runnel by runnel (e.g., the reordering shown in FIGS. 5A-5C), the weight values can be processed tile by tile to determine output activation maps as outlined by the example pseudo-codes below:

(1) For each row r of a reordered output activation map:
(2) For each column c of the output activation map:
(3a) Set a value of the reordered output activation map at position (c, r) to a value of zero.
(3b) For each tile of the kernel stack:
(4) For each runnel of that tile of the kernel stack, and a corresponding reordered input activation map pixel value (or two or more corresponding reordered input activation map pixel value):
(5a) Load the corresponding reordered input activation map pixel value(s) and duplicate to a SIMD register.
(5b) FMADD the reordered output activation map pixel value, the reordered input activation map pixel value, and the runnel, where FMADD denotes a fused-multiply-add operation.
End of (4).
End of (3b).
(3c) Store the cluster of values of the reordered output activation map to the output activation map at position (c, r).
End of (2).
End of Step (1).

In some implementations, actions (4) and (5) can be fully unrolled for efficient implementations of the FMADD operations.

The example pseudo-codes above can be written as:

```
For each row of output activation map
    For each column of output activation map
        // Initialize output tile to zero.
        output_tile = { 0 }
        For each tile of the kernel stack
            // Below loop can be fully unrolled
            For each runnel of that kernel stack tile, and corresponding input tile
                FMADD corresponding runnels of output_tile, input_tile and kernel_tile
            Store output_tile to output activation map at 'row' and 'column'
```

Figure 8:
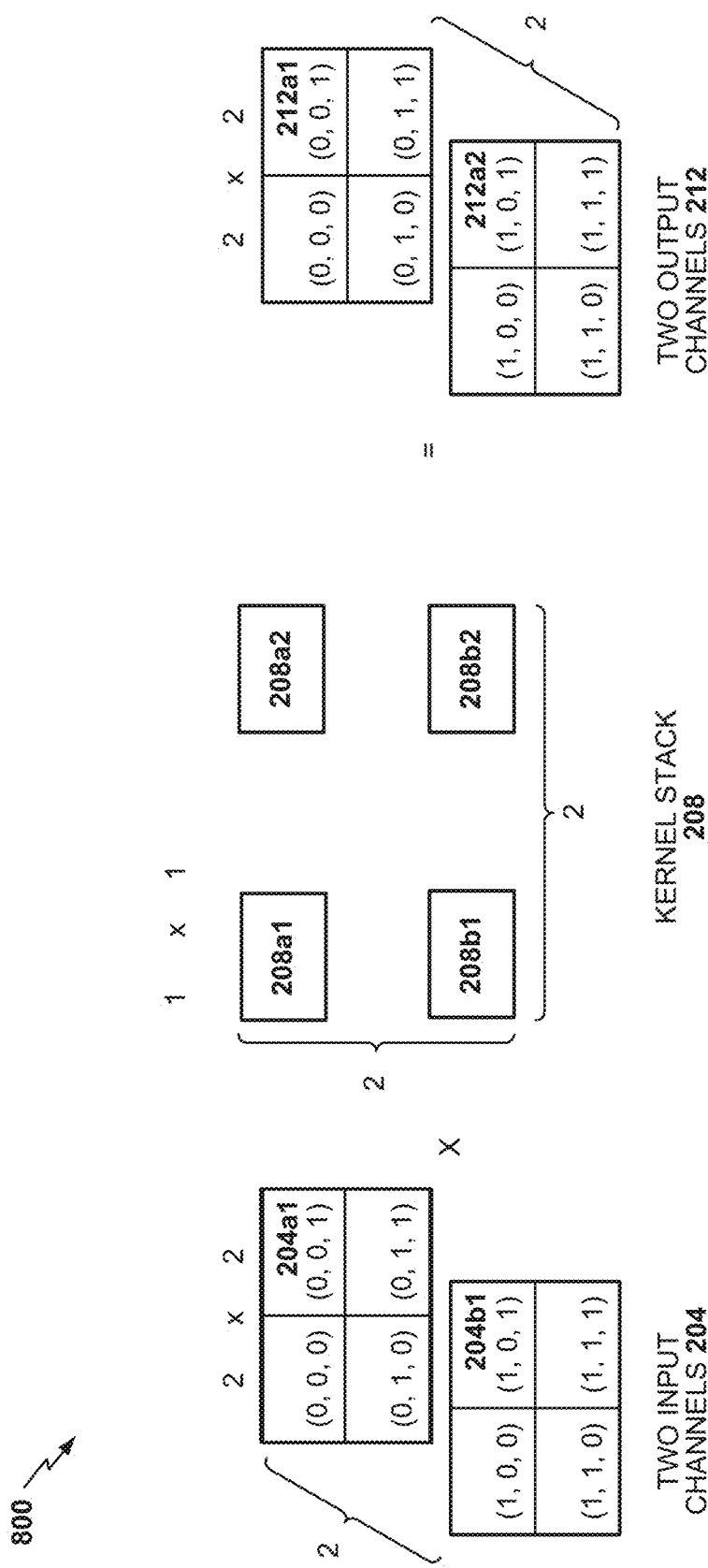
FIG. 8 schematically illustrates an example 3D convolutional layer of a convolutional neural network for illustrating determining output activation maps tile by tile.

FIG. 8 schematically illustrates an example 3D convolutional layer of a convolutional neural network 800 for illustrating determining output activation maps tile by tile. The CNN 800 is an example of the CNN 200 shown in FIG. 2, with two input channels 204 for receiving two input activation maps 204a1 and 204a2 (M=2), and two output channels 212 for determining two output activation maps 212a1 and 212a2 (N=2). In FIG. 8, the kernel stack 208 includes kernels 208a1, 208a2, 208b1, and 208b2, each kernel with a dimensionality of 1 by 1 ($K_y$=1 and $K_x$=1). If a SIMD register can include two weight values of the kernel stack 208 given the data type of the weight values and the width of the register is two, then tile two with one runnel includes the kernel 208a1 and the kernel 208a2, and tile two with one runnel includes the kernel 208b1 and the kernel 208b2.

With zero-based indexing, to determine channel 0 (i.e., the output activation map 212a1), row 0, and column 0 of the output channels 212, abbreviated as Output(0, 0, 0), and Output(1, 0, 0), perform the following operations:

(1) Load Input(0, 0, 0) and duplicate to a SIMD register (Input(0, 0, 0) denotes channel 0 (i.e., the input activation map 204a1), row 0, and column 0 of the input channels 204).
(2) Multiply Input(0, 0, 0) by the runnel of tile one (that includes kernels 208a1 and 208a2) and accumulate with action (2).
(3) Load Input(1, 0, 0) and duplicate to a SIMD register.
(4) Multiply Input(1, 0, 0) by the runnel of tile two (that includes kernels 208b1 and 208b2).
(5) Store Output(0, 0, 0) and Output(1, 0, 0) consecutively to maintain the interleaved ordering.

To determine Output(0, 0, 1) and Output (1, 0, 1), perform the following operations:

(1) Load Input(0, 0, 1) and duplicate to a SIMD register.
(2) Multiply Input(0, 0, 1) by the runnel of tile one.
(3) Load Input(1, 0, 1) and duplicate to a SIMD register.
(4) Multiply Input(1, 0, 1) by the runnel of tile two and accumulate with action (2).
(5) Store Output(0, 0, 1) and Output(1, 0, 1) consecutively.

The above process can be repeated to determine Output(0, 1, 0) and Output(1, 1, 0), and Output(0, 1, 1) and Output(1, 1, 1).

After reordering pixel values of input activation maps and reordering weight values of kernels of the kernel stack 208 in memory runnel by runnel (e.g., the reordering shown in FIGS. 6A and 6B), the weight values can be processed tile by tile to determine output activation maps as outlined by the example pseudo-codes below:

```
For each row of output activation map:
    For each column of output activation map:
        // Initialize output runnel to zero.
        output_runnel = { 0 }
        // Below loop can be fully unrolled
        For each kernel runnel as described in arrangement (a)
            FMADD corresponding runnels of input, output and kernel
        Store output_runnel to output activation map at 'row' and 'column'
```

Different arrangements described herein affect the italicized portion. In other words, depending on how the kernel is arranged, the corresponding runnel of the input from the interleaved activation map that is loaded and multiplied can be different.

After reordering pixel values of input activation maps and reordering weight values of kernels of the kernel stack 208 in memory runnel by runnel (e.g., the reordering shown in FIG. 7), the weight values can be processed tile by tile to determine output activation maps as outlined by the example pseudo-codes below:

```
For each row of output activation map:
    For each column of output activation map:
        // Initialize output activation to zero.
        output_activation = { 0 }
        // Below loop can be fully unrolled
        For each kernel runnel as described in arrangement (a)
            FMADD corresponding runnels of input, output and kernel
        // Reduce the output runnel to a single value via a horizontal vector
sum prior to the store operation
        Store horizontal_vec_sum(output_runnel) to output
activation map at 'row' and 'column'
```

Different arrangements described herein affect the italicized portion. In other words, depending on how the kernel is arranged, the corresponding runnel of the input from the interleaved activation map that is loaded and multiplied can be different.

Advantageously, in some embodiments, duplication works efficiently because of the runnel setup: the width of the kernel stack is a multiple of the number of weights values that the SIMD register can include. In some embodiments, the width of the kernel stack may not be a multiple of the number of weights values that the SIMD register can include. To efficiently implement the methods disclosed herein, the types of loads and stores performed may be specialized. A CNN can be designed so that the width of the kernel stack is a multiple of the number of weights values that the SIMD register can include. With such a design, better SIMD utilization may be achieved.

Figure 9A:
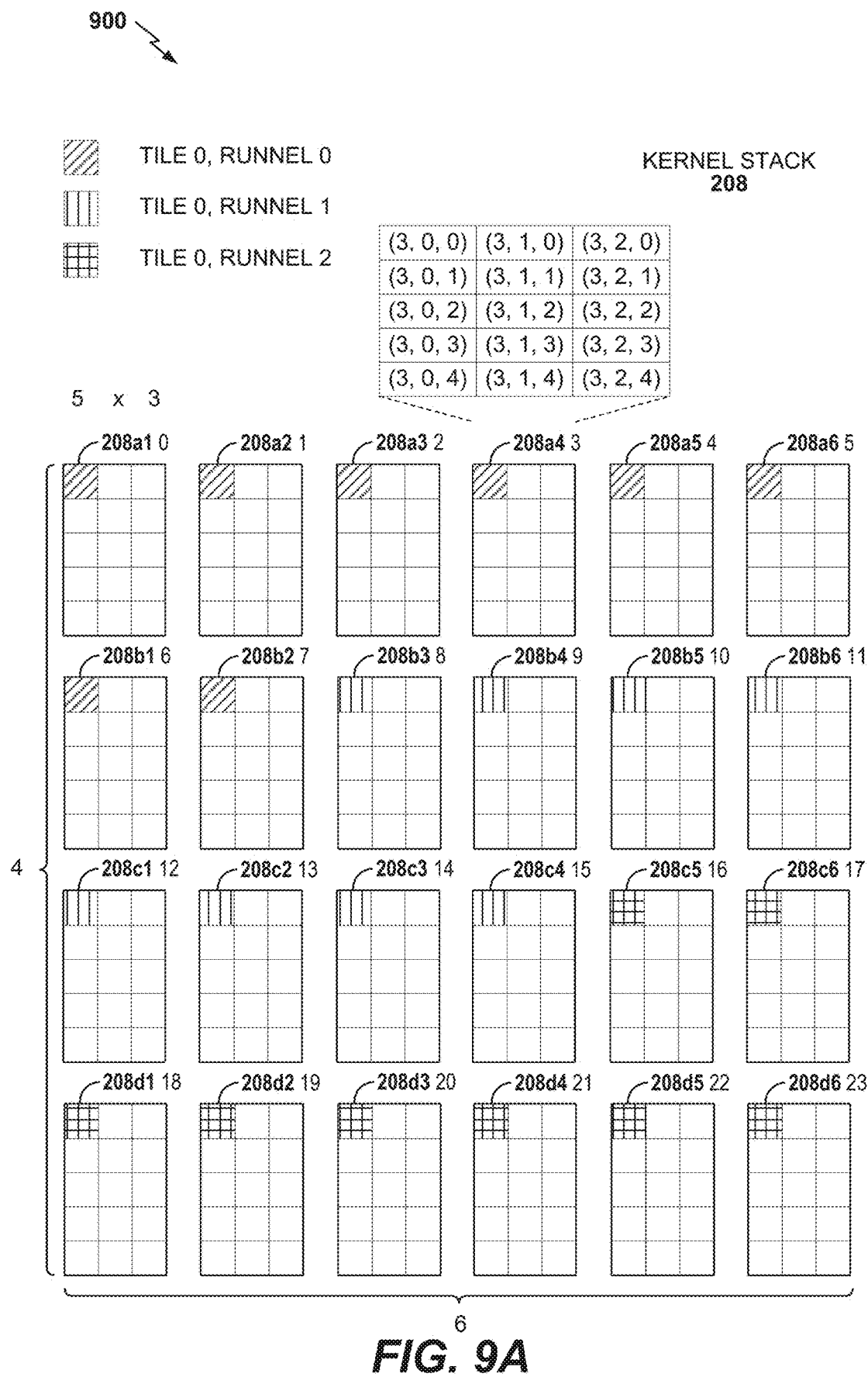

Example Process of Determining Output Activation Maps Tile by Tile with Kernel Stack Runnels Straddling Multiple Rows of Kernel Stack Weight Values FIGS. 9A-9B schematically illustrate an example 3D convolutional layer 900 of a convolutional neural network for illustrating determining output activation maps tile by tile with kernel stack runnels straddling multiple rows of kernel stack weight values. The CNN 900 is an example of the CNN 200 shown in FIG. 2, with four input channels for receiving four input activation maps (M=4), and six output channels for determining six output activation maps (N=6). In FIG. 9A, the kernel stack 208, with a dimensionality of 4 by 6, includes kernels 208a1-208a6, 208b1-208b6, 208c1-208c6, and 208d1-208d6 each kernel with a dimensionality of 5 by 3 ($K_y=5$ and $K_x=3$). As shown in FIG. 9A, the kernels 208a1-208a6, 208b1-208b6, 208c1-208c6, and 208d1-208d6 are abbreviated as kernels 0-5, 6-11, 12-17, and 18-23 respectively.

A weight value of a kernel of the kernel stack 208 can be represented by a triplet (x, y, z), where x denotes the kernel, y denotes the column/width coordinate in kernel x, and z denotes the row/height coordinate in kernel x. As shown in FIG. 9A, the triplet representations of weight values of the kernel 208a4 3 are, with zero-based indexing, (3, 0, 0)-(3, 2, 0), (3, 0, 1)-(3, 2, 1), (3, 0, 2)-(3, 2, 2), (3, 0, 3)-(3, 2, 3), and (3, 0, 4)-(3, 2, 4).

Reordering the weight values of the kernels of the kernel stack 208 into tiles of runnels at design time can require knowing (1) the width of a SIMD register of the architecture that the kernel stack 208 is designed for; and (2) the data type of the weight values of the kernels of the kernel stack 208.

For example, if a SIMD register of a computer architecture has a width of 128 bits, and the weight values are half-precision floating point numbers (i.e., 16-bit each), each runnel can hold eight weight values (128 bits, the width of the SIMD register, divided by 16 bits, the size of a weight value).

The kernels of the kernel stack 208 can be reordered from a basic layout of the kernels into a tile layout of the kernels. The kernel stack 208 in a tile layout can include 14 tiles of three runnels each. Table 6 shows the weight values of the kernel stack 208 in a tile layout using the triplet representation. In FIG. 9, tile 0, runnel 0 is shown with a diagonal cross hatching pattern, tile 0, runnel 1 is shown with a vertical cross hatching pattern, and tile 0, runnel 2 is shown with a cross hatching pattern.

TABLE 6

Tiles of the kernel stack 208 in a tile layout

| Tile | Runnel | Weight Values |
|---|---|---|
| Tile 0 | Runnel 0 | (0, 0, 0), (1, 0, 0), (2, 0, 0), (3, 0, 0), (4, 0, 0), (5, 0, 0), (6, 0, 0), (7, 0, 0) |
|  | Runnel 1 | (8, 0, 0), (9, 0, 0), (10, 0, 0), (11, 0, 0), (12, 0, 0), (13, 0, 0), (14, 0, 0), (15, 0, 0) |
|  | Runnel 2 | (16, 0, 0), (17, 0, 0), (18, 0, 0), (19, 0, 0), (20, 0, 0), (21, 0, 0), (22, 0, 0), (23, 0, 0) |
| Tile 1 | Runnel 0 | (0, 1, 0), (1, 1, 0), (2, 1, 0), (3, 1, 0), (4, 1, 0), (5, 1, 0), (6, 1, 0), (7, 1, 0) |
|  | Runnel 1 | (8, 1, 0), (9, 1, 0), (10, 1, 0), (11, 1, 0), (12, 1, 0), (13, 1, 0), (14, 1, 0), (15, 1, 0) |
|  | Runnel 2 | (16, 1, 0), (17, 1, 0), (18, 1, 0), (19, 1, 0), (20, 1, 0), (21, 1, 0), (22, 1, 0), (23, 1, 0) |
| Tile 2 | Runnel 0 | (0, 2, 0), (1, 2, 0), (2, 2, 0), (3, 2, 0), (4, 2, 0), (5, 2, 0), (6, 2, 0), (7, 2, 0) |
|  | Runnel 1 | (8, 2, 0), (9, 2, 0), (10, 2, 0), (11, 2, 0), (12, 2, 0), (13, 2, 0), (14, 2, 0), (15, 2, 0) |
|  | Runnel 2 | (16, 2, 0), (17, 2, 0), (18, 2, 0), (19, 2, 0), (20, 2, 0), (21, 2, 0), (22, 2, 0), (23, 2, 0) |
| Tile 3 | Runnel 0 | (0, 0, 1), (1, 0, 1), (2, 0, 1), (3, 0, 1), (4, 0, 1), (5, 0, 1), (6, 0, 1), (7, 0, 1) |
|  | Runnel 1 | (8, 0, 1), (9, 0, 1), (10, 0, 1), (11, 0, 1), (12, 0, 1), (13, 0, 1), (14, 0, 1), (15, 0, 1) |
|  | Runnel 2 | (16, 0, 1), (17, 0, 1), (18, 0, 1), (19, 0, 1), (20, 0, 1), (21, 0, 1), (22, 0, 1), (23, 0, 1) |
| Tile 4 | Runnel 0 | (0, 1, 1), (1, 1, 1), (2, 1, 1), (3, 1, 1), (4, 1, 1), (5, 1, 1), (6, 1, 1), (7, 1, 1) |
|  | Runnel 1 | (8, 1, 1), (9, 1, 1), (10, 1, 1), (11, 1, 1), (12, 1, 1), (13, 1, 1), (14, 1, 1), (15, 1, 1) |
|  | Runnel 2 | (16, 1, 1), (17, 1, 1), (18, 1, 1), (19, 1, 1), (20, 1, 1), (21, 1, 1), (22, 1, 1), (23, 1, 1) |
| Tile 5 | Runnel 0 | (0, 2, 1), (1, 2, 1), (2, 2, 1), (3, 2, 1), (4, 2, 1), (5, 2, 1), (6, 2, 1), (7, 2, 1) |
|  | Runnel 1 | (8, 2, 1), (9, 2, 1), (10, 2, 1), (11, 2, 1), (12, 2, 1), (13, 2, 1), (14, 2, 1), (15, 2, 1) |
|  | Runnel 2 | (16, 2, 1), (17, 2, 1), (18, 2, 1), (19, 2, 1), (20, 2, 1), (21, 2, 1), (22, 2, 1), (23, 2, 1) |
| Tile 6 | Runnel 0 | (0, 0, 2), (1, 0, 2), (2, 0, 2), (3, 0, 2), (4, 0, 2), (5, 0, 2), (6, 0, 2), (7, 0, 2) |
|  | Runnel 1 | (8, 0, 2), (9, 0, 2), (10, 0, 2), (11, 0, 2), (12, 0, 2), (13, 0, 2), (14, 0, 2), (15, 0, 2) |
|  | Runnel 2 | (16, 0, 2), (17, 0, 2), (18, 0, 2), (19, 0, 2), (20, 0, 2), (21, 0, 2), (22, 0, 2), (23, 0, 2) |

TABLE 6-continued

Tiles of the kernel stack 208 in a tile layout

| Tile | Runnel | Weight Values |
|---|---|---|
| Tile 7 | Runnel 0 | (0, 1, 2), (1, 1, 2), (2, 1, 2), (3, 1, 2), (4, 1, 2), (5, 1, 2), (6, 1, 2), (7, 1, 2) |
|  | Runnel 1 | (8, 1, 2), (9, 1, 2), (10, 1, 2), (11, 1, 2), (12, 1, 2), (13, 1, 2), (14, 1, 2), (15, 1, 2) |
|  | Runnel 2 | (16, 1, 2), (17, 1, 2), (18, 1, 2), (19, 1, 2), (20, 1, 2), (21, 1, 2), (22, 1, 2), (23, 1, 2) |
| Tile 8 | Runnel 0 | (0, 2, 2), (1, 2, 2), (2, 2, 2), (3, 2, 2), (4, 2, 2), (5, 2, 2), (6, 2, 2), (7, 2, 2) |
|  | Runnel 1 | (8, 2, 2), (9, 2, 2), (10, 2, 2), (11, 2, 2), (12, 2, 2), (13, 2, 2), (14, 2, 2), (15, 2, 2) |
|  | Runnel 2 | (16, 2, 2), (17, 2, 2), (18, 2, 2), (19, 2, 2), (20, 2, 2), (21, 2, 2), (22, 2, 2), (23, 2, 2) |
| Tile 9 | Runnel 0 | (0, 0, 3), (1, 0, 3), (2, 0, 3), (3, 0, 3), (4, 0, 3), (5, 0, 3), (6, 0, 3), (7, 0, 3) |
|  | Runnel 1 | (8, 0, 3), (9, 0, 3), (10, 0, 3), (11, 0, 3), (12, 0, 3), (13, 0, 3), (14, 0, 3), (15, 0, 3) |
|  | Runnel 2 | (16, 0, 3), (17, 0, 3), (18, 0, 3), (19, 0, 3), (20, 0, 3), (21, 0, 3), (22, 0, 3), (23, 0, 3) |
| Tile 10 | Runnel 0 | (0, 1, 3), (1, 1, 3), (2, 1, 3), (3, 1, 3), (4, 1, 3), (5, 1, 3), (6, 1, 3), (7, 1, 3) |
|  | Runnel 1 | (8, 1, 3), (9, 1, 3), (10, 1, 3), (11, 1, 3), (12, 1, 3), (13, 1, 3), (14, 1, 3), (15, 1, 3) |
|  | Runnel 2 | (16, 1, 3), (17, 1, 3), (18, 1, 3), (19, 1, 3), (20, 1, 3), (21, 1, 3), (22, 1, 3), (23, 1, 3) |
| Tile 11 | Runnel 0 | (0, 2, 3), (1, 2, 3), (2, 2, 3), (3, 2, 3), (4, 2, 3), (5, 2, 3), (6, 2, 3), (7, 2, 3) |
|  | Runnel 1 | (8, 2, 3), (9, 2, 3), (10, 2, 3), (11, 2, 3), (12, 2, 3), (13, 2, 3), (14, 2, 3), (15, 2, 3) |
|  | Runnel 2 | (16, 2, 3), (17, 2, 3), (18, 2, 3), (19, 2, 3), (20, 2, 3), (21, 2, 3), (22, 2, 3), (23, 2, 3) |
| Tile 12 | Runnel 0 | (0, 0, 4), (1, 0, 4), (2, 0, 4), (3, 0, 4), (4, 0, 4), (5, 0, 4), (6, 0, 4), (7, 0, 4) |
|  | Runnel 1 | (8, 0, 4), (9, 0, 4), (10, 0, 4), (11, 0, 4), (12, 0, 4), (13, 0, 4), (14, 0, 4), (15, 0, 4) |
|  | Runnel 2 | (16, 0, 4), (17, 0, 4), (18, 0, 4), (19, 0, 4), (20, 0, 4), (21, 0, 4), (22, 0, 4), (23, 0, 4) |
| Tile 13 | Runnel 0 | (0, 1, 4), (1, 1, 4), (2, 1, 4), (3, 1, 4), (4, 1, 4), (5, 1, 4), (6, 1, 4), (7, 1, 4) |
|  | Runnel 1 | (8, 1, 4), (9, 1, 4), (10, 1, 4), (11, 1, 4), (12, 1, 4), (13, 1, 4), (14, 1, 4), (15, 1, 4) |
|  | Runnel 2 | (16, 1, 4), (17, 1, 4), (18, 1, 4), (19, 1, 4), (20, 1, 4), (21, 1, 4), (22, 1, 4), (23, 1, 4) |
| Tile 14 | Runnel 0 | (0, 2, 4), (1, 2, 4), (2, 2, 4), (3, 2, 4), (4, 2, 4), (5, 2, 4), (6, 2, 4), (7, 2, 4) |
|  | Runnel 1 | (8, 2, 4), (9, 2, 4), (10, 2, 4), (11, 2, 4), (12, 2, 4), (13, 2, 4), (14, 2, 4), (15, 2, 4) |
|  | Runnel 2 | (16, 2, 4), (17, 2, 4), (18, 2, 4), (19, 2, 4), (20, 2, 4), (21, 2, 4), (22, 2, 4), (23, 2, 4) |

Advantageously, reordering the weight values of the kernel stack 208 can occur once during design time. Furthermore, reordering of input activation maps may occur at most once per input image of a CNN. For example, an input layer of a CNN may reorder an input image of the CNN from a basic layout into an interleaved layout. FIG. 9B shows a reordered input activation map 420.

In some embodiments, kernel stack runnels each include only one row, or a portion of one row, of the weight values in the kernel stack. Thus, a pixel value of a reordered input map can be duplicated to a SIMD register when determining output activation maps tiles by tiles. The process of duplicating to a SIMD register a pixel value of a reordered input map can be referred to as constructing an input runnel. Input runnels can be constructed from an input map in an interleaved layout by duplicating pixels in one channel of an input map in an interleaved layout.

In some embodiments, kernel stack runnels can straddle multiple rows of weight values. Table 6 and FIG. 9A show that some runnels that straddle multiple rows of weight values of the kernel stack 208. For example, tile 0, runnel 0 in Table 6 straddles two rows. If kernel stack runnels straddle multiple rows of the weight values of the kernel stack 208, a SIMD register can contain values of two or more pixel values. A pixel value may be loaded and duplicated to two or more SIMD registers. This may be necessary because all the weight values in each row of each kernel must be multiplied by pixel values in a channel of the input activation maps. Input runnels can be constructed from an input map in an interleaved layout. For example, constructing an input runnel can include duplicating the corresponding pixel value of the first input channel six times and the corresponding pixel value of the second input channel twice. As another example, constructing an input runnel can include duplicating the corresponding pixel of the second input channel four times, and the corresponding pixel of the third input channel four times. As yet another example, constructing an input runnel can include duplicating the corresponding pixel of the third input channel twice times and the corresponding pixel of the fourth (and last) input channel six times.

FIG. 9B shows a reordered input activation map 420 in an interleaved layout for the example 3D convolutional layer 900 shown in FIG. 9A. The interleaving pattern of input pixel values can continue to the boundaries of the input activation map 420. Pixels with the same hatching patterns belong to the same input activation map in a basic layout. In FIG. 9B, each triplet (x, y, z) represents a pixel value at row y, column z of channel x. Table 7 shows the input runnels for performing one convolution involving tiles of the kernel stack 208 in a tile layout.

TABLE 7

Input map runnels for the kernel stack 208 in a tile layout shown in Table 6.

| Tile | Runnel | Weight Values |
|---|---|---|
| Tile 0 | Runnel 0 | (0, 0, 0), (0, 0, 0), (0, 0, 0), (0, 0, 0), (0, 0, 0), (0, 0, 0), (1, 0, 0), (1, 0, 0) |
|  | Runnel 1 | (1, 0, 0), (1, 0, 0), (1, 0, 0), (1, 0, 0), (2, 0, 0), (2, 0, 0), (2, 0, 0), (2, 0, 0) |
|  | Runnel 2 | (2, 0, 0), (2, 0, 0), (3, 0, 0), (3, 0, 0), (3, 0, 0), (3, 0, 0), (3, 0, 0), (3, 0, 0) |
| Tile 1 | Runnel 0 | (0, 0, 1), (0, 0, 1), (0, 0, 1), (0, 0, 1), (0, 0, 1), (0, 0, 1), (1, 0, 1), (1, 0, 1) |
|  | Runnel 1 | (1, 0, 1), (1, 0, 1), (1, 0, 1), (1, 0, 1), (2, 0, 1), (2, 0, 1), (2, 0, 1), (2, 0, 1) |
|  | Runnel 2 | (2, 0, 1), (2, 0, 1), (3, 0, 1), (3, 0, 1), (3, 0, 1), (3, 0, 1), (3, 0, 1), (3, 0, 1) |
| Tile 2 | Runnel 0 | (0, 0, 2), (0, 0, 2), (0, 0, 2), (0, 0, 2), (0, 0, 2), (0, 0, 2), (1, 0, 2), (1, 0, 2) |
|  | Runnel 1 | (1, 0, 2), (1, 0, 2), (1, 0, 2), (1, 0, 2), (2, 0, 2), (2, 0, 2), (2, 0, 2), (2, 0, 2) |
|  | Runnel 2 | (2, 0, 2), (2, 0, 2), (3, 0, 2), (3, 0, 2), (3, 0, 2), (3, 0, 2), (3, 0, 2), (3, 0, 2) |

TABLE 7-continued

Input map runnels for the kernel stack 208 in a tile layout shown in Table 6.

| Tile | Runnel | Weight Values |
|---|---|---|
| Tile 3 | Runnel 0 | (0, 1, 0), (0, 1, 0), (0, 1, 0), (0, 1, 0), (0, 1, 0), (0, 1, 0), (1, 1, 0), (1, 1, 0) |
|  | Runnel 1 | (1, 1, 0), (1, 1, 0), (1, 1, 0), (1, 1, 0), (2, 1, 0), (2, 1, 0), (2, 1, 0), (2, 1, 0) |
|  | Runnel 2 | (2, 1, 0), (2, 1, 0), (3, 1, 0), (3, 1, 0), (3, 1, 0), (3, 1, 0), (3, 1, 0), (3, 1, 0) |
| Tile 4 | Runnel 0 | (0, 1, 1), (0, 1, 1), (0, 1, 1), (0, 1, 1), (0, 1, 1), (0, 1, 1), (1, 1, 1), (1, 1, 1) |
|  | Runnel 1 | (1, 1, 1), (1, 1, 1), (1, 1, 1), (1, 1, 1), (2, 1, 1), (2, 1, 1), (2, 1, 1), (2, 1, 1) |
|  | Runnel 2 | (2, 1, 1), (2, 1, 1), (3, 1, 1), (3, 1, 1), (3, 1, 1), (3, 1, 1), (3, 1, 1), (3, 1, 1) |
| Tile 5 | Runnel 0 | (0, 1, 2), (0, 1, 2), (0, 1, 2), (0, 1, 2), (0, 1, 2), (0, 1, 2), (1, 1, 2), (1, 1, 2) |
|  | Runnel 1 | (1, 1, 2), (1, 1, 2), (1, 1, 2), (1, 1, 2), (2, 1, 2), (2, 1, 2), (2, 1, 2), (2, 1, 2) |
|  | Runnel 2 | (2, 1, 2), (2, 1, 2), (3, 1, 2), (3, 1, 2), (3, 1, 2), (3, 1, 2), (3, 1, 2), (3, 1, 2) |
| Tile 6 | Runnel 0 | (0, 2, 0), (0, 2, 0), (0, 2, 0), (0, 2, 0), (0, 2, 0), (0, 2, 0), (1, 2, 0), (1, 2, 0) |
|  | Runnel 1 | (1, 2, 0), (1, 2, 0), (1, 2, 0), (1, 2, 0), (2, 2, 0), (2, 2, 0), (2, 2, 0), (2, 2, 0) |
|  | Runnel 2 | (2, 2, 0), (2, 2, 0), (3, 2, 0), (3, 2, 0), (3, 2, 0), (3, 2, 0), (3, 2, 0), (3, 2, 0) |
| Tile 7 | Runnel 0 | (0, 2, 1), (0, 2, 1), (0, 2, 1), (0, 2, 1), (0, 2, 1), (0, 2, 1), (1, 2, 1), (1, 2, 1) |
|  | Runnel 1 | (1, 2, 1), (1, 2, 1), (1, 2, 1), (1, 2, 1), (2, 2, 1), (2, 2, 1), (2, 2, 1), (2, 2, 1) |
|  | Runnel 2 | (2, 2, 1), (2, 2, 1), (3, 2, 1), (3, 2, 1), (3, 2, 1), (3, 2, 1), (3, 2, 1), (3, 2, 1) |
| Tile 8 | Runnel 0 | (0, 2, 2), (0, 2, 2), (0, 2, 2), (0, 2, 2), (0, 2, 2), (0, 2, 2), (1, 2, 2), (1, 2, 2) |
|  | Runnel 1 | (1, 2, 2), (1, 2, 2), (1, 2, 2), (1, 2, 2), (2, 2, 2), (2, 2, 2), (2, 2, 2), (2, 2, 2) |
|  | Runnel 2 | (2, 2, 2), (2, 2, 2), (3, 2, 2), (3, 2, 2), (3, 2, 2), (3, 2, 2), (3, 2, 2), (3, 2, 2) |
| Tile 9 | Runnel 0 | (0, 3, 0), (0, 3, 0), (0, 3, 0), (0, 3, 0), (0, 3, 0), (0, 3, 0), (1, 3, 0), (1, 3, 0) |
|  | Runnel 1 | (1, 3, 0), (1, 3, 0), (1, 3, 0), (1, 3, 0), (2, 3, 0), (2, 3, 0), (2, 3, 0), (2, 3, 0) |
|  | Runnel 2 | (2, 3, 0), (2, 3, 0), (3, 3, 0), (3, 3, 0), (3, 3, 0), (3, 3, 0), (3, 3, 0), (3, 3, 0) |
| Tile 10 | Runnel 0 | (0, 3, 1), (0, 3, 1), (0, 3, 1), (0, 3, 1), (0, 3, 1), (0, 3, 1), (1, 3, 1), (1, 3, 1) |
|  | Runnel 1 | (1, 3, 1), (1, 3, 1), (1, 3, 1), (1, 3, 1), (2, 3, 1), (2, 3, 1), (2, 3, 1), (2, 3, 1) |
|  | Runnel 2 | (2, 3, 1), (2, 3, 1), (3, 3, 1), (3, 3, 1), (3, 3, 1), (3, 3, 1), (3, 3, 1), (3, 3, 1) |
| Tile 11 | Runnel 0 | (0, 3, 2), (0, 3, 2), (0, 3, 2), (0, 3, 2), (0, 3, 2), (0, 3, 2), (1, 3, 2), (1, 3, 2) |
|  | Runnel 1 | (1, 3, 2), (1, 3, 2), (1, 3, 2), (1, 3, 2), (2, 3, 2), (2, 3, 2), (2, 3, 2), (2, 3, 2) |
|  | Runnel 2 | (2, 3, 2), (2, 3, 2), (3, 3, 2), (3, 3, 2), (3, 3, 2), (3, 3, 2), (3, 3, 2), (3, 3, 2) |
| Tile 12 | Runnel 0 | (0, 4, 0), (0, 4, 0), (0, 4, 0), (0, 4, 0), (0, 4, 0), (0, 4, 0), (1, 4, 0), (1, 4, 0) |
|  | Runnel 1 | (1, 4, 0), (1, 4, 0), (1, 4, 0), (1, 4, 0), (2, 4, 0), (2, 4, 0), (2, 4, 0), (2, 4, 0) |
|  | Runnel 2 | (2, 4, 0), (2, 4, 0), (3, 4, 0), (3, 4, 0), (3, 4, 0), (3, 4, 0), (3, 4, 0), (3, 4, 0) |
| Tile 13 | Runnel 0 | (0, 4, 1), (0, 4, 1), (0, 4, 1), (0, 4, 1), (0, 4, 1), (0, 4, 1), (1, 4, 1), (1, 4, 1) |
|  | Runnel 1 | (1, 4, 1), (1, 4, 1), (1, 4, 1), (1, 4, 1), (2, 4, 1), (2, 4, 1), (2, 4, 1), (2, 4, 1) |
|  | Runnel 2 | (2, 4, 1), (2, 4, 1), (3, 4, 1), (3, 4, 1), (3, 4, 1), (3, 4, 1), (3, 4, 1), (3, 4, 1), |
| Tile 14 | Runnel 0 | (0, 4, 2), (0, 4, 2), (0, 4, 2), (0, 4, 2), (0, 4, 2), (0, 1, 2), (1, 4, 2), (1, 4, 2) |
|  | Runnel 1 | (1, 4, 2), (1, 4, 2), (1, 4, 2), (1, 4, 2), (2, 4, 2), (2, 4, 2), (2, 4, 2), (2, 4, 2), |
|  | Runnel 2 | (2, 4, 2), (2, 4, 2), (3, 4, 2), (3, 4, 2), (3, 4, 2), (3, 4, 2), (3, 4, 2), (3, 4, 2), |

Figure 10:
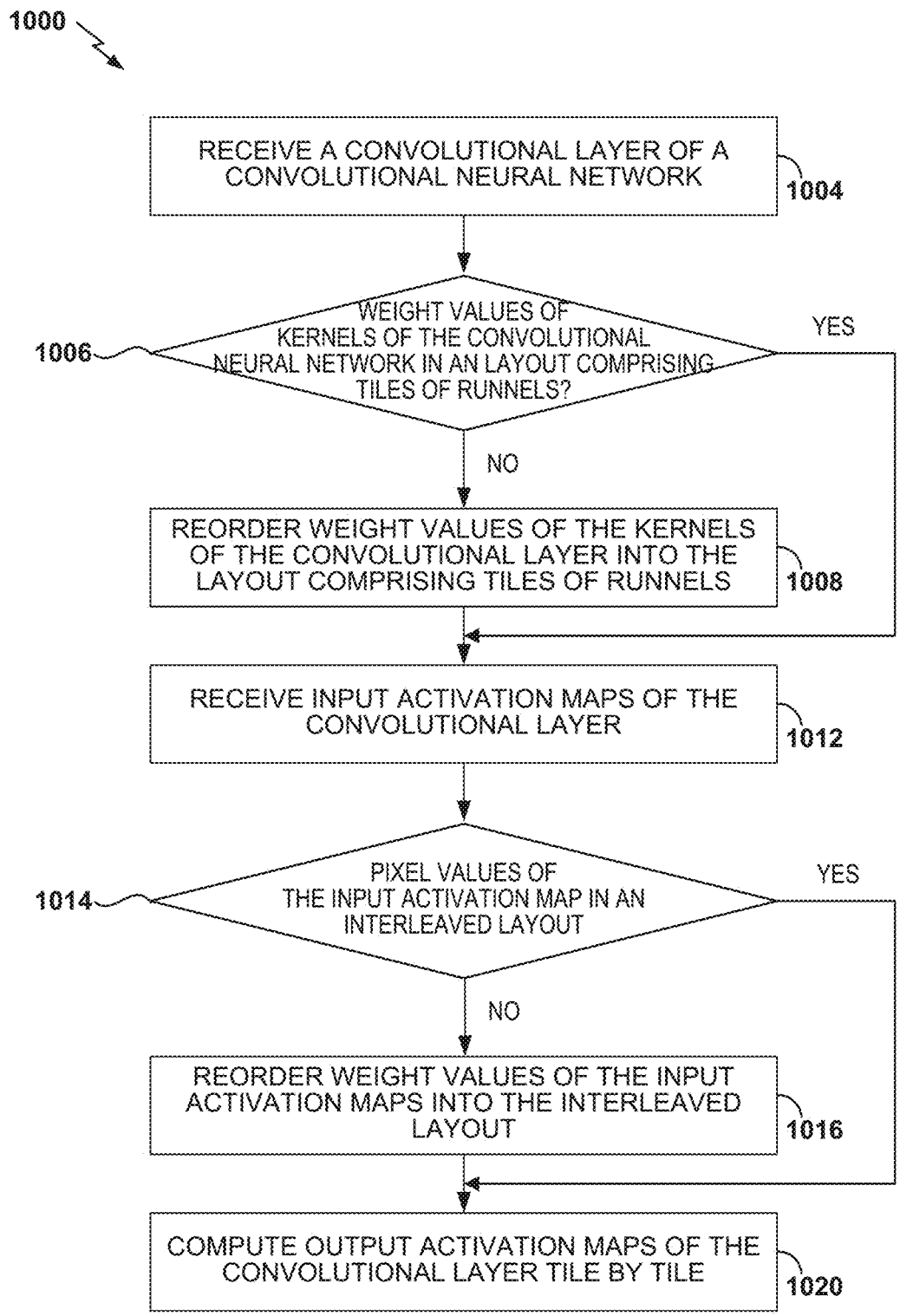
FIG. 10 is a flow diagram of an example process of determining output activation maps of a convolutional layer of a convolutional neural network tile by tile which optionally includes reordering pixel values of input activation maps and weight values of kernels into an interleaved layout and tiles of runnels respectively.

Example Process of Reordering Pixel Values of Input Activation Maps and Weight Values of Kernels Prior to Determining Output Activation Maps Tile by Tile FIG. 10 is a flow diagram of an example process 1000 of determining output activation maps of a convolutional layer of a convolutional neural network (CNN) tile by tile which optionally includes reordering pixel values of input activation maps and weight values of kernels into tiles of runnels. The process 1000 starts at block 1004, wherein a convolutional layer 200 of a convolutional neural network is received. The convolutional layer can be a three-dimensional convolutional layer. As illustrated with reference to FIG. 2, the convolutional layer 200 can have M input channels 204 for receiving M input activation maps. An input activation map can have an input activation map width of Q and an input activation map height of P. The input activation maps can have the same input activation map width Q and input activation map height P.

The convolutional layer 200 can include a kernel stack 208 of kernels. The kernel stack 208 includes M rows of kernels and N columns of kernels, with each column also referred to as a filter bank of the kernel stack 208. A kernel of the kernel stack 208 can have a kernel width of $K_x$ weight values and a kernel height of $K_y$ weight values with a total of $K_y*K_x$ weight values. The kernels of the kernel stack 208 can have the same kernel width $K_x$ and kernel height $K_y$.

The convolutional layer 200 can have N output channels 212 for producing N output activation maps. Each output activation map can be a result of a three-dimensional convolution of a filter bank of the kernel stack 208 and the corresponding input activation maps. An output activation map can have an output activation map width of Q' and an output activation map height of P'. The output activation maps can have the same output activation map width 'Q and output activation map height P'.

At decision block 1008, the format of weight values of the kernels of the kernel stack 208 can be determined. If the weight values of the kernels of the kernel stack 208 are in a basic layout for kernels, the process 1000 proceeds to block 1008. At block 1008, weight values of the kernels of the kernel stack 208 can be reordered from a basic layout for kernels into a tile layout for kernels. The weight values of the kernels can be reordered to take advantage of vector operations for loading, arithmetic, or storing operations. As illustrated with reference to FIGS. 5A-5C, the tile layout for kernels can comprise tiles of runnels of weight values. A runnel can be an ordered list of weight values with the two properties. First, the number of weight values in a runnel can be the same as the number of weight values a processor register such as a SIMD register can contain at once given the data type of the weight values. For example, for a 128-bit SIMD register, a runnel can contain eight half-precision floating point weight values for a kernel of half floats or four single-precision floating point weight values for a kernel of floats. Second, runnels can be filled iteratively by traversing along the width dimension of the kernel stack 208 (M), followed by the height dimension of the kernel stack 208 (N), followed by the width dimension of the individual kernel ($K_x$), and followed by the height dimension of the individual kernel ($K_y$). The traversal continues until the runnel is completely filled with weight values of kernels of the kernel stack 208. Because training a CNN can be an offline process (for example, before a computing device such as a computer server, a personal computer, a tablet computer, a mobile device, or an embedded device uses the resulting CNN to perform image segmentation and eye tracking), reordering the weight values of the kernels at block 1008 can be advantageously performed once in a offline manner (for example, after learning the weight values of the kernels), without loss of the runtime performance of the neural network.

At decision block 1006, if the weight values of the kernels of the kernel stack 208 are in the tile layout for kernels, the process 1000 proceeds to block 1012. In some embodiments, the weight values of the kernels have been reordered from the basic layout into the tile layout for kernels statically at compile time of a program implementing the process 1000. Such reordering at compile time may be possible because the width dimension of the kernel stack 208 (M), the height dimension of the kernel stack 208 (N), the input activation map width Q, the input activation map height of P, or the particular setup of the CNN that includes the convolutional layer 200 may be known at compile time. Thus, reordering the weight values of the kernels of the kernel stack 208 at runtime may be unnecessary at run time.

At block 1012, input activation maps of the convolutional layer 200 can be received. For example, M input activation maps for the M input channels 204 of the convolutional layer 200 can be received. An input activation map can have an input activation map width of Q and an input activation map height of P. The input activation maps can have the same input activation map width Q and input activation map height P.

At decision block 1014, whether pixel values of the input activation maps are in a basic layout for input activation maps or an interleaved layout can be determined. If the pixel values of the input activation maps are in the basic layout for input activation maps, the process 1000 proceeds to block 1016. At block 1016, the pixel values of the input activation maps are reordered into an interleaved layout comprising cluster of pixel values. For example, after a convolutional layer receives M input activation maps, the pixel values of the input activation maps can be reordered from a basic layout for input activation maps (basic input activation map layout) to an interleaved layout for input activation maps (interleaved input activation map layout). With the basic input activation map layout, an input activation map may be ordered channel by channel, such that all pixel values of the first input activation map, can be stored before all pixels of the second input activation map (in terms of memory location) and so on.

In some implementations, the pixel values can be ordered with the first pixel value of the first input activation map, followed by the first pixel of the second input activation map, and so on until the first pixel value of the Mth input activation map. The first pixel value of the Mth input activation map can be followed by the second pixel value of the first input activation map, the second pixel value of the second input activation map, and so on until the second pixel value of the Mth input activation map. This reordering can continue until all the pixel values of all of the M input activation maps have been similarly ordered. The reordering process results in a large reordered input activation map, which includes M individual input activation maps. Each indexed location in the reordered input activation map can include a cluster of the pixel values from the individual input activation maps at that index.

At decision block 1014, if the pixel values of the input activation maps are in the interleaved input activation map layout, the process 1000 proceeds to block 1020. In some embodiments, the pixel values of the input activation maps may be in the interleaved input activation map layout because the pixel values of the input activation maps may be output activation maps of another convolutional layer. The output activation maps of this other convolutional layer may be in the interleaved input activation map layout because its input activation maps are in the interleaved input activation map layout. Advantageously, only the input activation maps of an initial convolutional layer (e.g., the input activation maps of a CNN) need to be reordered once because all the inputs and outputs to convolutional layers can preserve the data ordering. Thus, no processing time needs to be wasted on multiple passes of data reordering.

At block 1020, output activation maps of the convolutional layer in an interleaved output activation map layout can be determined tile by tile. For example, for a tile of the output activation maps: FMADD corresponding reordered output activation map pixel values, reordered input activation map pixel values, and kernel tile, where FMADD denotes a fused-multiply-add operation. In some implementations, the output activation maps of the convolutional layer in an interleaved layout for output activation maps (interleaved output activation map layout) can be ordered into a basic layout for output activation maps (basic output activation map layout). With the interleaved output activation map layout, the pixel values can be ordered with the first pixel value of the first output activation map, followed by the first pixel of the second output activation map, and so on until the first pixel value of the Nth output activation map. The number of output activation maps in a basic layout for output activation maps (basic output activation map layout) can be denoted by N. With the basic output activation map layout, an output activation map may be ordered channel by channel, such that all pixel values that belong to the first output activation map, can be stored before all pixels that belong to the second output activation map (in terms of memory location) and so on.

Optionally, in some implementations, pixel values of the reordered output activation map in an interleaved output activation map layout can be ordered into a basic output activation map layout. For example, the first output activation map can include the first pixel, the (N+1)th pixel, the (2N+1)th pixel, and so on, of the reordered output activation map. As another example, the second output activation map can include the second pixel, the (N+2)th pixel, the (2N+2)th pixel, and so on, of the reordered output activation map. As yet another example, the Nth output activation map can include the Nth pixel, the (2*N) th pixel, the (3*N)th pixel, and so on, of the reordered output activation map.

Example Data Layout of Kernels of a Kernel Stack

The interleaved layout disclosed above can be utilized to perform efficient processing of convolutional layers. A matrix multiplication method can be a highly optimized routine on many platforms. And it is continually optimized for different architectures all the time. Other methods may use matrix multiplication to perform convolutional layers. However, these other methods require data duplication for every convolutional layer instance (e.g., performing the "im2col" operation). The methods disclosed below shows how to take advantage of matrix multiplication, but eliminate the costly data duplication that may be required.

FIG. 11 schematically illustrates an example of reordering weight values of kernels of a kernel stack 208 into a tile format comprising tiles of runnels. In some implementations, the illustrated kernel layout can be used for separable kernels. A separable kernel can have a width dimension $K_x$ or a height dimension $K_y$ of one. Separable kernels can be used for many convolutional neural networks (CNNs) with small losses in accuracy. Using separable kernels may significantly reduce the amount of floating point operations in the CNN because separable kernels operate on single dimensions at a time. For example, a convolutional layer with 3×3 kernels may be replaced with a layer with 1×3 kernels followed by a layer with 3×1 kernels (or a layer with 3×1 kernels followed by a layer of 1×3 kernels).

Using the input activation map layout illustrated in FIG. 4, the input activation maps can be represented by the A matrix in a matrix multiplication operation of Equation (4)

$$A \times B = C. \qquad \text{Equation (4)}$$

The kernel stack can be represented by the B matrix. The output activation maps can be represented by the C matrix, which can be an input activation map of a subsequent CNN layer. In some implementations, the matrix multiplication of Equation (4) can be configured to output the transposes of the output activation maps and not the output activation maps. With this configuration, the output activation maps may be directly amenable to be input activation maps to the subsequent CNN layer, which can be implemented using vectorized stores. Vectorized stores can be advantageous used in some implementations because with the interleaved layout for output activation maps, pixel values of the output activation maps with the same index can be clustered together.

In FIG. 11, the input activation maps represented by the A matrix can have an interleaved layout similar to the interleaved input activation map layout illustrated in FIG. 4. For example, the first row of the A matrix can include the first pixel value of the first input activation map (the pixel value at position (0, 0) of the first input activation map), followed by the first pixel value of the second input activation map (the pixel value at position (0, 0) of the second input activation map), and so on until the first pixel value of the Mth input activation map (the pixel value at position (0, 0) of the Mth input activation map). The first pixel value of the Mth input activation can be followed by second pixel values of the first, second, and Mth input activation maps (the pixel values at position (0, 1) of the input activation maps), and followed by third pixel values of the first, second, and Mth input activation maps (the pixel values at position (0, 2) of the input activation maps).

The second row of the A matrix includes the second pixel values of the first, second, and Mth input activation maps (the pixel values at position (0, 1) of the input activation maps), followed by third pixel values of the first, second, and Mth input activation maps (the pixel values at position (0, 2) of the input activation maps), and followed by fourth pixel value values of the first, second, and Mth input activation maps (the pixel value values at position (0, 3) of the input activation maps).

The matrix A in FIG. 11 may appear to require data duplication. However, data duplication can be avoided by a modification of the striding of the input activation maps. Instead of moving the whole width of the row to reach the next row, the row stride can be M, the number of input channels. Because the pixel values can be contiguous in memory, the modified shortened striding may appear to require data duplication without the need to actually duplicate data. Advantageously, if M is a multiple of the SIMD register width, then the modified striding can preserve that each loading operation can be an aligned loading operation. Aligned loading operations may be required on certain processor architectures. Furthermore, for some processor architectures, aligned loading operations can advantageously result in a performance improvement because of fewer stalls when accessing memory when compared to unaligned loading operations. Thus, the interleaved data layout allows for this striding to be a practical optimization.

FIG. 11 shows an application of a 1×3 kernel to the interleaved input image. Therefore, to account for padding, $W_{input} = W_{output} + 2$. The A matrix has $W_{input} * 3M = (W_{output} + 2) * 3M$ values in it because it needs 3 values from every input image for every column in the row to compute the whole output row. Therefore, the C matrix size is just referring to a single row which is $W_{output} * N$ because it has the output width number of pixels from every output channel of which there are N output channels. To do the calculation of the full convolution, if the height of the input channels is H, then H number of the matrix multiplication shown in FIG. 11 to obtain the final output. Advantageously, the H number of matrix multiplications, instead of one large matrix multiplication, may be performed. The setup of the A matrix with a reduced striding to prevent the need for data duplication may only apply for a single row of the output activation map at a time. When computing the next row of the output activation map, the methods disclosed herein does not use any data from the previous row in the separable kernel case.

The B matrix in FIG. 11 shows a tile layout of 1×3 kernels of the kernel stack 208. In some implementations, with separable kernels, the 1×3 kernels can be followed up by a multiplication with a second matrix B2 representing 3×1 kernels as shown in Equation (5).

$$A2 \times B2 = C2, \qquad \text{Equation (5)}$$

where A2 denotes the input activation maps of the 3×1 kernels, and C2 represents the output activation maps of the 3×1 kernels.

In some implementations, the second matrix B2 representing the 3×1 kernels can have a layout similar or identical to the layout of the matrix B representing 1×3 kernels. However, the A2 matrix may be a transpose of the C matrix. A simple modification to the matrix multiplication method illustrated in Equation (4) can result in the C matrix saved as its transpose. With the C matrix saved as its transpose, the kernels represented by the B2 matrix (e.g., the 3×1 kernels) can move along the direction opposite to how the kernels represented by the B matrix (e.g., the 1×3 kernels) move using the same shortened striding technique.

In some embodiments, with separable kernels the input activation map may arranged in a way such that if the kernels are N×1, the data is in column major format and if the kernels are 1×N, the data is in row major format. Advantageously, whether the data is in column major format or the row major format may not be important because saving the transpose matrix out as the result of a matrix multiplication is not computationally expensive. This still takes advantage of vectorized stores because of the interleaved layout. For example, in the separable case one N×1 layer is followed by a 1×N layer (or vice versa). As long as the transpose is saved out of the first layer, the method looks identical for either kernel setup (i.e. 1×N or N×1). The shortened striding technique can be a method that allows the computation to be performed without data replication. There is no barrier to using this multiplication technique for either type of separable kernel setup (i.e., 1×N or N×1).

Saving the C matrix as its transpose can be advantageously implemented using vectorized stores. Saving the transpose of a result and saving the result directly, whichever is needed for the next layer of the CNN, can be performed with no or minimal computation expense. Thus, no data reshuffling or duplication may be needed. If the transpose is saved out for the C matrix, the output can be directly used as the input to the next CNN layer.

Example Performance Improvement

Examples of the systems and methods disclosed herein were evaluated using a processor with an absolute maximum potential of 9.6 GFlops/core. A GFlop is a billion floating point instructions, and GFlops refers to how many billion floating point instructions can be done per second. By filling up a SIMD register, several floating point operations can be performed every processor cycle. For example, for a register that holds four floating point numbers for example, four floating point operations can be performed every cycle.

However, 9.6 GFlops/core can be an unreachable number in practice, because it assumes one multiply-accumulate instruction is performed every cycle without any latency on its output, or any necessary or useful control code. For example, if a multiply operation and an addition operation are not performed in the same cycle, which can reduce some of the latencies involved with fusing the multiplication and addition, the maximum achievable potential can be 4.8 GFlops/core.

For full spatial convolutional layers (3×3 kernels), around 6 GFlops/core (67% utilization of absolute maximum GFlops) was achieved when a SIMD register includes eight floating point numbers. For separable layers (1×3 or 3×1 kernels), around 5 GFlops/core (56% utilization of absolute maximum GFlops) was achieved. The separable setup required fewer floating point operations in the layers, and generally fewer operations were performed in each loop, which led to slightly worse performance per CNN layer. However, overall better network performance was achieved with separable layers. The results were based on a combination of experiments and projections while optimizing in assembly the methods disclosed herein for specific kernel sizes one at a time.

The number of floating point instructions per core that can be achieved with the methods disclosed herein can be different in different implementations. For example, the number of floating point instructions per core can be in the range of 4-100, 10-90, 25-75, 40-60, or any combination thereof, GFlops/core. The percentage utilization of maximum GFlops that can be achieved with the methods disclosed herein can be different in different implementations. For example, the percentage utilization of maximum GFlops can be 30%-95%, 40%-90%, 50%-80%, 60%-70%, of any combination thereof.

The performance observed in terms of GFlops/core was based on a processor clock of 600 MHz. If the clock speed doubles, all of those numbers would increase by roughly a factor of two, which can depend on other latency times of interacting components like the memory banks. Thus, the percentage utilization of absolute maximum GFlops may not be affected substantially by the processor clock.

The performance improvement observed was a result of the ability to reorder and process the data in a highly efficient manner on vector architectures. This type of performance speed-up can be processor independent, and the same or similar benefits can be applicable to other vector chips.

Example Applications and Advantages

Additional Vectorized Operations

The interleaved layout of the input activation maps disclosed herein can be useful for other vectorized operations in typical convolutional neural networks (CNNs) that may otherwise be difficult to vectorize. For example, max pooling is a down sampling operation that can be applied to all the input activation maps. Max pooling can be based on a window of pixels (2×2 for a down sampling by a factor of 2 in each dimension) in an input activation map. Max pooling can save the maximum value of each window out as the value of the pixel in the down sampled output activation map. Max pooling can then include striding appropriately in each dimension so the pixel values do not overlap when looking for the maximum in the window. Without data reordering, max pooling can be a somewhat tricky operation to vectorize as it requires doing some combination of horizontal comparisons across a vector, unaligned loads, multiple loads, or not filling up vectors completely. With the interleaved input activation map layout disclosed herein, the pixel values for every input activation map can be stored side-by-side. Thus max pooling can be performed for every input activation map at the same time, and can be fully vectorized if the number of input activation maps is a multiple of the vector width. Advantageously, the methods disclosed herein can be utilized for a lot of operations that are traditionally hard to vectorize over single images (e.g., upsampling or operations like transposition).

No Need for Data Duplication or Subsequent Reordering

In some implementations, the interleaved layout of the input activation maps can allow for operations to be performed with no or minimal data duplication. Thus, memory utilization efficiency can be high, which can be useful for embedded systems, which generally may have less memory and smaller amounts of low-latency memory.

Also, only the input activation maps of an initial convolutional layer (e.g., the input activation maps of a CNN) need to be reordered once because all the inputs and outputs to convolutional layers can preserve the data ordering. Thus, no processing time needs to be wasted on multiple passes of data reordering.

Power Efficiency

In general, the less time spent processing data, the more time the processor can be idle or de-clocked. By efficiently processing data with the methods and systems disclosed herein, power savings can be achieved by efficiently using processor resources while running a CNN. Further, by eliminating data duplication for efficient memory utilization, less system-wide resources may be needed for transfers between levels in the memory hierarchy. This can result in power savings because the main memory may be accessed less and because the local, cached memory can be better, optimally, or maximally utilized.

Dependency on Number of Inputs Matching Register Width

The methods and systems disclosed herein may not result in every possible convolutional layer with 100% SIMD utilization. Instead, very high amounts of utilization can be achieved for many layers. And full utilization, in terms of filling up registers completely for operations of convolutional layers, can be achieved for some convolutional layers. SIMD utilization can depend on the number of inputs/outputs to the layer being a multiple of the number of values that can fit in a register on the processor architecture. However, this dependency may not be highly limiting because the process of designing and training a convolutional neural network can be flexible. For example, a CNN can be designed such that the CNN often can have layer dimensions that work well for the methods and systems of the present disclosure.

Example Wearable Display System

In some embodiments, a user device can be, or can be included, in a wearable display device, which may advantageously provide a more immersive virtual reality (VR), augmented reality (AR), or mixed reality (MR) experience, where digitally reproduced images or portions thereof are presented to a wearer in a manner wherein they seem to be, or may be perceived as, real.

Without being limited by theory, it is believed that the human eye typically can interpret a finite number of depth planes to provide depth perception. Consequently, a highly believable simulation of perceived depth may be achieved by providing, to the eye, different presentations of an image corresponding to each of these limited number of depth planes. For example, displays containing a stack of waveguides may be configured to be worn positioned in front of the eyes of a user, or viewer. The stack of waveguides may be utilized to provide three-dimensional perception to the eye/brain by using a plurality of waveguides to direct light from an image injection device (e.g., discrete displays or output ends of a multiplexed display which pipe image information via one or more optical fibers) to the viewer's eye at particular angles (and amounts of divergence) corresponding to the depth plane associated with a particular waveguide.

In some embodiments, two stacks of waveguides, one for each eye of a viewer, may be utilized to provide different images to each eye. As one example, an augmented reality scene may be such that a wearer of an AR technology sees a real-world park-like setting featuring people, trees, buildings in the background, and a concrete platform. In addition to these items, the wearer of the AR technology may also perceive that he "sees" a robot statue standing upon the real-world platform, and a cartoon-like avatar character flying by which seems to be a personification of a bumble bee, even though the robot statue and the bumble bee do not exist in the real world. The stack(s) of waveguides may be used to generate a light field corresponding to an input image and in some implementations, the wearable display comprises a wearable light field display. Examples of wearable display device and waveguide stacks for providing light field images are described in U.S. Patent Publication No. 2015/0016777, which is hereby incorporated by reference herein in its entirety for all it contains.

Figure 12:
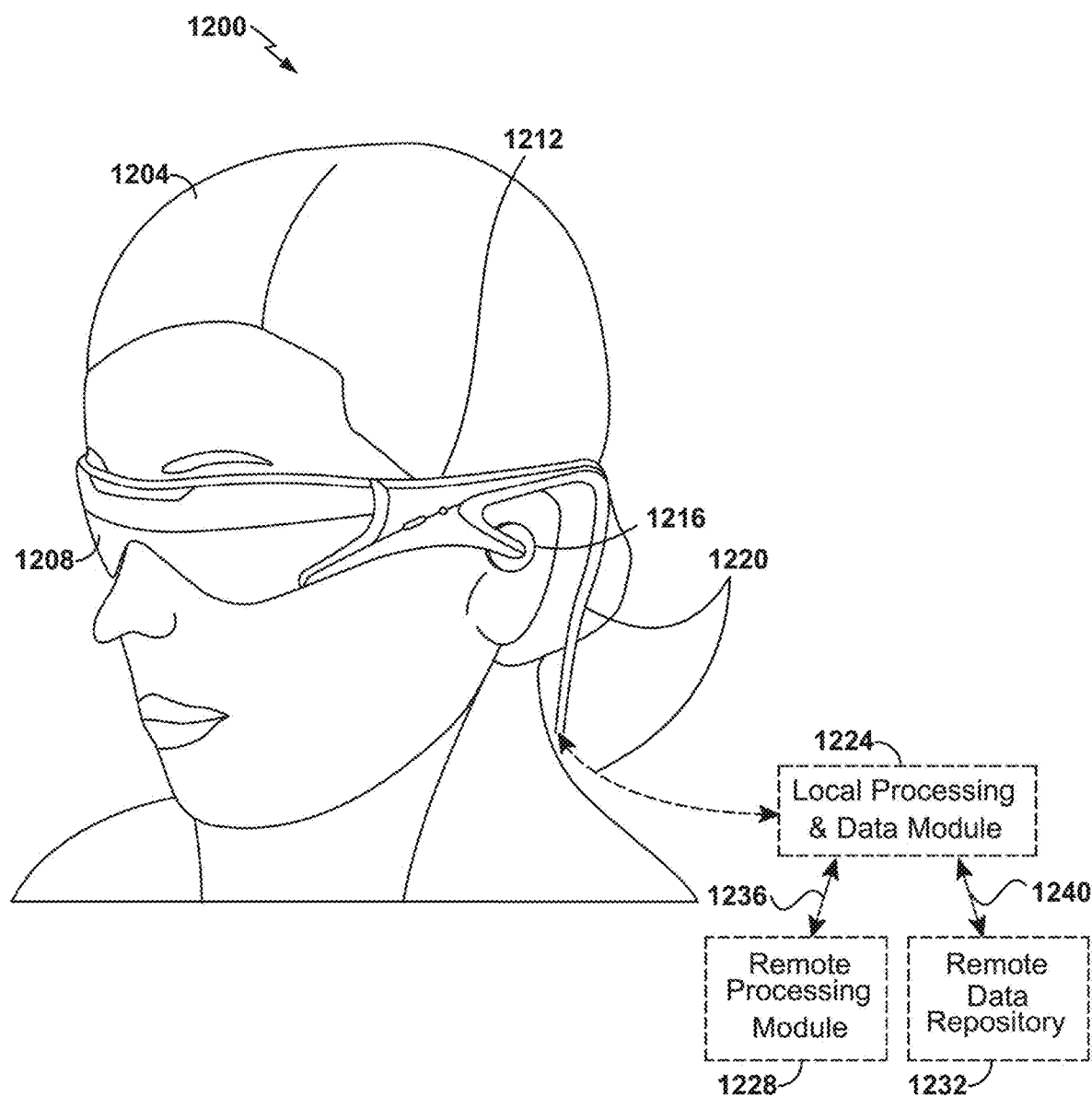
FIG. 12 schematically illustrates an example of a wearable display system.

FIG. 12 illustrates an example of a wearable display system 1200 that can be used to present a VR, AR, or MR experience to a display system wearer or viewer 1204. The wearable display system 1200 may be programmed to perform any of the applications or embodiments described herein (e.g., executing CNNs, reordering values of input activation maps or kernels, eye image segmentation, or eye tracking). The display system 1200 includes a display 1208, and various mechanical and electronic modules and systems to support the functioning of that display 1208. The display 1208 may be coupled to a frame 1212, which is wearable by the display system wearer or viewer 1204 and which is configured to position the display 1208 in front of the eyes of the wearer 1204. The display 1208 may be a light field display. In some embodiments, a speaker 1216 is coupled to the frame 1212 and positioned adjacent the ear canal of the user in some embodiments, another speaker, not shown, is positioned adjacent the other ear canal of the user to provide for stereo/shapeable sound control. The display 1208 is operatively coupled 1220, such as by a wired lead or wireless connectivity, to a local data processing module 1224 which may be mounted in a variety of configurations, such as fixedly attached to the frame 1212, fixedly attached to a helmet or hat worn by the user, embedded in headphones, or otherwise removably attached to the user 1204 (e.g., in a backpack-style configuration, in a belt-coupling style configuration).

The local processing and data module 1224 may comprise a hardware processor, as well as non-transitory digital memory, such as non-volatile memory e.g., flash memory, both of which may be utilized to assist in the processing, caching, and storage of data. The data include data (a) captured from sensors (which may be, e.g., operatively coupled to the frame 1212 or otherwise attached to the wearer 1204), such as image capture devices (such as cameras), microphones, inertial measurement units, accelerometers, compasses, GPS units, radio devices, and/or gyros; and/or (b) acquired and/or processed using remote processing module 1228 and/or remote data repository 1232, possibly for passage to the display 1208 after such processing or retrieval. The local processing and data module 1224 may be operatively coupled to the remote processing module 1228 and remote data repository 1232 by communication links 1236, 1240, such as via a wired or wireless communication links, such that these remote modules 1228, 1232 are operatively coupled to each other and available as resources to the local processing and data module 1224. The image capture device(s) can be used to capture the eye images used in the eye image segmentation, or eye tracking procedures.

In some embodiments, the remote processing module 1228 may comprise one or more processors configured to analyze and process data and/or image information such as video information captured by an image capture device. The video data may be stored locally in the local processing and data module 1224 and/or in the remote data repository 1232. In some embodiments, the remote data repository 1232 may comprise a digital data storage facility, which may be available through the internet or other networking configuration in a "cloud" resource configuration. In some embodiments, all data is stored and all computations are performed in the local processing and data module 1224, allowing fully autonomous use from a remote module.

In some implementations, the local processing and data module 1224 and/or the remote processing module 1228 are programmed to perform embodiments of reordering values of input activation maps or kernels, eye image segmentation, or eye tracking disclosed herein. For example, the local processing and data module 1224 and/or the remote processing module 1228 can be programmed to perform embodiments of the process 1000 described with reference to FIG. 10 and methods described with reference to FIGS. 2-9B and 11. The local processing and data module 1224 and/or the remote processing module 1228 can be programmed to use the reordering values of input activation maps or kernels, eye image segmentation, or eye tracking techniques disclosed herein in biometric extraction, for example to identify or authenticate the identity of the wearer 1204. The image capture device can capture video for a particular application (e.g., video of the wearer's eye for an eye-tracking application or video of a wearer's hand or finger for a gesture identification application). The video can be analyzed using a CNN by one or both of the processing modules 1224, 1228. In some cases, off-loading at least some of the reordering values of input activation maps or kernels, eye image segmentation, or eye tracking to a remote processing module (e.g., in the "cloud") may improve efficiency or speed of the computations. The parameters of the CNN (e.g., weights, bias terms, subsampling factors for pooling layers, number and size of kernels in different layers, number of feature maps, etc.) can be stored in data modules 1224 and/or 1232.

The results of the video analysis (e.g., the output of the CNN) can be used by one or both of the processing modules 1224, 1228 for additional operations or processing. For example, in various CNN applications, biometric identification, eye-tracking, recognition or classification of gestures, objects, poses, etc. may be used by the wearable display system 1200. For example, video of the wearer's eye(s) can be used for eye image segmentation, which, in turn, can be used by the processing modules 1224, 1228 for eye tracking of the wearer 1204 through the display 1208. The processing modules 1224, 1228 of the wearable display system 1200 can be programmed with one or more embodiments of reordering values of input activation maps or kernels, eye image segmentation, or eye tracking to perform any of the video or image processing applications described herein.

Additional Aspects

In a 1st aspect, a method for efficient implementation of a convolutional layer of a convolutional neural network is disclosed. The method is under control of a hardware processor and comprises: receiving a convolutional layer of a convolutional neural network, wherein the convolutional layer comprises kernels in a kernel stack, and wherein the kernels of the kernel stack are in a basic kernel layout; reordering weight values of the kernels of the kernel stack from the basic kernel layout into a tile kernel layout comprising a plurality of kernel tiles, wherein a kernel tile comprises a plurality of kernel runnels, and wherein a kernel runnel comprises a number of the weight values of the kernels of the kernel stack; receiving input activation maps of the convolutional layer, wherein the input activation maps are in a basic input activation map layout; reordering pixel values of the input activation maps from the basic input activation map layout into an interleaved input activation map layout comprising a plurality of clusters of input activation map pixels; and determining output activation maps of the convolutional layer from the plurality of kernel tiles and the plurality of clusters of input activation map pixels, wherein the output activation maps are in an interleaved output activation map layout comprising a plurality of clusters output activation map pixels.

In a 2nd aspect, the method of aspect 1, wherein reordering the weight values of the kernels of the kernel stack from the basic kernel layout into the tile kernel layout comprises, iteratively: traversing along a width dimension of the kernel stack; traversing along a height dimension of the kernel stack; traversing along a width dimension of a kernel of the kernel stack; and traversing along a height dimension of the kernel of the kernel stack.

In a 3rd aspect, the method of any one of aspects 1-2, wherein a first kernel runnel of the kernel tile corresponds a first kernel stack width boundary, and wherein a last kernel runnel of the kernel tile corresponds to a second kernel stack width boundary subsequent of the first kernel stack width boundary.

In a 4th aspect, the method of any one of aspects 1-3, wherein reordering the pixel values of the input activation maps from the basic input activation map layout into the interleaved input activation map layout comprises, iteratively: traversing along a dimension of a number of input activation maps; traversing along a width dimension of an input activation map; and traversing along a height dimension of input activation map.

In a 5th aspect, the method of any one of aspects 1-4, further comprising reordering pixel values of the output activation maps from the interleaved output activation map layout into a basic output activation map layout.

In a 6th aspect, the method of aspect 5, wherein reordering the pixel values of the output activation maps from the interleaved output activation map into the basic output activation map layout comprises, iteratively: traversing along a width dimension of the interleaved output activation map; and traversing along a height dimension of the interleaved output activation map.

In a 7th aspect, the method of any one of aspects 1-6, wherein determining the output activation maps of the convolutional layer from the plurality of kernel tiles and the plurality of clusters of input activation map pixels comprises performing fused-multiply-add operations tile by tile on the plurality of kernel tiles and the plurality of clusters of input activation map pixels.

In a 8th aspect, the method of aspect 7, wherein performing the fused-multiply-add operations tile by tile on the plurality of kernel tiles and the plurality of clusters of input activation map pixels comprises, iteratively: for each output activation map pixel: setting a value of the output activation map pixel to a value of zero; and for each kernel runnel of each kernel tile of the plurality of the kernel tiles, performing a fused-multiply-add operation on the each kernel runnel, an input activation map pixel corresponding to the kernel runnel and the output activation map pixel, and the output activation map pixel.

In a 9th aspect, the method of aspect 7, wherein performing the fused-multiply-add operations tile by tile on the plurality of kernel tiles and the plurality of clusters of input activation map pixels comprises, iteratively: for each output activation map pixel: setting a value of the output activation map pixel to a value of zero; and for each kernel runnel of each kernel tile of the plurality of the kernel tiles, performing a fused-multiply-add operation on the each kernel runnel, at least one input activation map pixel corresponding to the kernel runnel and the output activation map pixel, and the output activation map pixel.

In a 10th aspect, the method of aspect 9, wherein the at least one input activation map pixel comprises two input activation map pixels.

In a 11th aspect, the method of any one of aspects 1-10, wherein a size of the kernel runnel in bits and a size of the input activation map runnel in bits are the same.

In a 12th aspect, the method of any method 11, wherein the size of the kernel runnel in bits and a size of the output activation map runnel in bits are the same.

In a 13th aspect, the method of any one of aspects 11-12, wherein the size of the kernel runnel in bits and a size of a register of the hardware processor in bits are the same.

In a 14th aspect, the method of aspect 13, wherein the size of the register is 128 bits.

In a 15th aspect, the method of any one of aspects 1-14, wherein the hardware processor comprises a single instruction, multiple data processor.

In a 16th aspect, the method of aspect 15, wherein the single instruction, multiple data processor comprises a vector processor.

In a 17th aspect, the method of any one of aspects 1-16, wherein the kernels of the kernel stack in the basic kernel layout are arranged in a plurality of kernel stack channels, wherein a number of the plurality of kernel stack channels and a number of the input activation maps are the same, and wherein a number of kernels of a kernel stack channel and a number of the output activation maps are the same.

In a 18th aspect, the method of any one of aspects 1-17, wherein a kernel stack width of the kernel stack and a number of the output activation maps are the same.

In a 19th aspect, the method of any one of aspects 1-18, wherein the kernels of the kernel stack in the basic kernel layout are arranged in a plurality of kernel stack filter banks, wherein a number of the plurality of kernel stack filter banks and a number of the output activation maps are the same, and wherein a number of kernels of a kernel stack filter bank and a number of the input activation maps are the same.

In a 20th aspect, the method of any one of aspects 1-19, wherein a kernel stack height of the kernel stack and a number of the input activation maps are the same.

In a 21st aspect, a method for efficient implementation of a convolutional layer of a convolutional neural network is disclosed. The method is under control of a hardware processor and comprises: receiving a convolutional layer of a convolutional neural network comprising kernels in a kernel stack, wherein the kernels of the kernel stack are in a tile kernel layout comprising a plurality of kernel tiles of kernel runnels; receiving input activation maps of the convolutional layer, wherein the input activation maps are in a basic input activation map layout; reordering pixel values of the input activation maps from the basic input activation map layout into an interleaved input activation map layout comprising a plurality of clusters of input activation map pixels; and determining output activation maps of the convolutional layer from the plurality of kernel tiles and the plurality of clusters of input activation map pixels, wherein the output activation maps are in an interleaved output activation map layout comprising a plurality of clusters of output activation map pixels.

In a 22nd aspect, a method for efficient implementation of a convolutional layer of a convolutional neural network is disclosed. The method is under control of a hardware processor and comprises: receiving a convolutional layer of a convolutional neural network comprising kernels in a kernel stack, wherein the kernels of the kernel stack are in a tile kernel layout comprising a plurality of kernel tiles of kernel runnels; receiving input activation maps of the convolutional layer, wherein the input activation maps are in an interleaved input activation map layout; and determining output activation maps of the convolutional layer from the plurality of kernel tiles and the plurality of clusters of input activation map pixels, wherein the output activation maps are in an interleaved output activation map layout comprising a plurality of clusters of output activation map pixels.

In a 23rd aspect, a method for efficient implementation of a convolutional layer of a convolutional neural network is disclosed. The method is under control of a hardware processor and comprises: receiving a convolutional layer of a convolutional neural network comprising kernels in a kernel stack, wherein the kernels of the kernel stack are in a tile kernel layout comprising a plurality of kernel tiles of kernel runnels, and wherein a dimension of a kernel is one; receiving input activation maps of the convolutional layer, wherein the input activation maps are in a basic input activation map layout; reordering pixel values of the input activation maps from the basic input activation map layout into an interleaved input activation map layout comprising a plurality of clusters of input activation map pixels by striding; and determining output activation maps of the convolutional layer from the plurality of kernel tiles and the plurality of input activation map tiles, wherein the output activation maps are in a transposed, interleaved output activation map layout comprising a plurality of clusters of output activation map.

In a 24th aspect, the method of aspect 23, wherein reordering the pixel values of the input activation maps from the basic input activation map layout into the interleaved input activation map layout comprises reordering pixel values of the input activation maps from the basic input activation map layout into the interleaved input activation map layout comprising the plurality of clusters of input activation map pixels by striding with a stride size of a multiple of a number of the input activation maps.

In a 25th aspect, the method of aspect 24, wherein the multiple of the number of the input activation maps is one.

In a 26th aspect, a method for efficient implementation of a convolutional layer of a convolutional neural network is disclosed. The method is under control of a hardware processor and comprises: receiving a convolutional layer of a convolutional neural network comprising kernels in a kernel stack, wherein the kernels of the kernel stack are in a tile kernel layout comprising a plurality of kernel tiles of kernel runnels, and wherein a dimension of a kernel is one; receiving input activation maps of the convolutional layer, wherein the input activation maps are in an interleaved input activation map layout comprising a plurality of clusters of input activation map pixels with a stride size of a multiple of a number of the input activation maps; and determining output activation maps of the convolutional layer from the plurality of kernel tiles and the plurality of input activation map tiles, wherein the output activation maps are in a transposed, interleaved output activation map layout comprising a plurality of clusters of output activation map.

In a 27th aspect, the method of aspect 26, wherein the multiple of the number of the input activation maps is one.

In a 28th aspect, a computer system is disclosed. The computer system comprises: a hardware processor; and non-transitory memory having instructions stored thereon, which when executed by the hardware processor cause the processor to perform the method of any one of aspects 1-27.

In a 29th aspect, the computer system of aspect 28, wherein the computer system comprises a mobile device.

In a 30th aspect, the computer system of aspect 29, wherein the mobile device comprises a wearable display system.

In a 31st aspect, a system for implementing a convolutional neural network (CNN) is disclosed. The system comprises: non-transitory memory configured to store: a convolutional layer of a convolutional neural network, wherein the convolutional layer comprises kernels in a kernel stack, wherein the kernels of the kernel stack are in a basic kernel layout, wherein weight values of the kernels of the kernel stack are reordered from the basic kernel layout into a tile kernel layout comprising a plurality of kernel tiles, wherein a kernel tile comprises a plurality of kernel runnels, and wherein a kernel runnel comprises a number of the weight values of the kernels of the kernel stack; and a hardware processor in communication with the non-transitory memory, the hardware processor programmed by the executable instructions to: receive input activation maps of the convolutional layer, wherein the input activation maps are in a basic input activation map layout; reorder pixel values of the input activation maps from the basic input activation map layout into an interleaved input activation map layout comprising a plurality of clusters of input activation map pixels; and determine output activation maps of the convolutional layer from the plurality of kernel tiles and the plurality of clusters of input activation map pixels, wherein the output activation maps are in an interleaved output activation map layout comprising a plurality of clusters output activation map pixels. In some embodiments, a wearable display system can comprise the system for implementing the CNN. The wearable display system can comprise a display configured to present a virtual image to a user of the wearable display system, and the hardware processor can be in communication with the display.

In a 32nd aspect, the system of aspect 31, wherein the weight values of the kernels of the kernel stack are reordered from the basic kernel layout into the tile kernel layout by, iteratively: traversing along a width dimension of the kernel stack; traversing along a height dimension of the kernel stack; traversing along a width dimension of a kernel of the kernel stack; and traversing along a height dimension of the kernel of the kernel stack.

In a 33rd aspect, the system of any one of aspects 31-32, wherein a first kernel runnel of the kernel tile corresponds a first kernel stack width boundary, and wherein a last kernel runnel of the kernel tile corresponds to a second kernel stack width boundary subsequent of the first kernel stack width boundary.

In a 34th aspect, the system of any one of aspects 31-33, wherein to reorder the pixel values of the input activation maps from the basic input activation map layout into the interleaved input activation map layout, the hardware processor is programmed to, iteratively: traverse along a dimension of a number of input activation maps; traverse along a width dimension of an input activation map; and traverse along a height dimension of input activation map.

In a 35th aspect, the system of any one of aspects 31-34, wherein the hardware processor is programmed to: reorder pixel values of the output activation maps from the interleaved output activation map layout into a basic output activation map layout.

In a 36th aspect, the system of aspect 35, wherein to reorder the pixel values of the output activation maps from the interleaved output activation map into the basic output activation map layout, the hardware processor is programmed to, iteratively: traversing along a width dimension of the interleaved output activation map; and traversing along a height dimension of the interleaved output activation map.

In a 37th aspect, the system of any one of aspects 31-36, wherein to determine the output activation maps of the convolutional layer from the plurality of kernel tiles and the plurality of clusters of input activation map pixels, the hardware processor is programmed to: perform fused-multiply-add operations tile by tile on the plurality of kernel tiles and the plurality of clusters of input activation map pixels.

In a 38th aspect, the system of aspect 37, wherein to perform the fused-multiply-add operations tile by tile on the plurality of kernel tiles and the plurality of clusters of input activation map pixels comprises, iteratively: for each output activation map pixel: set a value of the output activation map pixel to a value of zero; and for each kernel runnel of each kernel tile of the plurality of the kernel tiles, perform a fused-multiply-add operation on the each kernel runnel, an input activation map pixel corresponding to the kernel runnel and the output activation map pixel, and the output activation map pixel.

In a 39th aspect, the system of aspect 37, wherein to perform the fused-multiply-add operations tile by tile on the plurality of kernel tiles and the plurality of clusters of input activation map pixels, the hardware processor is programmed to, iteratively: for each output activation map pixel: set a value of the output activation map pixel to a value of zero; and for each kernel runnel of each kernel tile of the plurality of the kernel tiles, perform a fused-multiply-add operation on the each kernel runnel, at least one input activation map pixel corresponding to the kernel runnel and the output activation map pixel, and the output activation map pixel.

In a 40th aspect, the system of aspect 39, wherein the at least one input activation map pixel comprises two input activation map pixels.

In a 41st aspect, the system of any one of aspects 31-40, wherein a size of the kernel runnel in bits and a size of the input activation map runnel in bits are the same.

In a 42nd aspect, the system of any aspect 41, wherein the size of the kernel runnel in bits and a size of the output activation map runnel in bits are the same.

In a 43rd aspect, the system of any one of aspects 41-42, wherein the size of the kernel runnel in bits and a size of a register of the hardware processor in bits are the same.

In a 44th aspect, the system of aspect 43, wherein the size of the register is 128 bits.

In a 45th aspect, the system of any one of aspects 31-44, wherein the hardware processor comprises a single instruction, multiple data processor.

In a 46th aspect, the system of aspect 45, wherein the single instruction, multiple data processor comprises a vector processor.

In a 47th aspect, the system of any one of aspects 31-46, wherein the kernels of the kernel stack in the basic kernel layout are arranged in a plurality of kernel stack channels, wherein a number of the plurality of kernel stack channels and a number of the input activation maps are the same, and wherein a number of kernels of a kernel stack channel and a number of the output activation maps are the same.

In a 48th aspect, the system of any one of aspects 31-47, wherein a kernel stack width of the kernel stack and a number of the output activation maps are the same.

In a 49th aspect, the system of any one of aspects 31-48, wherein the kernels of the kernel stack in the basic kernel layout are arranged in a plurality of kernel stack filter banks, wherein a number of the plurality of kernel stack filter banks and a number of the output activation maps are the same, and wherein a number of kernels of a kernel stack filter bank and a number of the input activation maps are the same.

In a 50th aspect, the system of any one of aspects 31-49, wherein a kernel stack height of the kernel stack and a number of the input activation maps are the same.

CONCLUSION

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, a video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method implemented by a system of one more processors, the method comprising:
   receiving a convolutional layer of a convolutional neural network, wherein the convolutional layer comprises kernels in a kernel stack;
   receiving input activation maps of the convolutional layer; and
   determining output activation maps of the convolutional layer based at least partly on the kernels and the input activation maps, wherein the output activation maps are in an interleaved output activation map layout.

2. The method of claim 1, wherein the input activation maps are in an interleaved input activation map layout.

3. The method of claim 1, wherein the input activation maps are in a basic input activation map layout.

4. The method of claim 3, wherein the method further comprises:
   reordering pixel values of the input activation maps from the basic input activation map layout into the interleaved input activation map layout comprising a plurality of clusters of input activation map pixels.

5. The method of claim 1, wherein the kernels of the kernel stack are in a basic kernel layout.

6. The method of claim 5, wherein weight values of the kernels of the kernel stack are reordered from the basic kernel layout into a tile kernel layout comprising a plurality of kernel tiles.

7. The method of claim 6, wherein a kernel tile comprises a plurality of kernel runnels, and wherein a kernel runnel comprises a number of the weight values of the kernels of the kernel stack.

8. The method of claim 7, wherein the output activation maps are determined based on the plurality of kernel tiles and the input activation maps.

9. The method of claim 8, wherein the input activation maps are in an interleaved input activation map layout comprising a plurality of clusters of input activation map pixels, and wherein determining the output activation maps comprises:
   performing fused-multiply-add operations tile by tile on the plurality of kernel tiles and the plurality of clusters of input activation map pixels.

10. The method of claim 7, wherein a first kernel runnel of the kernel tile corresponds a first kernel stack width boundary, and wherein a last kernel runnel of the kernel tile corresponds to a second kernel stack width boundary subsequent of the first kernel stack width boundary.

11. The method of claim 7, wherein a size of a first kernel runnel in bits and a size of a first input activation map runnel in bits are the same.

12. The method of claim 11, wherein the size of the first kernel runnel in bits and a size of a first output activation map runnel in bits are the same.

13. The method of claim 11, wherein the size of the first kernel runnel in bits and a size of a first register of at least one of the processors in bits are the same.

14. The method of claim 1, wherein the interleaved output activation map layout comprises a plurality of clusters of output activation map pixels.

15. The method of claim 1, further comprising reordering pixel values of the output activation maps from the interleaved output activation map layout into a basic output activation map layout.

16. The method of claim 1, wherein at least one of the one or more processors comprises a single instruction, multiple data processor.

17. A system comprising non-transitory memory storing instructions that when executed by one or more processors, cause the one or more processors to perform operations comprising:
   receiving a convolutional layer of a convolutional neural network, wherein the convolutional layer comprises kernels in a kernel stack;
   receiving input activation maps of the convolutional layer; and
   determining output activation maps of the convolutional layer based at least partly on the kernels and the input activation maps, wherein the output activation maps are in an interleaved output activation map layout.

18. The system of claim 17, wherein weight values of the kernels of the kernel stack are reordered into a tile kernel layout comprising a plurality of kernel tiles, wherein a kernel tile comprises a plurality of kernel runnels, and wherein a kernel runnel comprises a number of the weight values of the kernels of the kernel stack.

19. The system of claim 18, wherein a size of a first kernel runnel in bits and a size of a first input activation map runnel in bits are the same.

20. The system of claim 18, wherein a size of a first kernel runnel in bits and a size of a first register of at least one of the processors in bits are the same.

* * * * *